US012615578B2

(12) United States Patent
Chen et al.

(10) Patent No.: US 12,615,578 B2
(45) Date of Patent: Apr. 28, 2026

(54) NETWORK SLICE DISCOVERY AND SELECTION

(71) Applicant: InterDigital Patent Holdings, Inc., Wilmington, DE (US)

(72) Inventors: Wei Chen, San Diego, CA (US); Pascal M. Adjakple, Great Neck, NY (US); Joseph M. Murray, Schwenksville, PA (US); Qing Li, Princeton Junction, NJ (US); Guodong Zhang, Syosset, NY (US); Lakshmi R. Iyer, King of Prussia, PA (US); Allan Y. Tsai, Boonton, NJ (US); Qian Zhang, Basking Ridge, NJ (US); Tianyi Xu, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/624,594

(22) Filed: Jun. 15, 2017

(65) Prior Publication Data

US 2017/0367036 A1 Dec. 21, 2017

Related U.S. Application Data

(60) Provisional application No. 62/401,062, filed on Sep. 28, 2016, provisional application No. 62/373,768,
(Continued)

(51) Int. Cl.
| | |
|---|---|
| *H04W 48/16* | (2009.01) |
| *H04L 41/122* | (2022.01) |
(Continued)

(52) U.S. Cl.
CPC ........... *H04W 48/16* (2013.01); *H04L 41/122* (2022.05); *H04L 43/08* (2013.01); *H04L 43/10* (2013.01);
(Continued)

(58) Field of Classification Search
CPC ......... H04L 41/12; H04L 43/08; H04L 43/10; H04W 16/02
See application file for complete search history.

(56) References Cited

U.S. PATENT DOCUMENTS

| | | |
|---|---|---|
| 934,888 A | 9/1909 | Dahlberg |
| 4,757,286 A | 7/1988 | Konishi et al. |
| (Continued) | | |

FOREIGN PATENT DOCUMENTS

| | | |
|---|---|---|
| CN | 101258686 A | 9/2008 |
| CN | 101313578 A | 11/2008 |
| (Continued) | | |

OTHER PUBLICATIONS

Sesia et al., "LTE—The UMTS Long Term Evolution", Chapter 9.3.3., LTE—The UMTS Long Term Evolution : from theory to Practice; Jul. 20, 2011, pp. 198-200.
(Continued)

*Primary Examiner* — Wutchung Chu
*Assistant Examiner* — Berhanu D Belete
(74) *Attorney, Agent, or Firm* — Flaster Greenberg P.C.

(57) ABSTRACT

An NR network slicing architecture may be used to facilitate network slice discovery and selection. Mechanisms to discover and select network slices may differ depending on whether a user equipment is in an idle mode or a connected mode. Further, in various examples, the network slice discovery and selection may be performed by a UE, a radio access network (RAN), or a core network (CN), based on a variety of selection criteria.

20 Claims, 40 Drawing Sheets

Related U.S. Application Data filed on Aug. 11, 2016, provisional application No. 62/373,691, filed on Aug. 11, 2016, provisional application No. 62/350,550, filed on Jun. 15, 2016.

(51) Int. Cl.

| | |
|---|---|
| *H04L 43/08* | (2022.01) |
| *H04L 43/10* | (2022.01) |
| *H04W 48/18* | (2009.01) |
| *H04W 72/121* | (2023.01) |
| *H04W 76/10* | (2018.01) |
| *H04W 76/12* | (2018.01) |
| *H04W 84/04* | (2009.01) |

(52) U.S. Cl.

CPC ............ *H04W 76/10* (2018.02); *H04W 48/18* (2013.01); *H04W 72/121* (2013.01); *H04W 76/12* (2018.02); *H04W 84/042* (2013.01)

(56) References Cited

U.S. PATENT DOCUMENTS

| | | | |
|---|---|---|---|
| 4,892,292 A | 1/1990 | Russell | |
| 5,610,653 A | 3/1997 | Abecassis | |
| 5,892,554 A | 4/1999 | Dicicco et al. | |
| 6,750,919 B1 | 6/2004 | Rosser | |
| 6,973,130 B1 | 12/2005 | Wee et al. | |
| 7,114,174 B1 | 9/2006 | Brooks et al. | |
| 7,117,517 B1 | 10/2006 | Milazzo et al. | |
| 7,343,617 B1 | 3/2008 | Katcher et al. | |
| 7,577,980 B2 | 8/2009 | Kienzle et al. | |
| 7,782,344 B2 | 8/2010 | Whittaker | |
| 7,949,032 B1 | 5/2011 | Frost | |
| 8,055,785 B2 | 11/2011 | Liu et al. | |
| 8,150,421 B2 | 4/2012 | Ward et al. | |
| 8,160,077 B2 | 4/2012 | Traversat et al. | |
| 8,243,797 B2 | 8/2012 | Lin et al. | |
| 8,331,760 B2 | 12/2012 | Butcher | |
| 8,358,614 B2 | 1/2013 | Pani et al. | |
| 8,621,000 B2 | 12/2013 | Adimatyam et al. | |
| 8,705,527 B1 | 4/2014 | Addepalli et al. | |
| 8,830,883 B2 | 9/2014 | Chen et al. | |
| 8,902,773 B2 | 12/2014 | Anderson et al. | |
| 9,001,737 B2 | 4/2015 | Amerga et al. | |
| 9,002,979 B2 | 4/2015 | Hansen | |
| 9,020,556 B2 | 4/2015 | Haim et al. | |
| 9,047,236 B2 | 6/2015 | Gigliotti | |
| 9,060,187 B2 | 6/2015 | Wu et al. | |
| 9,064,313 B2 | 6/2015 | Seshadrinathan et al. | |
| 9,078,141 B2 | 7/2015 | Hwang | |
| 9,119,119 B2 | 8/2015 | Balasubramanian et al. | |
| 9,137,027 B2 | 9/2015 | Matthews et al. | |
| 9,170,707 B1 | 10/2015 | Laska et al. | |
| 9,177,225 B1 | 11/2015 | Cordova-Diba et al. | |
| 9,198,181 B2 | 11/2015 | Blankenship et al. | |
| 9,231,838 B2 | 1/2016 | Ould-Brahim et al. | |
| 9,276,710 B2 | 3/2016 | Damnjanovic et al. | |
| 9,288,545 B2 | 3/2016 | Hill et al. | |
| 9,317,688 B2 | 4/2016 | Yegin et al. | |
| 9,336,060 B2 | 5/2016 | Nori et al. | |
| 9,338,700 B2 | 5/2016 | Schulist et al. | |
| 9,344,888 B2 | 5/2016 | Starsinic et al. | |
| 9,363,764 B2 | 6/2016 | Black et al. | |
| 9,380,623 B2 | 6/2016 | Kim et al. | |
| 9,413,451 B2 | 8/2016 | Park et al. | |
| 9,559,797 B2 | 1/2017 | Liao et al. | |
| 9,992,553 B2 | 6/2018 | Bennett et al. | |
| 10,028,302 B2 | 7/2018 | Au et al. | |
| 10,110,595 B2 | 10/2018 | Choyi et al. | |
| 10,111,163 B2* | 10/2018 | Vrzic | H04W 28/0247 |
| 10,306,671 B2 | 5/2019 | Li et al. | |
| 10,432,362 B2 | 10/2019 | Iyer et al. | |
| 10,530,757 B2 | 1/2020 | Seed et al. | |
| 10,979,924 B2 | 4/2021 | Tooher et al. | |
| 11,051,293 B2 | 6/2021 | Tsai et al. | |
| 11,122,027 B2 | 9/2021 | Seed et al. | |
| 11,218,267 B2 | 1/2022 | Zhang et al. | |
| 11,871,451 B2 | 1/2024 | Awadin et al. | |
| 2002/0065678 A1 | 5/2002 | Peliotis et al. | |
| 2002/0120931 A1 | 8/2002 | Huber et al. | |
| 2002/0126990 A1 | 9/2002 | Rasmussen et al. | |
| 2002/0174425 A1 | 11/2002 | Markel et al. | |
| 2004/0032495 A1 | 2/2004 | Ortiz | |
| 2004/0190779 A1 | 9/2004 | Sarachik et al. | |
| 2005/0093976 A1 | 5/2005 | Valleriano et al. | |
| 2005/0286466 A1 | 12/2005 | Tagg et al. | |
| 2006/0155842 A1 | 7/2006 | Yeung et al. | |
| 2006/0193295 A1 | 8/2006 | White et al. | |
| 2007/0024706 A1 | 2/2007 | Brannon et al. | |
| 2007/0042784 A1 | 2/2007 | Anderson | |
| 2007/0086669 A1 | 4/2007 | Berger et al. | |
| 2007/0101418 A1 | 5/2007 | Wood et al. | |
| 2007/0104369 A1 | 5/2007 | Weatherhead | |
| 2007/0140106 A1 | 6/2007 | Tsai et al. | |
| 2007/0153739 A1 | 7/2007 | Zheng | |
| 2007/0171921 A1 | 7/2007 | Wookey et al. | |
| 2008/0102896 A1 | 5/2008 | Wang et al. | |
| 2008/0127253 A1 | 5/2008 | Zhang et al. | |
| 2008/0134305 A1 | 6/2008 | Hinton et al. | |
| 2008/0205351 A1 | 8/2008 | Lindoff et al. | |
| 2008/0225116 A1 | 9/2008 | Kang et al. | |
| 2008/0261711 A1 | 10/2008 | Tuxen | |
| 2009/0007023 A1 | 1/2009 | Sundstrom | |
| 2009/0046152 A1 | 2/2009 | Aman | |
| 2009/0047902 A1 | 2/2009 | Nory et al. | |
| 2009/0093792 A1 | 4/2009 | Gross et al. | |
| 2009/0147688 A1 | 6/2009 | Matsumoto et al. | |
| 2009/0197630 A1 | 8/2009 | Ahn et al. | |
| 2009/0201917 A1 | 8/2009 | Maes et al. | |
| 2009/0217339 A1 | 8/2009 | Kim et al. | |
| 2009/0220080 A1 | 9/2009 | Herne et al. | |
| 2009/0225164 A1 | 9/2009 | Renkis | |
| 2009/0247211 A1 | 10/2009 | Kuroda | |
| 2009/0276805 A1 | 11/2009 | Andrews et al. | |
| 2009/0298497 A1 | 12/2009 | Lee | |
| 2009/0300692 A1 | 12/2009 | Mavlankar et al. | |
| 2009/0305708 A1 | 12/2009 | Matsui et al. | |
| 2009/0316795 A1 | 12/2009 | Chui et al. | |
| 2009/0323607 A1 | 12/2009 | Park et al. | |
| 2010/0008318 A1 | 1/2010 | Wentink et al. | |
| 2010/0027466 A1 | 2/2010 | Mustapha | |
| 2010/0035611 A1 | 2/2010 | Montojo et al. | |
| 2010/0061361 A1 | 3/2010 | Wu | |
| 2010/0081445 A1 | 4/2010 | Aghili et al. | |
| 2010/0097221 A1 | 4/2010 | Kreiner et al. | |
| 2010/0177831 A1 | 7/2010 | Kim et al. | |
| 2010/0188531 A1 | 7/2010 | Cordes et al. | |
| 2010/0222081 A1 | 9/2010 | Ward et al. | |
| 2010/0227611 A1 | 9/2010 | Schmidt et al. | |
| 2010/0232504 A1 | 9/2010 | Feng | |
| 2011/0013836 A1 | 1/2011 | Gefen et al. | |
| 2011/0016321 A1 | 1/2011 | Sundaram et al. | |
| 2011/0039568 A1 | 2/2011 | Zhang et al. | |
| 2011/0077013 A1 | 3/2011 | Cho et al. | |
| 2011/0078529 A1 | 3/2011 | Wu et al. | |
| 2011/0092910 A1 | 4/2011 | Schultz | |
| 2011/0110327 A1 | 5/2011 | Ramachandran et al. | |
| 2011/0113480 A1 | 5/2011 | Ma et al. | |
| 2011/0170474 A1 | 7/2011 | Ji et al. | |
| 2011/0206155 A1 | 8/2011 | Fujimura et al. | |
| 2011/0222428 A1 | 9/2011 | Charbit et al. | |
| 2011/0231653 A1 | 9/2011 | Bollay et al. | |
| 2011/0242997 A1 | 10/2011 | Yin | |
| 2011/0263250 A1* | 10/2011 | Mueck .................. H04W 48/10 |
| | | | 455/434 |
| 2011/0299832 A1 | 12/2011 | Butcher | |
| 2011/0304772 A1 | 12/2011 | Dasher et al. | |
| 2011/0317665 A1 | 12/2011 | Jung et al. | |
| 2012/0009963 A1 | 1/2012 | Kim et al. | |
| 2012/0033647 A1 | 2/2012 | Moon et al. | |
| 2012/0047551 A1 | 2/2012 | Pattar et al. | |
| 2012/0056898 A1 | 3/2012 | Tsurumi et al. | |
| 2012/0062732 A1 | 3/2012 | Marman et al. | |
| 2012/0072952 A1 | 3/2012 | Vaysman et al. | |

(56) References Cited

U.S. PATENT DOCUMENTS

| | | |
|---|---|---|
| 2012/0078712 A1 | 3/2012 | Fontana et al. |
| 2012/0117140 A1 | 5/2012 | Wang et al. |
| 2012/0127934 A1 | 5/2012 | Anderson et al. |
| 2012/0163335 A1 | 6/2012 | Chung et al. |
| 2012/0177005 A1* | 7/2012 | Liang ..................... H04W 8/02 |
| | | 370/328 |
| 2012/0201230 A1 | 8/2012 | Wang et al. |
| 2012/0218882 A1 | 8/2012 | Ko |
| 2012/0238264 A1 | 9/2012 | Jindal |
| 2012/0275409 A1 | 11/2012 | Han et al. |
| 2012/0281594 A1 | 11/2012 | Stewart et al. |
| 2012/0287848 A1 | 11/2012 | Kim et al. |
| 2012/0308202 A1 | 12/2012 | Murata et al. |
| 2013/0003576 A1 | 1/2013 | Segura et al. |
| 2013/0016910 A1 | 1/2013 | Murata et al. |
| 2013/0017833 A1 | 1/2013 | Sakamoto et al. |
| 2013/0017836 A1 | 1/2013 | Chang et al. |
| 2013/0024288 A1 | 1/2013 | Espelien |
| 2013/0031582 A1 | 1/2013 | Tinsman et al. |
| 2013/0034071 A1 | 2/2013 | Lee et al. |
| 2013/0036442 A1 | 2/2013 | Wingert |
| 2013/0045011 A1 | 2/2013 | Zhang et al. |
| 2013/0077574 A1 | 3/2013 | Chandrasekhar et al. |
| 2013/0091430 A1 | 4/2013 | Zhai et al. |
| 2013/0091515 A1 | 4/2013 | Sakata et al. |
| 2013/0111609 A1* | 5/2013 | Resch ................. G06F 11/1076 |
| | | 726/29 |
| 2013/0142118 A1 | 6/2013 | Cherian et al. |
| 2013/0155106 A1 | 6/2013 | Rolleston et al. |
| 2013/0155847 A1 | 6/2013 | Li et al. |
| 2013/0163507 A1 | 6/2013 | Hoshino et al. |
| 2013/0163543 A1 | 6/2013 | Freda et al. |
| 2013/0167062 A1 | 6/2013 | Herring et al. |
| 2013/0183991 A1 | 7/2013 | Bosch et al. |
| 2013/0185353 A1 | 7/2013 | Rondao et al. |
| 2013/0188503 A1 | 7/2013 | Anepu et al. |
| 2013/0188515 A1 | 7/2013 | Pinheiro et al. |
| 2013/0223339 A1 | 8/2013 | Nakahara |
| 2013/0225184 A1 | 8/2013 | Liu et al. |
| 2013/0225189 A1 | 8/2013 | Moon et al. |
| 2013/0242882 A1 | 9/2013 | Blankenship et al. |
| 2013/0246784 A1 | 9/2013 | Zhang et al. |
| 2013/0265932 A1 | 10/2013 | Huang et al. |
| 2013/0266286 A1 | 10/2013 | Yu et al. |
| 2013/0267895 A1 | 10/2013 | Hemmingsen |
| 2013/0294506 A1 | 11/2013 | Kang et al. |
| 2013/0312042 A1 | 11/2013 | Shaw et al. |
| 2013/0336305 A1 | 12/2013 | Yan et al. |
| 2013/0342539 A1 | 12/2013 | Khan et al. |
| 2014/0003349 A1 | 1/2014 | Kang et al. |
| 2014/0022074 A1 | 1/2014 | Balinski et al. |
| 2014/0026052 A1 | 1/2014 | Thorwirth et al. |
| 2014/0029462 A1 | 1/2014 | Stewart |
| 2014/0033074 A1 | 1/2014 | Thibaux et al. |
| 2014/0036806 A1 | 2/2014 | Chen et al. |
| 2014/0045452 A1 | 2/2014 | Ma et al. |
| 2014/0059457 A1 | 2/2014 | Min |
| 2014/0082054 A1 | 3/2014 | Denoual et al. |
| 2014/0086177 A1* | 3/2014 | Adjakple .............. H04W 74/04 |
| | | 370/329 |
| 2014/0086217 A1 | 3/2014 | Park et al. |
| 2014/0089990 A1 | 3/2014 | Van et al. |
| 2014/0099965 A1 | 4/2014 | Bienas et al. |
| 2014/0126402 A1 | 5/2014 | Nam et al. |
| 2014/0126551 A1 | 5/2014 | Nammi et al. |
| 2014/0161002 A1 | 6/2014 | Gauvreau et al. |
| 2014/0168056 A1 | 6/2014 | Swaminathan et al. |
| 2014/0192767 A1 | 7/2014 | Au et al. |
| 2014/0195918 A1 | 7/2014 | Friedlander |
| 2014/0204247 A1 | 7/2014 | Bilgen et al. |
| 2014/0204854 A1 | 7/2014 | Freda et al. |
| 2014/0206854 A1 | 7/2014 | Bennett et al. |
| 2014/0215043 A1 | 7/2014 | Ryu et al. |
| 2014/0223095 A1* | 8/2014 | Storm ..................... G06F 3/067 |
| | | 711/114 |
| 2014/0245367 A1 | 8/2014 | Sasaki et al. |
| 2014/0254544 A1 | 9/2014 | Kar et al. |
| 2014/0269581 A1 | 9/2014 | Song et al. |
| 2014/0269932 A1 | 9/2014 | Su et al. |
| 2014/0279068 A1 | 9/2014 | Systrom et al. |
| 2014/0280781 A1 | 9/2014 | Gregotski |
| 2014/0282751 A1 | 9/2014 | Lee et al. |
| 2014/0282909 A1 | 9/2014 | Cherian et al. |
| 2014/0287743 A1 | 9/2014 | Yeh et al. |
| 2014/0293901 A1 | 10/2014 | Hegde |
| 2014/0293942 A1 | 10/2014 | Kang et al. |
| 2014/0314100 A1* | 10/2014 | Song ................... H04L 45/7453 |
| | | 370/431 |
| 2014/0315593 A1 | 10/2014 | Vrzic et al. |
| 2014/0321375 A1 | 10/2014 | Agiwal et al. |
| 2014/0351891 A1* | 11/2014 | Grube ................. G06F 11/0727 |
| | | 726/3 |
| 2014/0369201 A1* | 12/2014 | Gupta ..................... H04W 4/70 |
| | | 370/235 |
| 2014/0372774 A1 | 12/2014 | Li et al. |
| 2015/0014773 A1 | 1/2015 | Cheng et al. |
| 2015/0032901 A1 | 1/2015 | Wang et al. |
| 2015/0033312 A1 | 1/2015 | Seed et al. |
| 2015/0039666 A1* | 2/2015 | McShane .............. G06F 3/0619 |
| | | 709/201 |
| 2015/0043520 A1 | 2/2015 | Sun et al. |
| 2015/0070587 A1 | 3/2015 | Emeott et al. |
| 2015/0089023 A1 | 3/2015 | Phillips et al. |
| 2015/0089072 A1 | 3/2015 | Phillips et al. |
| 2015/0100662 A1* | 4/2015 | Kaczmarek ......... G06F 11/1076 |
| | | 709/213 |
| 2015/0103725 A1 | 4/2015 | Sun et al. |
| 2015/0104155 A1 | 4/2015 | Bloch et al. |
| 2015/0131536 A1 | 5/2015 | Kaur et al. |
| 2015/0145782 A1 | 5/2015 | Brown et al. |
| 2015/0162966 A1 | 6/2015 | Kim et al. |
| 2015/0179219 A1 | 6/2015 | Gao et al. |
| 2015/0208103 A1 | 7/2015 | Guntur et al. |
| 2015/0222815 A1 | 8/2015 | Wang et al. |
| 2015/0223279 A1 | 8/2015 | Jiao et al. |
| 2015/0230234 A1 | 8/2015 | Choi et al. |
| 2015/0234708 A1* | 8/2015 | Storm ..................... G06F 3/067 |
| | | 714/6.22 |
| 2015/0264096 A1 | 9/2015 | Swaminathan et al. |
| 2015/0268822 A1 | 9/2015 | Waggoner et al. |
| 2015/0282130 A1 | 10/2015 | Webb et al. |
| 2015/0296250 A1 | 10/2015 | Casper |
| 2015/0304693 A1 | 10/2015 | Hwang et al. |
| 2015/0326353 A1 | 11/2015 | Ko et al. |
| 2015/0326484 A1 | 11/2015 | Cao et al. |
| 2015/0327245 A1 | 11/2015 | Zhu et al. |
| 2015/0341091 A1 | 11/2015 | Park et al. |
| 2015/0341837 A1* | 11/2015 | Zhao ..................... H04W 48/18 |
| | | 455/436 |
| 2015/0348247 A1 | 12/2015 | McLaughlin et al. |
| 2015/0351084 A1 | 12/2015 | Werb |
| 2015/0373740 A1* | 12/2015 | Eriksson .............. H04B 17/309 |
| | | 370/329 |
| 2015/0382262 A1* | 12/2015 | Cho ..................... H04L 47/823 |
| | | 370/331 |
| 2015/0382268 A1 | 12/2015 | Hampel et al. |
| 2016/0020877 A1 | 1/2016 | Koutsimanis et al. |
| 2016/0036578 A1 | 2/2016 | Malladi et al. |
| 2016/0042496 A1 | 2/2016 | Ichimi et al. |
| 2016/0050658 A1 | 2/2016 | Tabet et al. |
| 2016/0057494 A1 | 2/2016 | Hwang et al. |
| 2016/0066255 A1 | 3/2016 | Marinier et al. |
| 2016/0073106 A1 | 3/2016 | Su et al. |
| 2016/0073302 A1 | 3/2016 | Yang et al. |
| 2016/0100395 A1 | 4/2016 | Xu et al. |
| 2016/0113039 A1 | 4/2016 | Hole et al. |
| 2016/0135153 A1 | 5/2016 | Suzuki et al. |
| 2016/0156397 A1 | 6/2016 | Onggosanusi et al. |
| 2016/0156949 A1 | 6/2016 | Hattori et al. |
| 2016/0165309 A1 | 6/2016 | Van et al. |
| 2016/0165622 A1 | 6/2016 | Luo et al. |
| 2016/0182201 A1 | 6/2016 | Jiang et al. |
| 2016/0182593 A1 | 6/2016 | Denoual et al. |

(56) References Cited

U.S. PATENT DOCUMENTS

| | | | |
|---|---|---|---|
| 2016/0183234 A1 | 6/2016 | Sung et al. | |
| 2016/0192433 A1 | 6/2016 | Deenoo et al. | |
| 2016/0198406 A1* | 7/2016 | Höglund | H04W 48/08 |
| | | | 370/311 |
| 2016/0205991 A1 | 7/2016 | Short et al. | |
| 2016/0212631 A1 | 7/2016 | Shen et al. | |
| 2016/0217623 A1 | 7/2016 | Singh | |
| 2016/0218786 A1 | 7/2016 | Mizusawa | |
| 2016/0234736 A1 | 8/2016 | Kubota et al. | |
| 2016/0234759 A1 | 8/2016 | Kubota et al. | |
| 2016/0249269 A1 | 8/2016 | Niu et al. | |
| 2016/0249353 A1 | 8/2016 | Nakata et al. | |
| 2016/0253240 A1* | 9/2016 | Cocagne | G06F 3/0619 |
| | | | 714/764 |
| 2016/0266839 A1* | 9/2016 | Storm | G06F 11/1076 |
| 2016/0270102 A1 | 9/2016 | Zeng et al. | |
| 2016/0286560 A1 | 9/2016 | Gao et al. | |
| 2016/0298094 A1 | 10/2016 | Binder et al. | |
| 2016/0306036 A1 | 10/2016 | Johnson | |
| 2016/0308637 A1* | 10/2016 | Frenne | H04W 56/0015 |
| 2016/0309376 A1 | 10/2016 | Liu et al. | |
| 2016/0337706 A1 | 11/2016 | Hwang et al. | |
| 2016/0337881 A1 | 11/2016 | Zhang et al. | |
| 2016/0344464 A1 | 11/2016 | Kim | |
| 2016/0352545 A1 | 12/2016 | Johnson | |
| 2016/0353343 A1 | 12/2016 | Rahman et al. | |
| 2016/0353465 A1* | 12/2016 | Vrzic | H04L 41/5054 |
| 2016/0360235 A1 | 12/2016 | Ramasubramonian et al. | |
| 2016/0366454 A1 | 12/2016 | Tatourian et al. | |
| 2016/0381674 A1 | 12/2016 | Kim et al. | |
| 2017/0013598 A1 | 1/2017 | Jung et al. | |
| 2017/0029005 A1 | 2/2017 | Spernoga | |
| 2017/0034845 A1 | 2/2017 | Liu et al. | |
| 2017/0048826 A1 | 2/2017 | Kishiyama | |
| 2017/0070735 A1 | 3/2017 | Ramasubramonian et al. | |
| 2017/0079059 A1* | 3/2017 | Li | H04W 16/02 |
| 2017/0080157 A1 | 3/2017 | Cabiri et al. | |
| 2017/0080158 A1 | 3/2017 | Cabiri et al. | |
| 2017/0086174 A1 | 3/2017 | Zhang | |
| 2017/0099667 A1 | 4/2017 | Dinan | |
| 2017/0118054 A1 | 4/2017 | Ma et al. | |
| 2017/0118540 A1 | 4/2017 | Thomas et al. | |
| 2017/0126365 A1 | 5/2017 | Peng et al. | |
| 2017/0134913 A1 | 5/2017 | Cui et al. | |
| 2017/0136948 A1 | 5/2017 | Sypitkowski et al. | |
| 2017/0142591 A1* | 5/2017 | Vrzic | H04W 76/12 |
| 2017/0149480 A1 | 5/2017 | Kakishima et al. | |
| 2017/0150367 A1 | 5/2017 | Han et al. | |
| 2017/0163645 A1 | 6/2017 | Bradley et al. | |
| 2017/0164212 A1* | 6/2017 | Opsenica | G06F 16/41 |
| 2017/0164349 A1* | 6/2017 | Zhu | H04W 72/048 |
| 2017/0192700 A1* | 7/2017 | Wozniak | G06F 3/0653 |
| 2017/0201686 A1 | 7/2017 | Choi et al. | |
| 2017/0201968 A1 | 7/2017 | Nam et al. | |
| 2017/0201980 A1 | 7/2017 | Hakola et al. | |
| 2017/0207895 A1 | 7/2017 | Yang et al. | |
| 2017/0212583 A1 | 7/2017 | Krasadakis | |
| 2017/0215172 A1 | 7/2017 | Yang et al. | |
| 2017/0230915 A1 | 8/2017 | Kim et al. | |
| 2017/0230985 A1 | 8/2017 | Yamada et al. | |
| 2017/0236288 A1 | 8/2017 | Sundaresan et al. | |
| 2017/0244529 A1 | 8/2017 | Yu et al. | |
| 2017/0257886 A1* | 9/2017 | Adjakple | H04W 74/04 |
| 2017/0265225 A1 | 9/2017 | Takeda et al. | |
| 2017/0273063 A1 | 9/2017 | Kim et al. | |
| 2017/0289791 A1* | 10/2017 | Yoo | H04W 76/11 |
| 2017/0290008 A1 | 10/2017 | Tooher et al. | |
| 2017/0290052 A1 | 10/2017 | Zhang et al. | |
| 2017/0302719 A1 | 10/2017 | Chen et al. | |
| 2017/0307706 A1* | 10/2017 | Cloos | G01R 33/4835 |
| 2017/0310431 A1 | 10/2017 | Iyer et al. | |
| 2017/0318583 A1 | 11/2017 | Green | |
| 2017/0331577 A1* | 11/2017 | Parkvall | H04W 8/18 |
| 2017/0331670 A1* | 11/2017 | Parkvall | H04J 11/0079 |
| 2017/0331785 A1* | 11/2017 | Xu | H04W 76/11 |
| 2017/0332359 A1 | 11/2017 | Tsai et al. | |
| 2017/0332421 A1* | 11/2017 | Sternberg | H04W 72/51 |
| 2017/0347332 A1* | 11/2017 | Cui | H04W 8/24 |
| 2017/0353927 A1* | 12/2017 | Neubacher | H04W 52/0248 |
| 2017/0359731 A1 | 12/2017 | Soldati et al. | |
| 2017/0366311 A1 | 12/2017 | Iyer et al. | |
| 2017/0374646 A1* | 12/2017 | Takeda | H04W 68/02 |
| 2018/0012376 A1 | 1/2018 | Dayal et al. | |
| 2018/0012459 A1 | 1/2018 | Dragone et al. | |
| 2018/0019936 A1 | 1/2018 | Batiz | |
| 2018/0024230 A1 | 1/2018 | Frayer | |
| 2018/0034612 A1 | 2/2018 | Lin et al. | |
| 2018/0076994 A1 | 3/2018 | Lee et al. | |
| 2018/0115357 A1 | 4/2018 | Park et al. | |
| 2018/0123763 A1 | 5/2018 | Yu | |
| 2018/0124598 A1* | 5/2018 | Zeng | H04L 63/0428 |
| 2018/0124790 A1 | 5/2018 | Yerramalli | |
| 2018/0139656 A1 | 5/2018 | Xu et al. | |
| 2018/0167938 A1 | 6/2018 | Stephenne et al. | |
| 2018/0167960 A1 | 6/2018 | Zhang et al. | |
| 2018/0184413 A1* | 6/2018 | Rong | H04W 76/10 |
| 2018/0184415 A1* | 6/2018 | Rong | H04W 40/20 |
| 2018/0198504 A1 | 7/2018 | Li et al. | |
| 2018/0199361 A1 | 7/2018 | Zhang et al. | |
| 2018/0220407 A1 | 8/2018 | Xiong et al. | |
| 2018/0241525 A1 | 8/2018 | Ouchi et al. | |
| 2018/0242224 A1* | 8/2018 | Pinheiro | H04W 48/16 |
| 2018/0242304 A1 | 8/2018 | Rong et al. | |
| 2018/0254851 A1 | 9/2018 | Roessel et al. | |
| 2018/0270696 A1* | 9/2018 | Duan | H04W 28/24 |
| 2018/0270698 A1 | 9/2018 | Babaei et al. | |
| 2018/0279368 A1 | 9/2018 | Butt et al. | |
| 2018/0287722 A1 | 10/2018 | Takano | |
| 2018/0294860 A1 | 10/2018 | Hakola et al. | |
| 2018/0317213 A1 | 11/2018 | Islam et al. | |
| 2018/0324604 A1 | 11/2018 | Yang et al. | |
| 2018/0332632 A1* | 11/2018 | Vikberg | H04W 76/10 |
| 2018/0338277 A1 | 11/2018 | Byun et al. | |
| 2018/0343043 A1 | 11/2018 | Hakola et al. | |
| 2018/0352501 A1* | 12/2018 | Zhang | H04W 48/14 |
| 2018/0367255 A1 | 12/2018 | Jeon et al. | |
| 2018/0368018 A1 | 12/2018 | Kim et al. | |
| 2018/0376407 A1* | 12/2018 | Myhre | H04W 74/0833 |
| 2018/0376412 A1* | 12/2018 | Bischinger | H04W 8/08 |
| 2019/0014470 A1* | 1/2019 | Bischinger | H04W 76/11 |
| 2019/0014515 A1* | 1/2019 | Zee | H04W 36/0027 |
| 2019/0021047 A1* | 1/2019 | Zong | H04W 48/18 |
| 2019/0021125 A1* | 1/2019 | Bischinger | H04W 76/11 |
| 2019/0028941 A1* | 1/2019 | Zee | H04W 36/0077 |
| 2019/0028943 A1* | 1/2019 | Wang | H04W 8/065 |
| 2019/0036910 A1 | 1/2019 | Choyi et al. | |
| 2019/0037409 A1* | 1/2019 | Wang | H04W 8/08 |
| 2019/0045340 A1 | 2/2019 | Zhu et al. | |
| 2019/0045351 A1* | 2/2019 | Zee | H04W 76/11 |
| 2019/0045577 A1 | 2/2019 | Kim et al. | |
| 2019/0089423 A1 | 3/2019 | Davydov | |
| 2019/0090284 A1 | 3/2019 | Kang et al. | |
| 2019/0098569 A1* | 3/2019 | Hou | G06F 16/2471 |
| 2019/0104551 A1* | 4/2019 | Deenoo | H04W 72/0446 |
| 2019/0123864 A1 | 4/2019 | Zhang et al. | |
| 2019/0132781 A1* | 5/2019 | Arnold | H04W 36/22 |
| 2019/0159089 A1* | 5/2019 | Shi | H04W 8/12 |
| 2019/0159107 A1* | 5/2019 | Kim | H04W 60/00 |
| 2019/0159110 A1 | 5/2019 | Takahashi et al. | |
| 2019/0166627 A1 | 5/2019 | Takeda et al. | |
| 2019/0174398 A1 | 6/2019 | Geng et al. | |
| 2019/0182296 A1* | 6/2019 | Zeng | H04L 65/1069 |
| 2019/0182856 A1 | 6/2019 | Moroga et al. | |
| 2019/0190579 A1 | 6/2019 | Wang et al. | |
| 2019/0200315 A1 | 6/2019 | Tsai et al. | |
| 2019/0208474 A1 | 7/2019 | Ali et al. | |
| 2019/0224474 A1 | 7/2019 | Yang et al. | |
| 2019/0281623 A1 | 9/2019 | Andgart et al. | |
| 2019/0288789 A1 | 9/2019 | Li et al. | |
| 2019/0342782 A1 | 11/2019 | Yum et al. | |
| 2019/0363777 A1 | 11/2019 | Karjalainen et al. | |
| 2020/0021999 A1 | 1/2020 | Park et al. | |
| 2020/0059969 A1 | 2/2020 | Agiwal | |
| 2020/0092065 A1 | 3/2020 | Kuang et al. | |

(56) References Cited

U.S. PATENT DOCUMENTS

| | | | |
|---|---|---|---|
| 2020/0169369 A1 | 5/2020 | Gao et al. | |
| 2020/0221480 A1 | 7/2020 | Li et al. | |
| 2020/0280911 A1* | 9/2020 | Duan | H04W 48/18 |
| 2020/0305054 A1* | 9/2020 | Zee | H04W 36/0061 |
| 2020/0314924 A1* | 10/2020 | Bischinger | H04W 76/11 |
| 2020/0351917 A1 | 11/2020 | Bang et al. | |
| 2020/0359391 A1 | 11/2020 | Behravan et al. | |
| 2020/0383129 A1 | 12/2020 | Ko et al. | |
| 2020/0404655 A1 | 12/2020 | Salem | |
| 2020/0404663 A1 | 12/2020 | Zhang et al. | |
| 2021/0013984 A1 | 1/2021 | Frenne et al. | |
| 2021/0021314 A1 | 1/2021 | Sun et al. | |
| 2021/0029646 A1 | 1/2021 | Park | |
| 2021/0037561 A1 | 2/2021 | Lyu et al. | |
| 2021/0044385 A1 | 2/2021 | Hosseini et al. | |
| 2021/0045125 A1 | 2/2021 | Mondal et al. | |
| 2021/0045181 A1 | 2/2021 | Li et al. | |
| 2021/0051646 A1 | 2/2021 | Maaref et al. | |
| 2021/0068138 A1 | 3/2021 | Baldemair et al. | |
| 2021/0105104 A1 | 4/2021 | Cao et al. | |
| 2021/0105833 A1 | 4/2021 | Freda et al. | |
| 2021/0130629 A1 | 5/2021 | Suzuki et al. | |
| 2022/0039158 A1 | 2/2022 | Awadin et al. | |

FOREIGN PATENT DOCUMENTS

| | | |
|---|---|---|
| CN | 101331735 A | 12/2008 |
| CN | 101350923 A | 1/2009 |
| CN | 101622891 A | 1/2010 |
| CN | 101690271 A | 3/2010 |
| CN | 101868273 A | 10/2010 |
| CN | 101917765 A | 12/2010 |
| CN | 102026270 A | 4/2011 |
| CN | 102038998 A | 5/2011 |
| CN | 102045849 A | 5/2011 |
| CN | 102090126 A | 6/2011 |
| CN | 102238547 A | 11/2011 |
| CN | 102474394 A | 5/2012 |
| CN | 102474886 A | 5/2012 |
| CN | 102577294 A | 7/2012 |
| CN | 102726109 A | 10/2012 |
| CN | 102752877 A | 10/2012 |
| CN | 102907068 A | 1/2013 |
| CN | 102939573 A | 2/2013 |
| CN | 102971032 A | 3/2013 |
| CN | 103069739 A | 4/2013 |
| CN | 103190089 A | 7/2013 |
| CN | 103339893 A | 10/2013 |
| CN | 103354489 A | 10/2013 |
| CN | 103370896 A | 10/2013 |
| CN | 103404046 A | 11/2013 |
| CN | 103460740 A | 12/2013 |
| CN | 103560936 A | 2/2014 |
| CN | 103563462 A | 2/2014 |
| CN | 103944686 A | 7/2014 |
| CN | 104012106 A | 8/2014 |
| CN | 104012159 A | 8/2014 |
| CN | 104052788 A | 9/2014 |
| CN | 104067688 A | 9/2014 |
| CN | 104092488 A | 10/2014 |
| CN | 104205930 A | 12/2014 |
| CN | 104220975 A | 12/2014 |
| CN | 104380642 A | 2/2015 |
| CN | 104394558 A | 3/2015 |
| CN | 104428998 A | 3/2015 |
| CN | 104618000 A | 5/2015 |
| CN | 104753780 A | 7/2015 |
| CN | 104782166 A | 7/2015 |
| CN | 104838713 A | 8/2015 |
| CN | 104869583 A | 8/2015 |
| CN | 104936189 A | 9/2015 |
| CN | 105007626 A | 10/2015 |
| CN | 105050189 A | 11/2015 |
| CN | 105103566 A | 11/2015 |
| CN | 105144727 A | 12/2015 |
| CN | 105162557 A | 12/2015 |
| CN | 105264904 A | 1/2016 |
| CN | 105284172 A | 1/2016 |
| CN | 105323049 A | 2/2016 |
| CN | 105376866 A | 3/2016 |
| CN | 105471487 A | 4/2016 |
| CN | 105532050 A | 4/2016 |
| CN | 106023261 A | 10/2016 |
| CN | 106233745 A | 12/2016 |
| CN | 106416223 A | 2/2017 |
| CN | 106664568 A | 5/2017 |
| CN | 106686603 A | 5/2017 |
| CN | 106788936 A | 5/2017 |
| CN | 107007910 A | 8/2017 |
| CN | 108174454 A | 6/2018 |
| CN | 108353395 A | 7/2018 |
| EP | 0246076 A1 | 11/1987 |
| EP | 1175785 A1 | 1/2002 |
| EP | 2086266 A2 | 8/2009 |
| EP | 2265077 A1 | 12/2010 |
| EP | 2408196 A1 | 1/2012 |
| EP | 2426645 A1 | 3/2012 |
| EP | 2464076 A2 | 6/2012 |
| EP | 2530675 A2 | 12/2012 |
| EP | 2553860 A1 | 2/2013 |
| EP | 2710844 A1 | 3/2014 |
| EP | 2824883 A1 | 1/2015 |
| EP | 2824885 A1 | 1/2015 |
| EP | 2869478 A1 | 5/2015 |
| EP | 2882110 A1 | 6/2015 |
| EP | 2919471 A1 | 9/2015 |
| EP | 2632058 B1 | 1/2016 |
| EP | 2963977 A1 | 1/2016 |
| EP | 3051906 A1 | 8/2016 |
| EP | 3076672 A1 | 10/2016 |
| EP | 3082362 A1 | 10/2016 |
| EP | 3101971 A1 | 12/2016 |
| EP | 3110160 A1 | 12/2016 |
| EP | 3420659 A1 | 1/2019 |
| EP | 3089408 B1 | 4/2019 |
| IN | 105373331 A | 3/2016 |
| JP | 63-013503 A | 1/1988 |
| JP | 02-464076 A | 2/1990 |
| JP | 2004-104351 A | 4/2004 |
| JP | 2007-192988 A | 8/2007 |
| JP | 2010-506434 A | 2/2010 |
| JP | 2010-050269 A | 3/2010 |
| JP | 2010-508789 A | 3/2010 |
| JP | 2010-519838 A | 6/2010 |
| JP | 2012-507961 A | 3/2012 |
| JP | 2013510515 A | 3/2013 |
| JP | 2013-522965 A | 6/2013 |
| JP | 2013-541289 A | 11/2013 |
| JP | 2014-502128 A | 1/2014 |
| JP | 2014-525191 A | 9/2014 |
| JP | 2014-530534 A | 11/2014 |
| JP | 2015-207934 A | 11/2015 |
| JP | 2016-013351 A | 1/2016 |
| JP | 2016-504798 A | 2/2016 |
| JP | 2016-504851 A | 2/2016 |
| JP | 2016-514416 A | 5/2016 |
| JP | 2017533620 A | 11/2017 |
| JP | 6313503 B1 | 4/2018 |
| JP | 2019-518364 A | 6/2019 |
| JP | 2019-525616 A | 9/2019 |
| KR | 2003-0089363 A | 11/2003 |
| KR | 10-2008-0041237 A | 5/2008 |
| KR | 10-2008-0109535 A | 12/2008 |
| KR | 10-2009-0085640 A | 8/2009 |
| KR | 10-2010-0065327 A | 6/2010 |
| KR | 10-2010-0097625 A | 9/2010 |
| KR | 2011-0055363 A | 5/2011 |
| KR | 10-2011-0063565 A | 6/2011 |
| KR | 10-2013-0029374 A | 3/2013 |
| KR | 10-2014-0043532 A | 4/2014 |
| KR | 10-2014-0098156 A | 8/2014 |
| KR | 10-2014-0123870 A | 10/2014 |
| KR | 10-2015-0118874 A | 10/2015 |
| KR | 10-2015-0119355 A | 10/2015 |

(56)                    References Cited

FOREIGN PATENT DOCUMENTS

| KR | 10-1563469 | B1 | 10/2015 |
|----|------------|----|---------|
| KR | 10-2016-0021141 | A | 2/2016 |
| KR | 10-2016-0055086 | A | 5/2016 |
| KR | 2016-0086904 | A | 7/2016 |
| KR | 10-2017-0128515 | A | 11/2017 |
| KR | 10-2019-0089423 | A | 7/2019 |
| KR | 2019-0089423 | A | 7/2019 |
| WO | 00/65837 | A1 | 11/2000 |
| WO | 01/18658 | A1 | 3/2001 |
| WO | 2007/052753 | A1 | 5/2007 |
| WO | 2007/125910 | A1 | 11/2007 |
| WO | 2010/001474 | A1 | 1/2010 |
| WO | 2010/021705 | A1 | 2/2010 |
| WO | 2010/050269 | A1 | 5/2010 |
| WO | 2010/082805 | A2 | 7/2010 |
| WO | WO 2011/053970 | A2 | 5/2011 |
| WO | 2011/082150 | A1 | 7/2011 |
| WO | 2011/097904 | A1 | 8/2011 |
| WO | 2011/123805 | A1 | 10/2011 |
| WO | 2012/021246 | A2 | 2/2012 |
| WO | WO 2012/078565 | A1 | 6/2012 |
| WO | 2012/114666 | A1 | 8/2012 |
| WO | 2012/130180 | A1 | 10/2012 |
| WO | 2012/141557 | A2 | 10/2012 |
| WO | 2012/155326 | A1 | 11/2012 |
| WO | 2014/057131 | A1 | 4/2014 |
| WO | 2014/059591 | A1 | 4/2014 |
| WO | 2014/067566 | A1 | 5/2014 |
| WO | 2014/090200 | A1 | 6/2014 |
| WO | 2014/090208 | | 6/2014 |
| WO | 2014/111423 | A1 | 7/2014 |
| WO | 2014/135126 | A1 | 9/2014 |
| WO | 2014145947 | A1 | 9/2014 |
| WO | 2014/183803 | A1 | 11/2014 |
| WO | 2014/190308 | A1 | 11/2014 |
| WO | 2015/013645 | A1 | 1/2015 |
| WO | 2015/013685 | A1 | 1/2015 |
| WO | WO 2015/025838 | A1 | 2/2015 |
| WO | 2015/045658 | A1 | 4/2015 |
| WO | 2015/059194 | A1 | 4/2015 |
| WO | 2015/067196 | A1 | 5/2015 |
| WO | 2015/080646 | A1 | 6/2015 |
| WO | 2015/084048 | A1 | 6/2015 |
| WO | 2015/100533 | A1 | 7/2015 |
| WO | 2015/113205 | A1 | 8/2015 |
| WO | 2015/122737 | A1 | 8/2015 |
| WO | 2015/141982 | A1 | 9/2015 |
| WO | 2015/166840 | A1 | 11/2015 |
| WO | 2016/013351 | A1 | 1/2016 |
| WO | 2016/028111 | A1 | 2/2016 |
| WO | 2016021957 | A1 | 2/2016 |
| WO | WO 2016/021954 | A1 | 2/2016 |
| WO | 2016/033731 | A1 | 3/2016 |
| WO | 2016/040290 | A1 | 3/2016 |
| WO | 2016/040833 | A1 | 3/2016 |
| WO | 2016/094191 | A1 | 6/2016 |
| WO | WO 2016/130353 | A2 | 8/2016 |
| WO | 2017/061297 | A1 | 4/2017 |
| WO | 2017/147515 | A1 | 8/2017 |
| WO | 2017/191833 | A1 | 11/2017 |
| WO | WO 2017/195478 | A1 | 11/2017 |
| WO | WO 2017/197125 | A1 | 11/2017 |
| WO | WO 2018/028602 | A1 | 2/2018 |
| WO | WO 2018/030804 | A1 | 2/2018 |
| WO | WO 2018/031875 | A1 | 2/2018 |

OTHER PUBLICATIONS

Samsung: "Signaling of Slot Structure", 3GPP Draft; R1-1609127, 3rd Generation Partnership Project (3GPP), Mobile Competence Centre; 650, Route Des Lucioles; F-06921 Sophia Anti Polis Ceo Ex ; France, RAN WG1, No. Lisbon, Portugal; 2016101 O-20161014 Sep. 30, 2016.

Qualcomm Incorporated: "Frame structure requirements", 3GPP Draft; vol. RAN WG1, No. Nanjing, China; May 14, 2016.
NGMN 5G Initiative White Paper v1.0, Feb. 17, 2015, 125 pages.
International Telecommunication Union (ITU-R), "IMT Vision—Framework and overall objectives of the future development of IMT for 2020 and beyond", Recommendation ITU-R M.2083-0, Sep. 2015, 21 pages.
IEEE P802.11, Wireless LANs, Proposed TGax draft specification, Comment Resolutions on UL MU Operation, Jul. 25, 2016, 27 pages.
Chu, David, "Polyphase Codes With Good Periodic Correlation Properties", IEEE Transactions on Information Theory, Jul. 1972, 531-532.
Budisin S. "Decimation Generator of Zadoff-Chu Sequences", In: Carlet C., Pott A. (eds) Sequences and Their Applications—SETA 2010. SETA 2010. Lecture Notes in Computer Science, vol. 6338. Springer, Berlin, Heidelberg, 2010, 40 pages.
3rd Generation Partnership Project; (3GPP) TSG-RAN WG1 #86bis, R1-1610177, "DL Control Channels Overview", Qualcomm Incorporated, Oct. 10-14, 2016, Lisbon, Portugal, Discussion, Oct. 1, 2016, 6 pages.
3rd Generation Partnership Project; (3GPP) TS 36.331 V13.0.0, Technical Specification Group Radio Access Network; Evolved Universal Terrestrial Radio Access (E-UTRA); Radio Resource Control (RRC); Protocol specification (Release 13), Dec. 2015, 507 pages.
3rd Generation Partnership Project; (3GPP) TS 36.304 V13.0.0, 3rd Generation Partnership Project; Technical Specification Group Radio Access Network; Evolved Universal Terrestrial Radio Access (E-UTRA); User Equipment (UE) Procedures in idle Mode (Release 13), Dec. 2015, 42 pages.
3rd Generation Partnership Project; (3GPP) TS 36.211 V13.1.0, 3rd Generation Partnership Project; Technical Specification Group Radio Access Network; Evolved Universal Terrestrial Radio Access (E-UTRA); Physical Channels and Modulation (Release 13), Mar. 2016, 155 pages.
3rd Generation Partnership Project; (3GPP) TR 38.913 V0.2.0, 3rd Generation Partnership Project; Technical Specification Group Radio Access Network; Study on Scenarios and Requirements for Next Generation Access Technologies; (Release 14), Feb. 2016, 19 pages.
3rd Generation Partnership Project; (3GPP) TR 23.799, "Technical Specification Group Services and System Aspects; Study on Architecture for Next Generation System (Release 14)", vol. SA WG2, No. V0.5.0, Jun. 8, 2016, pp. 1-179.
3rd Generation Partnership Project; (3GPP) TR 22.891 V1.1.0, 3rd Generation Partnership Project; Technical Specification Group Services and System Aspects; Feasibility Study on New Services and Markets Technology Enablers; Stage 1 (Release 14), Nov. 2015, 95 pages.
3rd Generation Partnership Project (3GPP), TSG RAN WG1 Meeting #86, "RAN1 Chairman's Notes", Gothenburg, Sweden, Aug. 22-26, 2016, 105 pages.
3rd Generation Partnership Project (3GPP), TS 36.212 V10.8.0, RAN WG1, Technical Specification Group Radio Access Network; Evolved Universal Terrestrial Radio Access (E-UTRA); Multiplexing and Channel Coding (Release 10), Jun. 17, 2013, pp. 1-79.
3rd Generation Partnership Project (3GPP) TSG-RAN WG2 Meeting #94, R2-163718 "Control Plane functions in NR", Nanjing, China; May 23-27, 2016, 4 pages.
3rd Generation Partnership Project (3GPP) TSG-RAN WG2 Meeting #94 R2-163371, "System Information Signalling Design in NR", May 23-27, 2016, 7 pages.
3rd Generation Partnership Project (3GPP) TSG-RAN WG1#85, R1-165363, Nokia, Alcatel-Lucent Shanghai Bell, Scalability of MIMO Operation Across NR Carrier Frequencies, Nanjing, P.R. China, May 23-27, 2016, 5 pages.
3rd Generation Partnership Project (3GPP) TSG-RAN WG1#85 R1-165027 "Basic Frame Structure Principles for 5G" May 23-27, 2016, 6 pages.
3rd Generation Partnership Project (3GPP) TSG-RAN WG1 #85, R1-164628, Frame Structure for NR, Ericsson, Nanjing, China, May 23-27, 2016, 3 pages.

(56) References Cited

OTHER PUBLICATIONS

3rd Generation Partnership Project (3GPP) TSG RAN WG1 Meeting #86bis R1-1610524, WF on NR RS Definition, Huawei, HiSilicon, Lisbon, Portugal, Oct. 10-14, 2016, Agenda Item: 8.1.4.4, 4 pages.

3rd Generation Partnership Project (3GPP) TSG RAN WG1 Meeting #85, R1-165174, Uplink Multiple Access Schemes for NR, May 23-27, 2016, 4 pages.

3rd Generation Partnership Project (3GPP) TSG RAN WG1 Meeting #85 R1-164871 "Frame structure for new radio interface", May 23-27, 2016, 3 pages.

3rd Generation Partnership Project (3GPP) TSG RAN WG1 Meeting #84bis, R1-162379, Overview of New Radio Access Technology Requirements and Designs, Apr. 11-15, 2016, 4 pages.

3rd Generation Partnership Project (3GPP) TSG RAN WG1 Meeting #84bis R1-162797, "Harq Enhancement for Improved Data Channel Efficiency", Busan, Korea, Apr. 11-15, 2016, 3 pages.

3rd Generation Partnership Project (3GPP) TSG RAN WG1 Meeting #83 R1-157351, Initial Views on Technical Design for NB-IoT, Nov. 15-22, 2015, 3 pages.

3rd Generation Partnership Project (3GPP) TSG RAN WG1 #85, R1-165669, Way Forward on Frame Structure, Qualcomm and etc., Nanjing, China, May 23-27, 2016, Agenda Item 7.1.4, 2 pages.

3rd Generation Partnership Project (3GPP) TSG RAN WG1 #85, R1-164014, Discussion on RS for Beamformed Access, Samsung, Nanjing, China, May 23-27, 2016, 3 pages.

3rd Generation Partnership Project (3GPP) TSG RAN WG1 #85, R1-164013, Framework for Beamformed Access, Samsung, Nanjing, China, May 23-27, 2016, 4 pages.

3rd Generation Partnership Project (3GPP) TSG RAN WG1 #84bis Meeting, R1-163757, Way Forward on Channel Coding Evaluation for 5G New Radio, Busan, Korea, Apr. 11-15, 2016, Agenda Item 8.1.6.1, 5 pages.

3rd Generation Partnership Project (3GPP) TS 36.321 V13.0.0, Technical Specification Group Radio Access Network, Evolved Universal Terrestrial Radio Access (E-UTRA), Medium Access Control (MAC) protocol specification (Release 13), Dec. 2015, 82 pages.

3rd Generation Partnership Project (3GPP) TS 36.300 V13.3.0, Technical Specification Group Radio Access Network, Evolved Universal Terrestrial Radio Access (E-UTRA) and Evolved Universal Terrestrial Radio Access Network (E-UTRAN), Overall description; Stage 2 (Release 13), Mar. 2016, 295 pages.

3rd Generation Partnership Project (3GPP) TS 36.213 V13.0.0, Technical Specification Group Radio Access Network, Evolved Universal Terrestrial Radio Access (E-UTRA), Physical layer procedures (Release 13), Dec. 2015, 326 pages.

3rd Generation Partnership Project (3GPP) TS 36.133 V14.7.0, Technical Specification Group Radio Access Network, Evolved Universal Terrestrial Radio Access (E-UTRA), Requirements for support of radio resource management (Release 14), Mar. 2018, 2997 pages.

3rd Generation Partnership Project (3GPP) TS 24.302 V13.5.0, Technical Specification Group Core Network and Terminals, Access to the 3GPP Evolved Packet Core (EPC) via non-3GPP access networks; Stage 3 (Release 13), Mar. 2016, 126 pages.

3rd Generation Partnership Project (3GPP) TS 23.401 V13.6.1, Technical Specification Group Services and System Aspects, General Packet Radio Service (GPRS) enhancements for Evolved Universal Terrestrial Radio Access Network (E-UTRAN) access (Release 13), Mar. 2016, 365 pages.

3rd Generation Partnership Project (3GPP) TS 23.060 V13.6.0, Technical Specification Group Services and System Aspects, General Packet Radio Service (GPRS), Service description, Stage 2 (Release 13), Mar. 2016, 362 pages.

3rd Generation Partnership Project (3GPP) TR 45.820 V13.1.0, Technical Specification Group GSM/EDGE Radio Access Network, Cellular system support for ultra-low complexity and low throughput Internet of Things (CIoT) (Release 13), Nov. 2015, 495 pages.

3rd Generation Partnership Project (3GPP) TR 38.913 V14.3.0, Technical Specification Group Radio Access Network, Study on Scenarios and Requirements for Next Generation Access Technologies, (Release 14), Jun. 2017, 39 pages.

3rd Generation Partnership Project (3GPP) TR 38.801 V0.2.0, Technical Specification Group Radio Access Network, Study on New Radio Access Technology: Radio Access Architecture and Interface (Release 14), Jun. 2016, 20 pages.

3rd Generation Partnership Project (3GPP) TR 36.912 V13.0.0, Technical Specification Group Radio Access Network, Feasibility study for Further Advancements for E-UTRA (LTE-Advanced) (Release 13), Dec. 2015, 273 pages.

3rd Generation Partnership Project (3GPP) TR 36.897 V13.0.0, Technical Specification Group Radio Access Network, Study on Elevation Beamforming/Full-Dimension (FD) Multiple Input Multiple Output (MIMO) for LTE; (Release 13), Jun. 2015, 58 pages.

3rd Generation Partnership Project (3GPP) TR 36.881 V14.0.0, Technical Specification Group Radio Access Network, Evolved Universal Terrestrial Radio Access (E-UTRA), Study on Latency Reduction Techniques for LTE (Release 14), Jun. 2016, 249 pages.

3rd Generation Partnership Project (3GPP) TR 23.720 V13.0.0, Technical Specification Group Services and System Aspects, Study on architecture enhancements for Cellular Internet of Things, (Release 13), Mar. 2016, 94 pages.

3rd Generation Partnership Project (3GPP) TR 22.891 V14.2.0, Technical Specification Group Services and System Aspects, Feasibility Study on New Services and Markets Technology Enablers, Stage 1 (Release 14), Sep. 2016, 95 pages.

3rd Generation Partnership Project (3GPP) TR 22.864 V14.1.0, Technical Specification Group Services and System Aspects, Feasibility Study on New Services and Markets Technology Enablers—Network Operation, Stage 1 (Release 14), Sep. 2016, 35 pages.

3rd Generation Partnership Project (3GPP) TR 22.863 V14.1.0, Technical Specification Group Services and System Aspects, Feasibility Study on New Services and Markets Technology Enablers—Enhanced Mobile Broadband, Stage 1 (Release 14), Sep. 2016, 21 pages.

3rd Generation Partnership Project (3GPP) TR 22.863 V0.3.1, Technical Specification Group Services and System Aspects, Feasibility Study on New Services and Markets Technology Enablers—Enhanced Mobile Broadband; Stage 1 (Release 14), Feb. 2016, 13 pages.

3rd Generation Partnership Project (3GPP) TR 22.862 V14.1.0, Technical Specification Group Services and System Aspects, Feasibility Study on New Services and Markets Technology Enablers for Critical Communications, Stage 1 (Release 14), Sep. 2016, 31 pages.

3rd Generation Partnership Project (3GPP) TR 22.861 V14.1.0, Technical Specification Group Services and Systems Aspects, Feasibility Study on New Services and Markets Technology Enablers for Massive Internet of Things, Stage 1 (Release 14), Sep. 2016, 28 pages.

3rd Generation Partnership Project (3GPP) SA WG2 Meeting #115 S2-162511 "Common CP functions and dedicate CP function for simultaneous multiple Network Slice (update of solution 1.3)" May 23-27, 2016, 4 pages.

3rd Generation Partnership Project (3GPP) S2-162982 was S2-162717-MDD and Slice Selection in core and RAN V1, 3rd vol. SA WG2, , Nokia et al., No. Nanjing, P.R. China; May 27, 2016, 13 pages.

3rd Generation Partnership Project (3GPP) S2-161324 SA WG2 Meeting #113, Solution to Key Issue on Mobility Framework, Sophia Antipolis, FR, Feb. 23-26, 2016, 3 pages.

3rd Generation Partnership Project (3GPP) S2-161198 SA WG2 Meeting #113AH, Solution for optimized UE sleep state and state transitions, Sophia Antipolis, France, Feb. 23-26, 2016, 3 pages.

3rd Generation Partnership Project (3GPP) S1-161323 TSG-SA WG1 Meeting #74, Editorial cleanup and alignment of eMBB TR22.863, Venice, Italy, May 9-13, 2016, 4 pages.

3rd Generation Partnership Project (3GPP) S1-152395 Revision of S1-152074, Zte Corporation et al., "Update the network slicing use case in Smarter", ZTE Smarter Update the Network Slicing Use case REV3, vol. SA WG1, No. Belgrade Serbia, Aug. 24, 2015, 3 pages.

(56)     References Cited

OTHER PUBLICATIONS

3rd Generation Partnership Project (3GPP) RP-161214 TSG RAN Meeting #72, Revision of SI: Study on New Radio Access Technology, NTT DOCOMO, Busan, Korea, Jun. 13-16, 2016, 8 pages.

3rd Generation Partnership Project (3GPP) RP-160425 TSG RAN Meeting #71, Further enhancements on signaling reduction to enable light connection for LTE, Intel Corporation, Gothenburg, Sweden, Mar. 7-10, 2016, 7 pages.

3rd Generation Partnership Project (3GPP) RP-160301 TSG RAN Meeting #71, Motivation for new WI on Light Connection in LTE, Huawei, HiSilicon, Goteborg, Sweden, Mar. 7-11, 2016, 14 pages.

3rd Generation Partnership Project (3GPP) R2-162571 TSGRAN WG2 Meeting #93bis, Introduction of Virtual Cell, CATT, Dubrovnik, Croatia, Apr. 11-15, 2016, 3 pages.

3GPP TSG RAN WG1 Meeting #84bis R1-163049, Design Options for Longer Cyclic Prefix for MBSFN Subframes, Apr. 2016, 3 pages.

3GPP TSG-RAN WG2 Meeting #95 R2-164693, Samsung, "System Information Signalling Design in NR" Aug. 2016, 6 pages.

3GPP TSG-RAN2 meeting #95bis R2-166202, Huawei et al., "Further Discussions of Minimum SI" Oct. 2016, 3 pages.

3GPP TSG-RAN2 Meeting #95bis R2-166203, Huawei et al., "Delivery of "Other SI" in NR", Oct. 2016, 5 pages.

3GPP TSG=RAN WG2 Meeting #95bis, ETSI MCC, "Skeleton report", Oct. 2016, 5 pages.

3rd Generation Partnership Project (3GPP) TSG-RAN WG1 #85, R1-164694, Frame Structure Requirements, Qualcomm, Nanjing, China, May 23-27, 2016, 5 pages.

Qualcomm, 3GPP R1-1612062, TSG-RAN WG1 #87, Control Channel for slot format indicator, Nov. 14-18, 2016 (Year: 2016).

ETRI, "FS_NEO updated requirement of network slicing", 3GPP TSG-SA WG1 #74 S1-161171, Apr. 29, 2016, URL:http://www.3gpp.org/ftp/tsg_sa/WG1_Serv/TSGS1_74_Venice/docs/SI-161171.zip, 6 pages.

ETRI, "High-level Functional Architecture for the Network Slicing", 3GPPTSG-SA WG2 #114 SZ-161833, Apr. 6, 2016, URL: http://www.3gpp.org/ftp/tsg_sa/WG2_Arch/TSGS2_114_Sophia_Antipolis/Docs/S2-161833.zip, 7 pages.

Huawei, "HiSilicon, UE Slice Association/Overload control Procedure", 3GPP TSG-SA WG2 #115 SZ-162605, May 17, 2016, URL:http://www.3gpp.org/ftp/tsg_sa/WG2_Arch/TSGS2_115_Nanjing_China/Docs/S2-162605.zip, 11 pages.

ITRI, "Updates to Solution 6. 1.3: Introducing Network Instance ID", 3GPP TSG-SA WG2 #115 SZ-162666, May 17, 2016, URL:http://www.3gpp.org/ftp/tsg_sa/WG2_Arch/TSGS2_115_Nanjing_China/Docs/S2-162666.zip>.

MediaTek Inc., "HARQ Enhancement for Improved Data Channel Efficiency" [online], 3GPP TSG-RAN WG1#84b, R1-162797, <URL:http://www.3gpp.org/ftp/tsg_ran/WG1_RL1/TSGR1_84b/Docs/R1-162797.zip>, Apr. 2016, 4 pages.

Nokia, "Alcatel-Lucent Shanghai Bell", Slice Selection solution update, 3GPP TSG-SA WG2 #115 SZ-162982, May 27, 2016, URL: http://www.3gpp.org/ftp/tsg_sa/WG2_Arch/TSGS2_115_Nanjing_China/Docs/S2-162982.zip, 15 pages.

Nokia, "Solutions for Network Slice Selection", Alcatel-Lucent Shanghai Bell, 3GPP TSGG-RAN WG3 Meeting #92, R3-161356, China, May 23-27, 2016, 9 pages.

ZTE, "Consideration on RAN architecture impacts of network slicing", 3GPP TSG-RAN WG2 Meeting #93bis, R2-162627, Croatia, Apr. 11-15, 2016, 10 pages.

3GPP TSG GERA1 Adhoc #3 GPC150521, Samsung Electronics, "Discussions of Grant-Free Multiple Access in CIoT (Update GPC150512)", Jul. 2015, 9 pages.

"Nokia Networks Enhancements for MTC Paging", R3-151590 Discussion Paper MTC Paging vB, Aug. 14, 2015.

3GPP TS 36.211 V13.0.0, "Technical Specification Group Radio Access Network; Evolved Universal Terrestrial Radio Access (E-UTRA); Physical Channels and Modulation (Release 13)", Dec. 2015, 141pages.

3rd Generation Partnership Project (3GPP), RI-165027, vol. RAN WG1, Nokia et al: "Basic frame structure 1 principles for 5G", 3GPP Draft; No. Nanjing, P.R. China; May 23, 2016-May 27, 2016 May 13, 2016.

Consideration on System Information Broadcast in New RAT, ZTE, 3GPPTSG-RANWG2 Meeting #93bis, R2-162629, Apr. 15, 2016.

Huawei et al., "Discussion on frame structure for NR", 3 GPP TSG-RAN WG1#85, R1-164032, May 23-27, 2016, 8 pages.

Huawei, HiSilicon LTE-NR tight interworking control plane, R2-164268 LTE-NR tight interworking control plane, May 14, 2016.

NTT DOCOMO Inc., "Discussion on frame structure for NR", 3GPP TSG-RAN WG1#85, R1-165176, May 23-May 27, 2016, 10 pages.

ZTE et al., "Forward compatibilty for numerology and fr ame structure design", R1-164261, 3GPP TSG-RAN WG1#85, May 23-27, 2016, 7 pages.

3rd Generation Partnership Project (3GPP) RP-160540 TSG RAN Meeting #71, New WI proposal: Signalling reduction to enable light connection for LTE, Gothenburg, Sweden, Mar. 7-10, 2016, 7 pages.

Huawei et al., "Numerology and wideband operation in NR unlicensed", 3GPP Draft; R1-1803677, 3rd Generation Partnership vol. RAN WG1, No. Sanya, China; Apr. 16, 2018-Apr. 20, 2018, Apr. 15, 2018, Apr. 16, 2018-Apr. 20, 2018.

Huawei et al: "Initial access in NR unlicensed", 3GPP Draft R1-1808062 3rd Generation Partnership Project (3GPP), Mobile Competence Centre, vol. RAN WG1, No. Aug. 10, 2018, Aug. 20, 2018-Aug. 24, 2018.

Nokia et al: Feature Lead's Summary on Channel Access Procedures 3GPP Draft; R1-1809801 NRU Channel Access Summary 3rd Generation Partnership Project (3GPP), Mobile Competence Centre, vol. RAN WG1, No. Gothenburg, Sweden; Aug. 23, 2018, Aug. 20, 2018-Aug. 20, 2018.

ZTE: "Considerations on channel access procedure for NR-U", 3GPP Draft; R2-1811281 Considerations on Random Access Procedure for NR-U, 3rd Generation Partnership Project (3GPP), Mobile Competence Centre vol. RAN WG2, No. Gothenburg, Sweden; Aug. 9, 2018, Aug. 20, 2018-Aug. 24, 2018.

CATT: "On interference measurement enhancement for multi-user MIMO operation", 3GPP TSG RAN WG1 Meeting #85, R1-164223, May 14, 2016, May 23, 2016-May 27, 2016, XP051096527.

CATT: "WF on Interference Measurement Enhancements", 3GPP TSG RAN WGI Meeting #86bis, R1-1610771, Oct. 18, 2016, Oct. 10, 2016-Oct. 14, 2016, XP051160249.

"Discussion on downlink control channel design," 3GPP TSG RAN WG1 Meeting #86bis, R1-1609432, Oct. 10-14, 2016, p. 5.

Nokia et al., R1-163267, On design of DL control channel for shorter TTI operation, 3GPP TSG RAN WG1 #84bis, #GPP Apr. 1, 2016.

3GPP TSG-RAN1#85 R1-164869, "Low code rate and signature based multiple access scheme for New Radio," May 23-27, 2016, pp. 1-4.

Huawei et al., "R1-162116, Discussion on enhanced frame structure for latency reduction in TDD," 3GPP TSG RAN WG1 #84bis, (Apr. 1, 2016.).

Huawei,R3-161134, "Network slice selection," RAN WG3 Meeting #92, May 2016.

NTT DOCOMO, Inc., R1-160965, "UL aspects of TTI shortening," 3GPP TSG RAN WG1 #84, 3GPP (Feb. 5, 2016.).

Qualcomm Incorporated, S2-162339, "Solution for key issue 1 on Network Slicing: Network Slice and Network Functions Selection based on evolved eDECOR model," SA WG2 Meeting #115, May 2016.

Spreadtrum Communications, R1-164584, "HARQ feedback for sTTI scheduling," 3GPP TSG RAN WG1 #85, 3GPP (May 13, 2016.).

"Consideration on TTI shortening for DL", 3GPP TSG RAN WG1 Meeting #84, R1-161017, Feb. 2016, 4 Pages.

"Considerations on required downlink physical layer enhancements for shorter TTI", 3GPP TSG-RAN WG1 Meeting #84, R1-160786, Feb. 2016, 6 Pages.

"Study on TTI shortening for downlink transmissions", 3GPP TSG RAN WG1 Meeting #84 , R1-160649, Feb. 2016, 6 Pages.

(56) References Cited

OTHER PUBLICATIONS

3rd Generation Partnership Project; 3GPP TS 23.228 V12.1.0; Technical Specification Group Services and System Aspects; IP Multimedia Substystem (IMS); Stage 2 (Release 12), Jun. 2013, 296 pages.
ASUSTeK, R1-083574, Draft CR on RNTI for UE-specific search space, 3GPP TSG-RAN1 Meeting #54bis, Oct. 2018.
Damour, N., "List of Common Services Functions-Call for Contributions", M2M Functional Architecture Technical Specification, Doc# oneM2M-ARC-2013-0304R04-List of oneM2M CSFs—Call for contributions-2.DOC Input Contribution, Jul. 11, 2013, 1-5 pages.
ETSI TS 102690 V2.0.14 Technical Specification, "Machine-to-Machine Communications (M2M) Functional Architecture", Jul. 2013, 332 pages.
European Telecommunications Standards Institute (ETSI), TS 102 690 V1.2.1; Machine-to-Machine Communications (M2M); Functional Architecture, Jun. 2013, 279 pages.
ITRI, "Discussion on resource utilization for UE-specific BF CSI-RS", R1-162987, 7.3.3.1.2, 3GPP TSG RAN WG1 Meeting #84b, 2016, 2 Pages.
Machine-to-Machine Communications (M2M) Functional Architecture, Draft ETSI TS 102 690 V1.1.1, Oct. 2011, 280 pages.
Motorola Mobility, "Synchronization signal in NR", 3GPP TSG-RAN WG1#86b R1-1609917, Oct. 2016, 5 Pages.
OMA (Open Mobile Alliance), OMA-TS-LightweightM2M-V1_0-20130206-D, Lightweight Machine to Machine Technical Specification, Draft Version 1.0—Feb. 6, 2013, 53 pages.
OneM2M Technical Specification, oneM2M-TS-0001 oneM2M Functional Architecture-V-0.0.3, Jun. 8, 2013, 11 pages.
LG Electronics, "Transmission modes for Un PDSCH", 3GPP TSG RAN WG1 Meeting #63, R1-106138, 2010, pp. 3.
Third Generation Partnership Project, "Technical Specification Group Radio Access Network; Evolved Universal Terrestrial Radio Access (E-UTRA); Multiplexing and channel coding (Release 13)," 3GPP TS 36.212 V13.2.0 (Jun. 2016).
3rd Generation Partnership Project; "Technical Specification Group Radio Access Network; NR; Physical Layer Procedures for Control (Release 15)", 3GPP TS 38.213 V15.1.0, Mar. 2018. 77 pages.
3rd Generation Partnership Project; "Technical Specification Group Radio Access Network; NR and NG-RAN Overall Description; Stage 2 (Release 15)", 3GPP TS 38.300 V15.0.0, Dec. 2017, 68 pages.
3rd Generation Partnership Project; "DL Channels and Signals in NR Unlicensed Band", R1-1808059, Huawei, HiSilicon, 3GPP TSG RAN WG1 Meeting #94, Aug. 20-24, 2018, 5 pages.
3rd Generation Partnership Project; "Considerations on Initial Access and Mobility for NR Unlicensed Operations", R1-1808336, Sony, 3GPP TSG RAN WG1 Meeting #94, Aug. 20-24, 2018, 5 pages.
3rd Generation Partnership Project; "Channel Access Procedures for NR-U", R1-1808768, Samsung, 3GPP TSG-RAN WG1 Meeting #94, Gothenburg, Sweden, Aug. 20-24, 2018, 6 pages.
3rd Generation Partnership Project; "Wide-Band Operation for NR-U", R1-1904626, LG Electronics, 3GPP TSG RAN WG1 #96bis, Apr. 8-12, 2019, 7 pages.
3rd Generation Partnership Project; "Revised SID on NR-based Access to Unlicensed Spectrum", RP-172021, Qualcomm Incorporated, 3GPP TSG RAN Meeting #77, Sapporo, Japan, Revision of RP-171601, Sep. 11-14, 2017, 5 pages.
3rd Generation Partnership Project; "Presentation of Specification/Report to TSG: TR 36.878, Version 2.0.0", RP-151814, Huawei, 3GPP TSG-RAN Meeting #70, Dec. 7-10, 2015, 2 pages.
ETSI TS 124 302 V13.5.0, "Universal Mobile Telecommunications System (UMTS) LTE; Access to the 3GPP Evolved Packet Core (EPC) via non-3GPP access networks; Stage 3 (3GPP TS 24.302 version 13.5.0 Release 13)", Apr. 2016, 128 pages.
Global System for Mobile Communications; "Digital Cellular Telecommunications System (Phase 2+) (GSM), Universal Mobile Telecommunications System (UMTS), General Packet Radio Service (GPRS), Service Description, Stage 2 (3GPP TS 23.060 version 13.6.0 (Release 13)", ETSI TS 123 060 V13.6.0, Apr. 2016, 364 pages.
IEEE International Conference on Image Processing, "The Dynamic Videobook: A Hierarchical Summarization for Surveillance Video", SUN, et al., 2013, pp. 3963-3966.
Mavlankar, et al.; "Video Streaming with Interactive Pan/Till/Zoom", 26 pages.
NGMN Alliance: "5G White Paper" V1.0, Feb. 17, 2015, 125 pages.
OMA (Open Mobile Alliance); "Lightweight Machine to Machine Technical Specification Draft Version 1.0", OMA-TS-LightweightM2M-V1_0-20130206-D, Feb. 6, 2013, 53 pages.
Wang, et al.; "Research on tower crane automatic tracking and zooming video monitoring system based on Improved Camshift algorithm", International Conference on Electric Information and Control Engineering, 2011, pp. 4434-4437.
R1-151139 , "Discussion on UL HARQ handling in LAA", 3GPP TSG RAN WG1 Ad-hoc Meeting, Mar. 24-26, 2015, 2 pages.
R1-151936 , "UL HARQ operation for LAA", 3GPP TSG-RAN WG1 Meeting #80bis, Apr. 20-24, 2015, 2 pages.
R1-1800239 , "Remaining issues on CSI measurement", 3GPP TSG RAN WG1 Meeting AH 1801 Vancouver, Canada CATT, Jan. 22-26, 2018, 8 pages.
R1-1900610 , "Wide-band operation for NR-U[online], 3GPP TSG RAN WG1 adhoc_NR_AH_1901", LG Electronics 3GPP TSG RAN WG1 http://www.3gpp.org/ftp/tsg_ran/WG1_RL1/TSGR1_AH/NR_AH_1901/Docs/R1-1900610, Jan. 2019, 7 pages.
R1-1902660, Sharp , "Wideband operation and UL/DL indication for NR-U[online], 3GPP TSG RAN WG1 #96", http://www.3gpp.org/ftp/tsg_ran/WG1_RL1/TSGR1_96/Docs/R1-1902660.zip, Feb. 2019, 6 pages.
R2-151551 , "UL HARQ considerations for LTE LAA", 3GPP TSG-RAN WG2 #89bis, Apr. 20-24, 2015, 5 Pages.
RWS-150003, "Key Technologies and Standardization for 5G Radio Access", RWS-150003, 3GPPRAN-workshop on 5G Phoenix, USA, Sep. 17-18, 2015, 29 pages.
Wu, et al., "Cable TV Technology, No. 4", Fixed Mobile Convergence, Apr. 20, 2009, 6 pages.
3GPP TR 22.891 V1.3.2, "Technical Specification Group Services and System Aspects; Feasibility Study on New Services and Markets Technology Enablers; Stage 1 (Release 14)", Feb. 2016, 95 pages.
3GPP TR 38.913 V0.3.0: "Technical Specification Group Radio Access Network; Study on Scenarios and Requirements for Next Generation Access Technologies; (Release 14)," Mar. 2016, 30 pages.
3GPP TS 36.133 V14.0.0, "Technical Specification Group Radio Access Network; Evolved Universal Terrestrial Radio Access (E-UTRA); Requirements for support of radio resource management (Release 14)," (Jun. 2016), 1545 pages.
3rd Generation Partnership Project (3GPP) TR 22.861 V14.0.0, "Technical Specification Group Services and Systems Aspects, Feasibility Study on New Services and Markets Technology Enablers for Massive Internet of Things, Stage 1 (Release 14)", Jun. 2016, 28 pages.
3rd Generation Partnership Project (3GPP) TR 22.862 V14.1.0, "Technical Specification Group Services and System Aspects; Feasibility Study on New Services and Markets Technology Enablers—Critical Communications; Stage 1 (Release 14)", Jun. 2016, 32 pages.
3rd Generation Partnership Project (3GPP) TR 22.891 V14.1.0, "Technical Specification Group Services and System Aspects, Feasibility Study on New Services and Markets Technology Enablers, Stage 1 (Release 14)", Sep. 2016, 95 pages.
3rd Generation Partnership Project (3GPP), TSG RAN WG1 Meeting #86, "RANI Chairman's Notes", Gothenburg, Sweden, Aug. 22-26, 2016, 105 pages.
CATT, R1-164255: "Discussion on beam-based operation", 3GPP TSG RAN WG1#85, Nanjing, China, May 23-27, 2016, 3 pages.
Dahlman, Erik, et al., "4G: LTE/LTE-Advanced for Mobile Broadband, Second Edition", Academic Press, Apr. 2011, 509 pages.
Ericsson, Tdoc R2-150385: "UL HARQ impact of LAA", 3GPP TSG-RAN WG2 #89, Athens, Greece, Feb. 9, 2015, 4 pages.

(56) References Cited

OTHER PUBLICATIONS

Huawei, et al., R1-166102: "Overview of frame structure for NR", 3GPP TSG RAN WG1 Meeting #86, Gothenburg, Sweden, Aug. 22-26, 2016, 8 pages.

Nokia, et al., RI-163267,"On design of DL control channel for shorter TTI operation", 3GPP TSG-RAN WG1 Mccting #84bis, Busan, South Korea, Mar. 11-15, 2016, 5 pages.

Samsung Electronics, GPC150512: "Discussions of Grant-Free Multiple Access in CIoT (Update of GPC150321)", 3GPP TSG GERAN1 Adhoc #3, Kista, Sweden, Jun. 29, 2015, 8 pages.

Huawei et al., "Design of initial downlink transmission for LBE-based LAA", R1-150980, 3GPP TSG RAN WG1, Mar. 2015, 6 Pages Nokia et al., "On supported Shorter TTI lengths and its configurability", 3GPP TSG RAN WG1 Meeting #85, 2016, R1-164945, 4 pages.

Spreadtrum Communications, "HARQ feedback for sTTI scheduling", R1-162546, Apr. 2016, 3GPP TSG RAN WG1 Meeting #84bis, 4 Pages.

\* cited by examiner

1602

○ Enable slice discovery

○ Slice selection

NETWORK SLICE DISCOVERY AND SELECTION

CROSS REFERENCE TO RELATED APPLICATIONS

This application claims the benefit of priority to U.S. Provisional Patent Application No. 62/350,550, filed Jun. 15, 2016, U.S. Provisional Patent Application No. 62/373, 691 filed Aug. 11, 2016, U.S. Provisional Application No. 62/373,768 filed Aug. 11, 2016 and U.S. Provisional Patent Application No. 62/401,062, filed Sep. 28, 2016, the disclosures of which are incorporated by reference in their entireties.

BACKGROUND

International Mobile Telecommunications (IMT) for 2020 and beyond (e.g., IMT 2020) is envisaged to expand and support diverse families of usage scenarios and applications that will continue beyond the current IMT. Furthermore, a broad variety of capabilities may be tightly coupled with these different usage scenarios. Example families of usage scenarios include enhanced Mobile Broadband (eMBB), Ultra-Reliable and Low Latency Communications (URLLC), massive Machine Type Communications (mMTC), and Network Operations. Example operating characteristics of eMBB may include macro and small cells, 1 ms Latency (air interface), support for high mobility, etc. Example operating characteristics of URLLC may include low to medium data rates (e.g., 50 kbps-10 Mbps), less than 1 ms air interface latency, 99.999% reliability and availability, low connection establishment latency, 0-500 km/h mobility, etc. Example mMTC operating characteristics may include low data date (e.g., 1-100 kbps), high density of devices (e.g., 200,000/km2), varying latency, low power required (e.g., up to 15 years battery autonomy), asynchronous access, etc. Network operations address various subjects such as Network Slicing, Routing, Migration and Interworking, Energy Saving, etc.

With respect to new radio requirements, 3GPP TR 38.913 defines scenarios and requirements for New Radio (NR) technologies. The Key Performance Indicators (KPIs) for URLLC and mMTC devices are summarized in Table 1 below:

TABLE 1

| | | KPIs for URLLC and mMTC Devices | |
|---|---|---|---|
| Device | KPI | Description | Requirement |
| URLLC | Control Plane Latency | Control plane latency refers to the time to move from a battery efficient state (e.g., IDLE) to start of continuous data transfer (e.g., ACTIVE). | 10 ms |
| | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes $^{NOTE1}$ within 1 ms, which is the time it takes to deliver a small data packet from the radio protocol layer 2/3 SDU ingress point to the radio protocol layer 2/3 SDU egress point of the radio interface, at a certain channel quality (e.g., coverage-edge). NOTE1: Specific value for X is FFS. | $1\text{-}10^{-5}$ within 1 ms. |
| mMTC | Coverage | "Maximum coupling loss" (MCL) in uplink and downlink between device and Base Station site (antenna connector(s)) for a data rate of [X bps], where the data rate is observed at the egress/ingress point of the radio protocol stack in uplink and downlink. | 164 dB |
| | UE Battery Life | User Equipment (UE) battery life can be evaluated by the battery life of the UE without recharge. For mMTC, UE battery life in extreme coverage shall be based on the activity of mobile originated data transfer consisting of [200 bytes] Uplink (UL) per day followed by [20 bytes] Downlink (DL) from Maximum Coupling Loss (MCL) of [tbd] dB, assuming a stored energy capacity of [5 Wh]. | 15 years |
| | Connection Density | Connection density refers to total number of devices fulfilling specific Quality of Service (QoS) per unit area (per km$^2$). QoS definition should take into account the amount of data or access request generated within a time t_gen that can be sent or received within a given time, t_sendrx, with x % probability. | $10^6$ devices/km$^2$ |

Referring to FIG. 1, high level illustration of network slicing is depicted. A network slice generally refers to a collection of logical network functions that support communication service requirements of one or more cases. It may be possible to direct terminals to selected slices in a way that fulfills operator or user needs, for example, based on a terminal's subscription or type. Network slicing primarily targets a partition of the core network, but it is not exclusive to the core network (CN), such that Radio Access Network (RAN) may need specific functionality to support multiple slices, or to support partitioning of resources for different network slices.

System Information (SI) is the information broadcast by the Evolved Universal Terrestrial Radio Access Network (E-UTRAN) that needs to be acquired by a UE so that the UE can access and operate within the network. SI is divided into the MasterInformationBlock (MIB) and a number of SystemInformationBlocks (SIBs). A high level description of the MIB and SIBs is provided in 3GPP TS 36.300. Detailed descriptions are available in 3GPP TS 36.331. Examples of SI is shown in Table 2 below.

SUMMARY

An NR network slicing architecture may be used to facilitate network slice discovery and selection. Mechanisms to discover and select network slices may differ depending on whether a user equipment is in an idle mode or a connected mode. Further, in various examples, the network slice discovery and selection may be performed by a UE, a radio access network (RAN), or a core network (CN), based on a variety of selection criteria.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

TABLE 2

| System Information | |
|---|---|
| Information Block | Description |
| MIB | Defines the most essential physical layer information of the cell required to receive further system information |
| SIB1 | Contains information relevant when evaluating if a UE is allowed to access a cell and defines the scheduling of other system information |
| SIB2 | Radio resource configuration information that is common for all UEs |
| SIB3 | Cell re-selection information common for intra-frequency, inter-frequency and/or inter-RAT cell re-selection (i.e. applicable for more than one type of cell re-selection but not necessarily all) as well as intra-frequency cell re-selection information other than neighboring cell related |
| SIB4 | Neighboring cell related information relevant only for intra-frequency cell re-selection |
| SIB5 | Information relevant only for inter-frequency cell re-selection i.e. information about other E UTRA frequencies and inter-frequency neighboring cells relevant for cell re-selection |
| SIB6 | Information relevant only for inter-RAT cell re-selection i.e. information about UTRA frequencies and UTRA neighboring cells relevant for cell re-selection |
| SIB7 | Information relevant only for inter-RAT cell re-selection i.e. information about GERAN frequencies relevant for cell re-selection |
| SIB8 | Information relevant only for inter-RAT cell re-selection i.e. information about CDMA2000 frequencies and CDMA2000 neighboring cells relevant for cell re-selection |
| SIB9 | Home eNB name (HNB Name) |
| SIB10 | ETWS primary notification |
| SIB11 | ETWS secondary notification |
| SIB12 | CMAS notification |
| SIB13 | Information required to acquire the MBMS control information associated with one or more MBSFN areas |
| SIB14 | EAB parameters |
| SIB15 | MBMS Service Area Identities (SAI) of the current and/or neighboring carrier frequencies |
| SIB16 | Information related to GPS time and Coordinated Universal Time (UTC) |
| SIB17 | Information relevant for traffic steering between E-UTRAN and WLAN |
| SIB18 | Indicates E-UTRAN supports the Sidelink UE information procedure and may contain sidelink communication related resource configuration information |
| SIB19 | Indicates E-UTRAN supports the Sidelink UE information procedure and may contain sidelink discovery related resource configuration information |
| SIB20 | Contains the information required to acquire the control information associated transmission of MBMS using SC-PTM |

Turning now to UE information states, a UE can be in different states after powering up—"Idle" or "Packet Communication" as shown in FIG. 2, for example, which are fully managed by EPS Mobility Management (EMM), EPS Connection Management (ECM), and the Radio Resource Control (RRC) functions.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Figure 3:
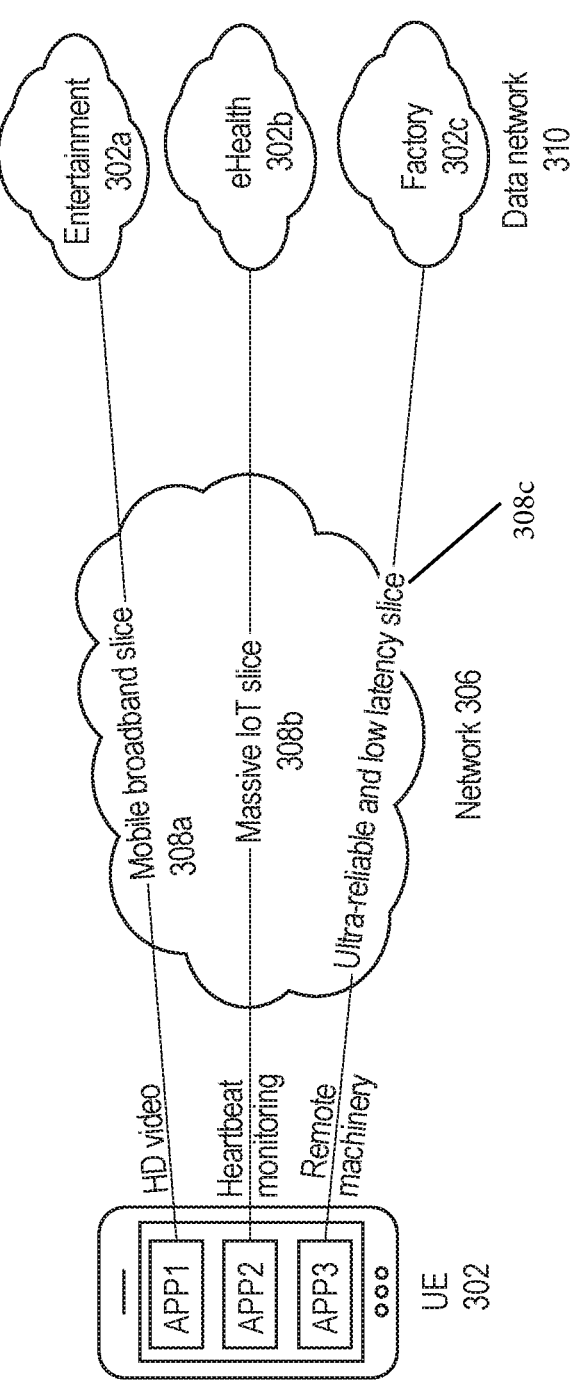
FIG. 3 depicts an example of network slicing that enables a UE to obtain multiple services from a network.

As described above, network slicing is a differentiator for new radio (NR) or 5G networks, as compared to previous networks. Network slicing may allow the network to be virtually partitioned into several networks, such that each network can be designed to be optimized for a specific set of requirements that corresponding to specific services or applications, which may be share similar characteristics with one another. FIG. 3 illustrates an example use case for network slicing that enables a UE 302 to simultaneously obtain multiple services 304*a-c* from a network 306.

In accordance with the illustrated use case, the UE 302 may powers up and stay in the idle mode to perform a radio/cell search. Once a cell is selected, the UE 302 may acquire a list of network slices, for instance slices 308*a-c*, provided by the cell before accessing a data network 310. In an example, the UE 302 may select a default network slice, which may depending the UE's device type (e.g., IoT device, smart phone, etc.). This default selection represents an example of an idle mode network slice discovery and selection, which is described further herein.

In accordance with the example, a video streaming player (APP 1) is launched in the UE 302 and initiates an initial service request. If the selected default slice in idle mode does not meet the requirements of the request, the UE 302 may enter the connected mode and starts a connected mode network slice discovery and selection for initial network slice request, as described further herein. By way of further example, a heartbeat monitoring application (APP 2) and remote machinery application (APP 3) are launched in the UE 302 subsequent to APP 1 being launched, which may lead to a connected mode network slice discovery and selection for additional network slice request, as further described herein. In an example, the heartbeat monitoring application may send out small packets infrequently, for example, when a user's healthy condition changes. By way of further example, the remote machinery application may support remote control of heavy machinery (e.g., excavators in mines and wood processors in forests), so that users do not have to be on site.

From the example use case, among others, it is recognized herein that various embodiments for network slice discovery and selection may apply to various services requested by a given UE, and also to various types of devices (e.g., URLLC, eMBB, and mMTC). In an example embodiment, idle mode network slice discovery and selection is performed. In another example, a connected mode network slice discovery and selection is performed for an initial network slice request. In yet another example, a connected mode network slice discovery and selection is performed for an additional network slice request. In some cases, a user equipment may be in an idle mode or a connected mode after powering up, and therefore an idle mode network slice discovery and selection refers to discovering and selecting a network slice when the UE is in the idle mode, and a connected mode network slice discovery and selection refers to discovering and selecting a network slice when the UE is in the connected mode. An idle mode generally refers to a state in which the UE is in a low-power mode and does not transfer data. In idle mode, a given UE may listen to control traffic, such as paging notifications or system information messages. A connected mode generally refers to a state in which the UE has exchanged context information, thereby establishing a connection, with a radio access network. In the connected mode, the UE may be in a high-power state, and may be ready to send and receive data to and from, respectively, a RAN node.

Referring now to FIGS. 4A to 5B, an example system 2500 is shown which includes an mMTC UE 2502, an NR-node 2504, and a core network (CN) 2506. The NR-node 2504 comprises a RAN slice management function or apparatus (node) 2508 and an mMTC slice 2510. The CN 2506 includes a CN Slice Management function or apparatus (node) 2512 and an mMTC slice 2514. The mMTC 2514 may include a mobility management node or apparatus 2516, gateways 2518 (e.g., SWG, PGW) and a subscription management function or apparatus (node) 2520 (e.g., HSS). It will be appreciated that the example system 2500 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIGS. 4A to 5B, and all such embodiments are contemplated as within the scope of the present disclosure.

Figure 4A:
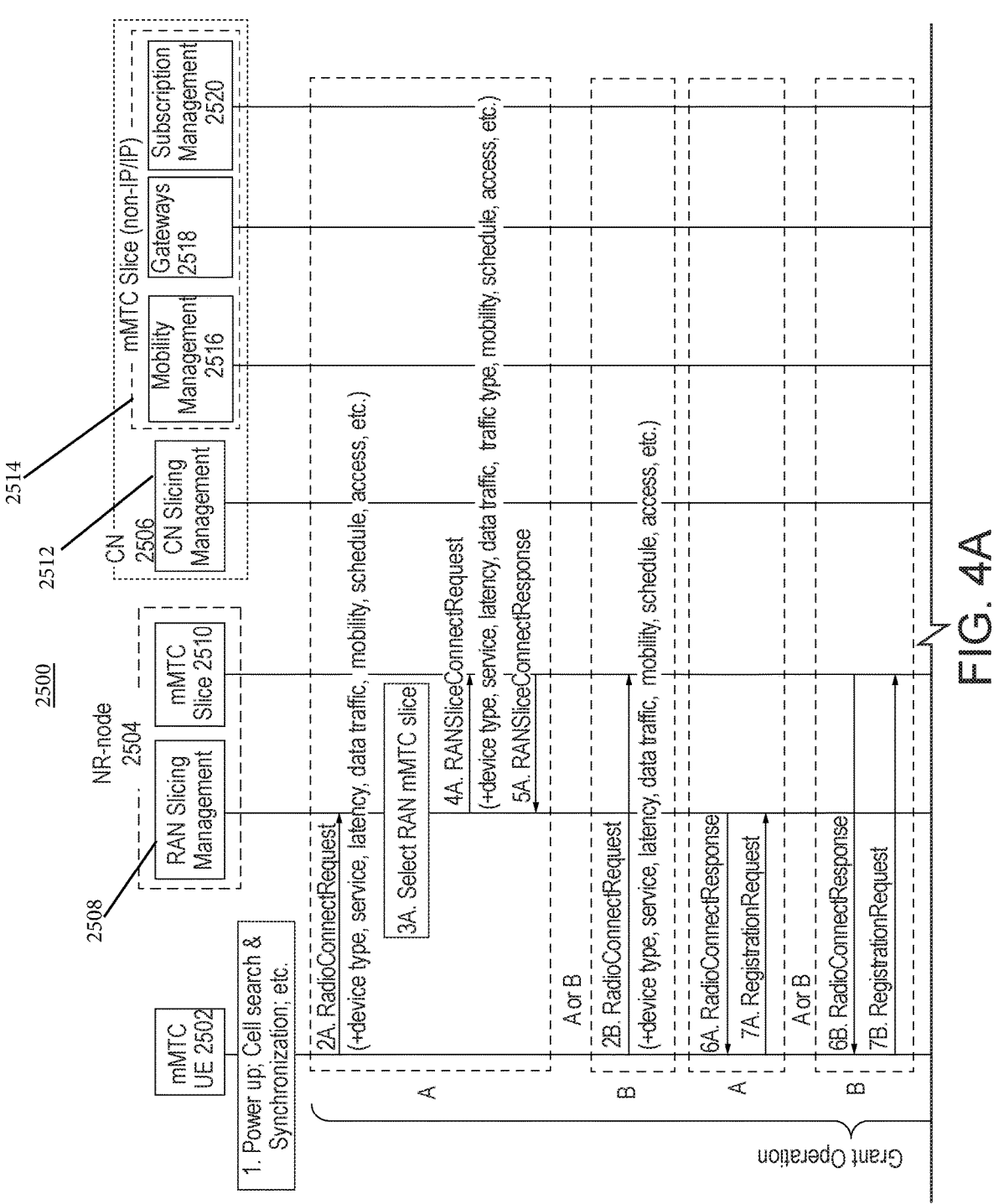
FIGS. 4A-5B depict a call flow for grant-less UL transmission for mMTC devices in accordance with an example embodiment.

Referring in particular to FIG. 4A, at 1, in accordance with the illustrated example, the UE 2502 after power up. After powering, the UE 2502 may conduct cell search and synchronization, and then the UE may acquire system information, for example, from MIB and SIBs. At 2, the UE 2502 sends a Radio Connection Request to the NR-node 2504. In particular, the UE may send Radio Connection Request message to the RAN slicing management apparatus 2508 (at 2A) (e.g., network selected slice) or the mMTC slice 2510 (at 2B) (e.g., UE selected slice). The request may be a request for access to a network or UE selected RAN slice 2510 at the NR-node 2504. The request may include various context information associated with the UE 2502. The context information may include, for example and without limitation, a device type (e.g., mMTC, URLLC) of the UE 2502, a service associated with the UE 2502 (e.g., forest fire monitoring or traffic monitoring), a latency requirement (e.g., 100 ms or ultra-low latency of 0.5 ms, data traffic context (e.g., data packet size or data rate), a traffic type (e.g., non-IP or IP based); mobility context associated with the UE 2502 (e.g., static, pedestrian, vehicular), a planned schedule of data transmissions from the UE 2502, type of access that can be performed by the UE 2502 (e.g., grant access, grant-less access, or access that switches between grant and grant-less). In some cases, operations 3, 4, and 5 are not performed when the UE selects the slice 2510.

In some cases, for example when the UE 2502 does not select a slice, the RAN Slicing Management 2508, at 3A, selects the slice 2510 as the UE's radio accessing slice, for example, based on the UE context in the request at 2A. The selection may further be based on RAN traffic loading and resource allocations. At 4A, in accordance with the illustrated example, the RAN Slicing Management 2508 sends a RAN Slice Connection Request to the mMTC Slice 2510 that was selected. The request may also forward all or some of the UE's context from 2A, so that a radio connection can be established between the UE 2502 and the mMTC slice 2510. At 5A, the mMTC Slice 510 may send a RAN Slice Connection Response to the RAN Slicing Management 2508. The response may indicate whether the slice connection request has been accepted. If the request is rejected, the one or more reasons for the rejection may be included in the response message.

At 6, in accordance with the illustrated example, the RAN Slicing Management 2508 (at 6A) or the mMTRC Slice 2510 (at 6B) sends a RAN Slice Connection Response to the UE 2502. In this message, the RAN Slice Management 2508 or the RAN mMTC Slice 2510 may confirm whether the radio connection request has been accepted. If the request is rejected, one or more reasons for the rejection may also be included in the response message. In the illustrated example, the UE 2502 receives a confirmation that a successful radio connection with the mMTC Slice 2510 has been established. At 7, the UE may send a registration request to the RAN Slicing Management 2508 (at 7A) or the RAN mMTC Slice 2510 (at 7B). The registration request may be sent to establish a secured service connection with the Core Network (CN) 2506.

Figure 4B:
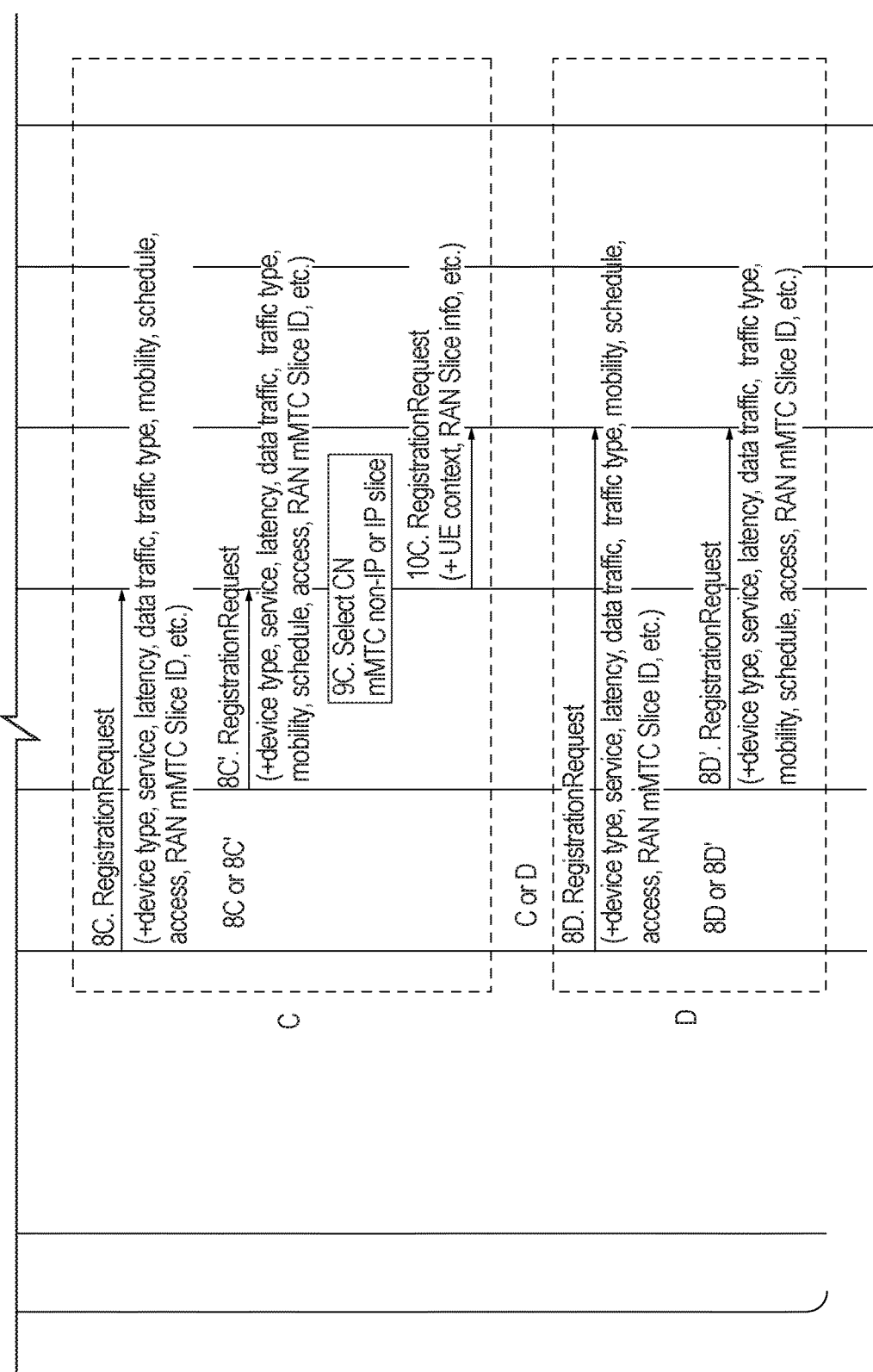

Referring now to FIG. 4B, at 8, the registration request is sent to CN Slicing Management apparatus 2512 (8C and 8C') or the CN mMTC slice 2514 (8D and 8D'). The request may be sent by the RAN Slicing Management 2508 (8C and 8D) or the mMTC Sliced 2510 (8C' and 8D'). The request may include the context information associated with the UE, information associated with the mMTC slice 2510, such as the slice ID for example. In some cases, operations 9 and 10, which are now described, are skipped when the NR-node 2504 selects the CN slice 2514. At 9C, in accordance with the illustrated example, the CN Slicing Management apparatus 2512 selects the mMTC non-IP or IP traffic slice 2514, for example, based on the UE context, the RAN mMTC Slice 2510, traffic loading of the CN 2506, available mMTC slices, or the like. At 10C, in accordance with the illustrated example, the CN Slicing Management node 2512 sends a registration request to the Mobility Management node 2516. The Registration Request may include the UE's context information and information associated with the RAN mMTC Slice 2510.

Figure 5A:
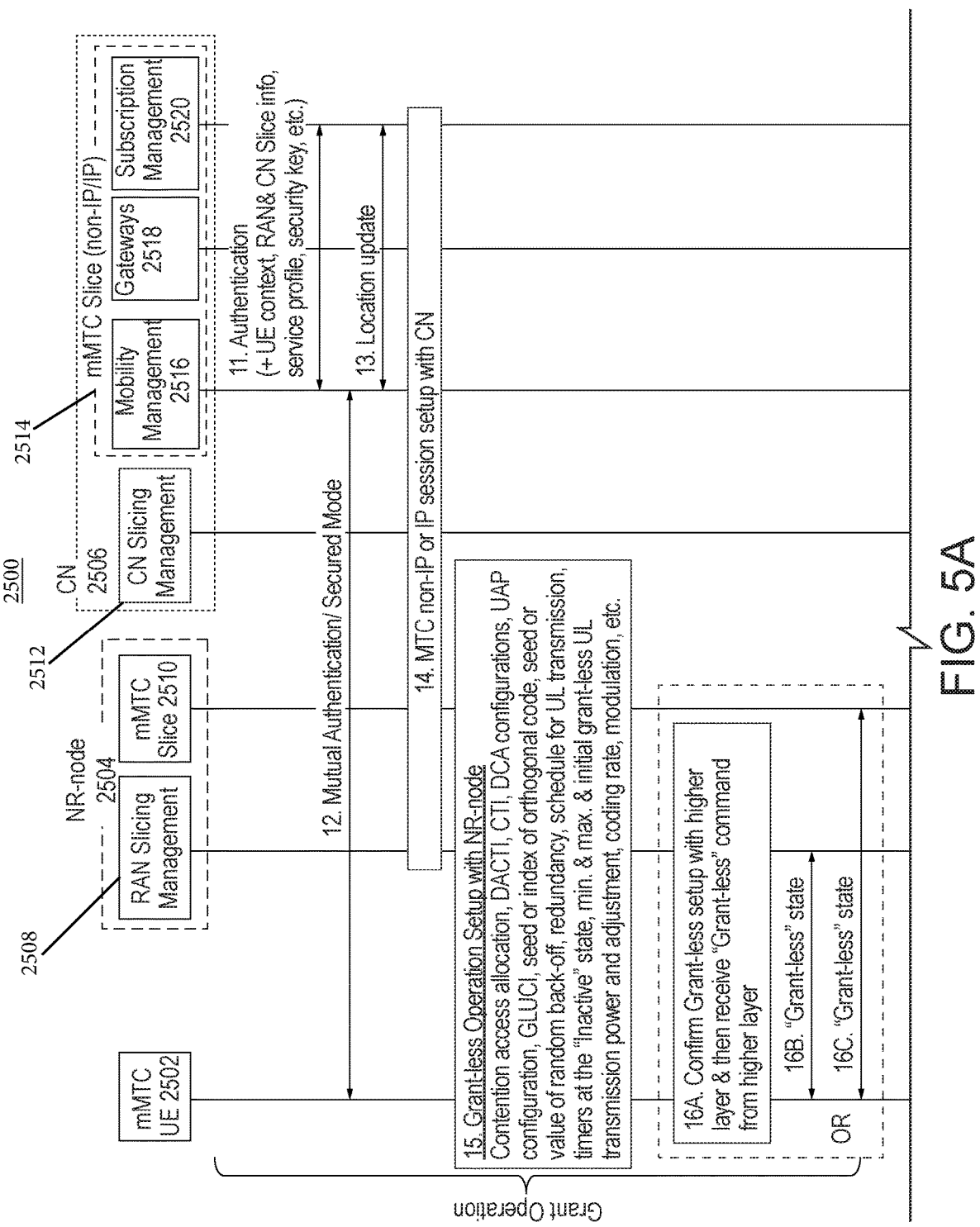
Figure 5B:
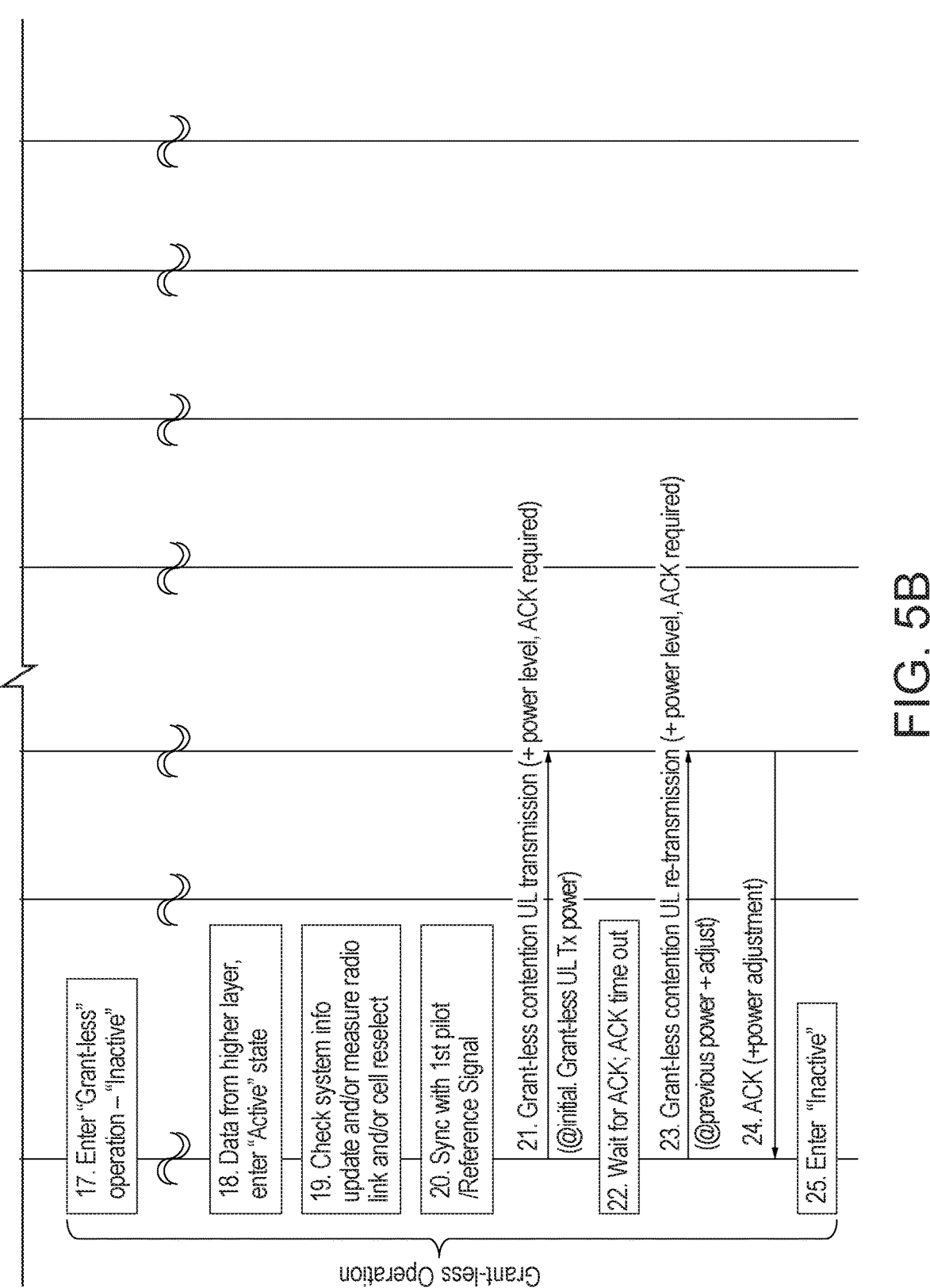
Figure 6A:
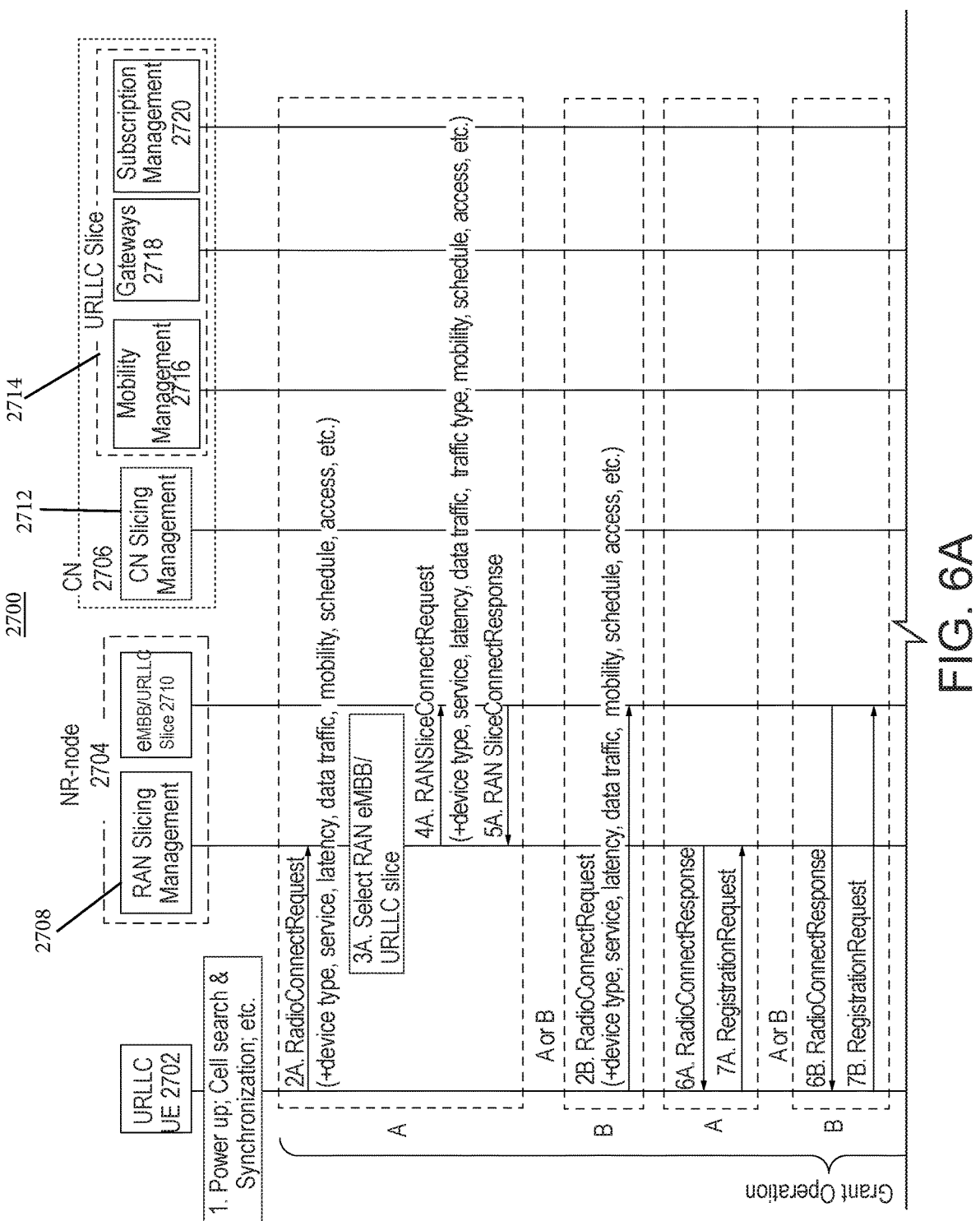
FIGS. 6A-7B depict another example call flow for grant-less UL transmission for URLLC devices in accordance with an example embodiment.
Figure 6B:
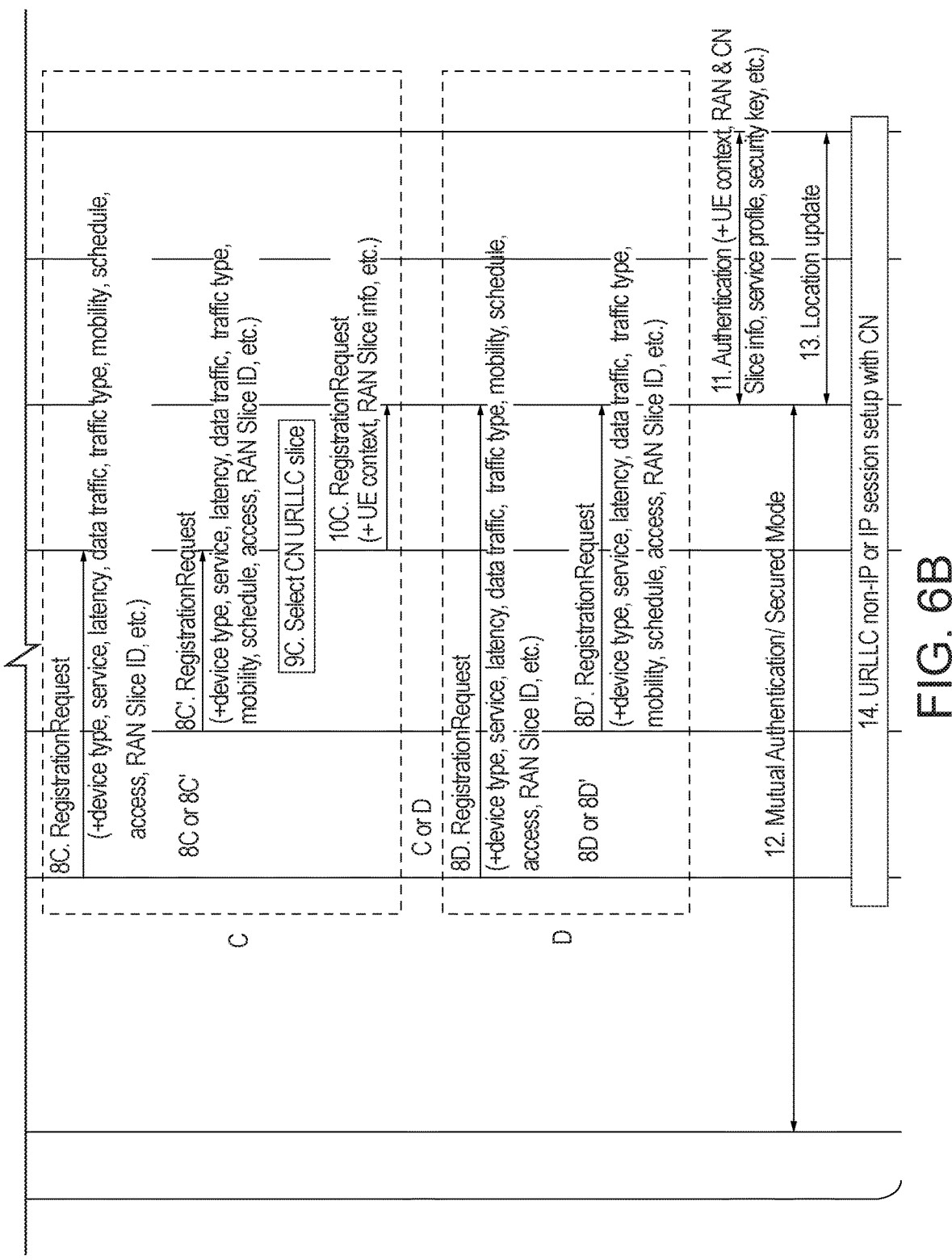
Figure 7A:
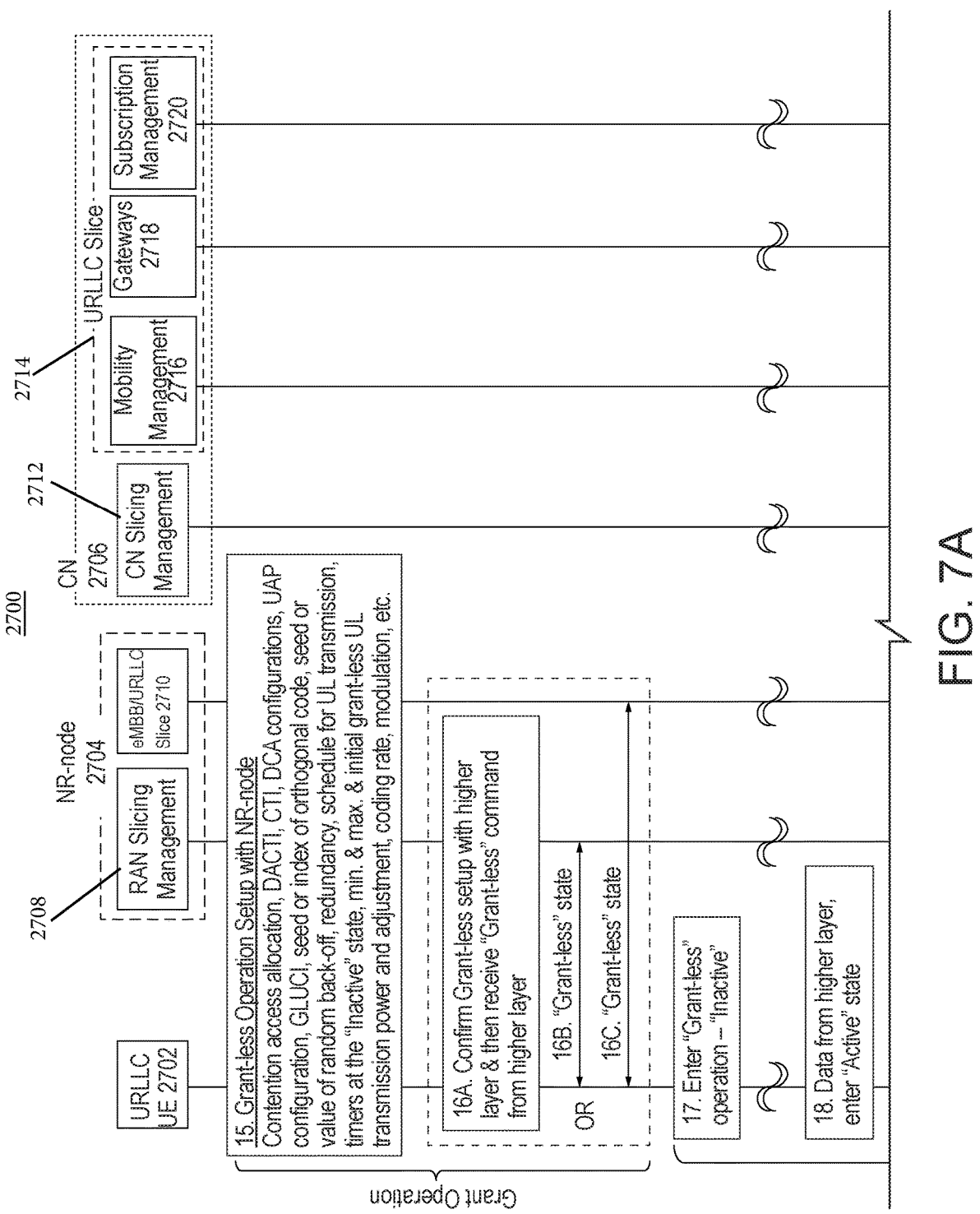
Figure 7B:
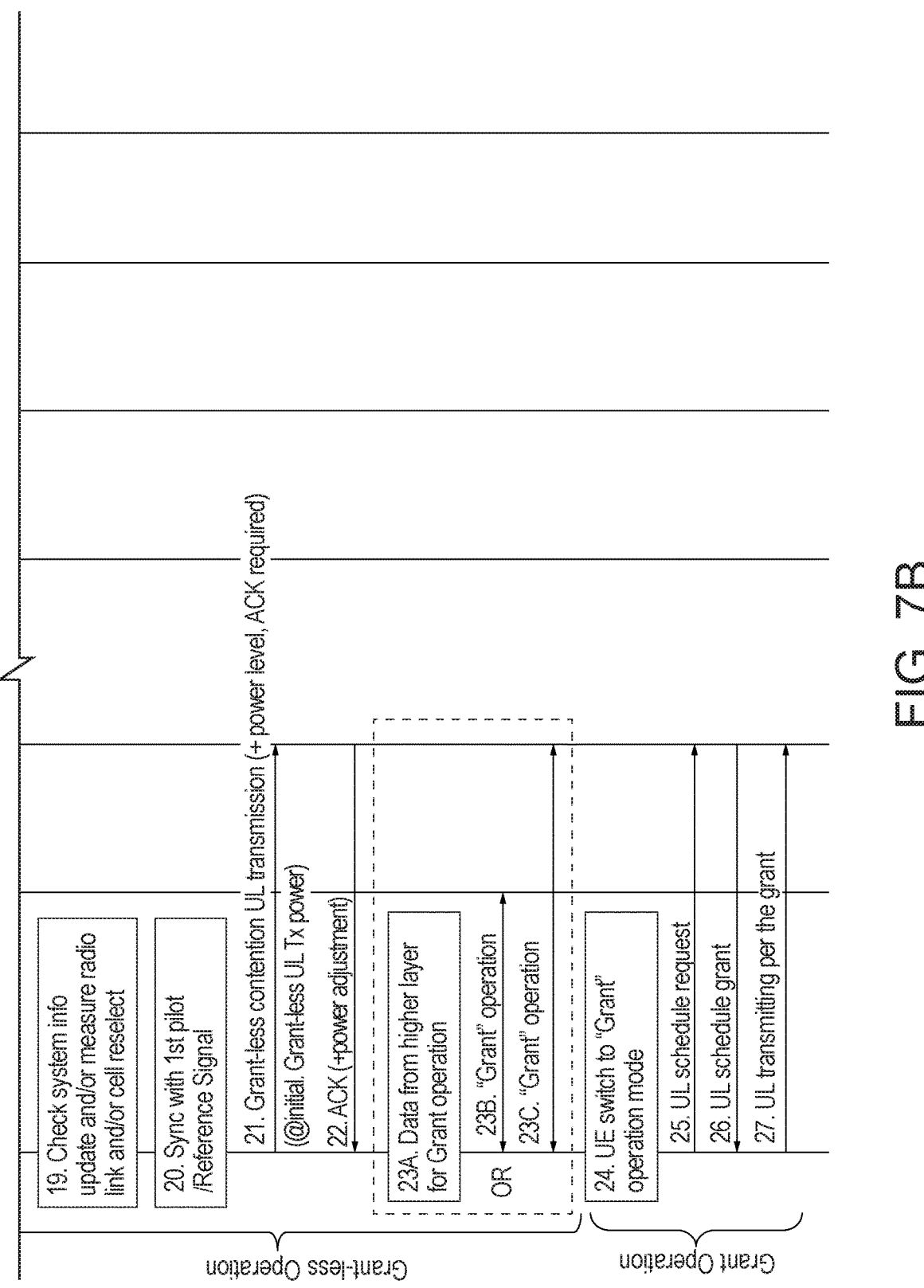

Referring now to FIG. 5A, continuing with the illustrated example, at 11, the Mobility Management node 2516 exchanges messages with the Subscription Management node 2520, so as to authenticate the UE 2502 for access to services. After the authentication, at 12, the Mobility Management node 2516 exchanges messages with the UE 2502, such that the UE 2502 and the Mobility Management node 2516 mutual authenticate each other, and then establish a Secured Mode between them. At 13, in accordance with the illustrated example, the Mobility Management node 2516 may exchange messages with the Subscription Management node 2520, so that a location of the UE 2502 is updated. Location Update: Mobility Management exchanges messages with the Subscription Management for Location Update. At 14, a non-IP or IP session may be established between the RAN mMTC slice 2510 and the CN mMTC slice 2514. The non-IP or IP session may also be established within the CN mMTC slice 2514.

With continuing reference to FIG. 5A, in accordance with the illustrated example, at 15, grant-less operations are setup. The NR-node 2504, in particular the—RAN mMTC Slice 2510, may exchange messages with the UE 2502 to configure the Grant-less operation parameters described herein, for example. Example parameters include, without limitation: contention access allocation parameters; grant-less configuration parameters (e.g., DACTI, CTI, DCA, UAP, GLUCI, etc.); seed or index of the orthogonal code for code-domain multiple accessing; seed or value of the random back-off for priority collision avoidance contention access; redundancy parameters for reliable transmissions; timers at the Inactive state (e.g., for listening to a broadcasting channel for pages or for system information changes, for conducting measurements for the radio link management, for updating statuses related to reachability and mobility, etc.); grant-less power control values (e.g., minimum and maximum UL transmission power levels and incremental adjustments, which may be calculated by the NR-node 2504 based, at least in part, the path loss and required received signal quality during the message exchanges described above between the UE 2502 and the NR-node 2504); parameters related to a schedule for grant-less UL transmissions; a coding rate; modulation scheme, etc.

At 16A, in accordance with the illustrated example, the UE 2502 confirms the grant-less configuration (allocation) with a higher layer of the UE 2502 as compared to the physical layer. Alternatively, or additionally, the UE 2502 may confirm the Grant-less setup with the NR-node 2504, in particular the RAN Slicing Management node 2508 (at 16B) or the mMTC slice 2510 (at 16C). Accordingly, the UE 2502 may receive an entering "Grant-less" operation mode command from the higher layer or from the NR-node 2504. At 17, the UE 2502 enters into an inactive state of the Grant-less operation mode. The inactive state may be preconfigured. In some cases, the inactive state may be triggered by the higher layer or the NR-node's command to operate in Grant-less mode after registration. In some cases, the UE 2502 may automatically enter the inactive state in Grant-less operation mode if configured to do so. At 18, in accordance with the illustrated example, the UE 2502 receives data from the higher layer that it needs to transmit in an UL transmission. Example data includes, without limitation, "keep alive" small data, measurement data, data associated with a reachability and mobility status of the UE 2502, or the like. At 19, the UE 2502 may need to check system information on a broadcast channel. By way of further examples, at 19, the UE 2502 may need to conduct a radio link measurement, or select a new cell based on system information or results of the radio link measurement. At 20, in accordance with the illustrated example, the UE 2502 synchronizes with reference signals or an available synchronization pilot, for instance the first available synchronization pilot, at the symbol timing boundary for allocating a contention access area.

At 21, in accordance with the illustrated example, the UE 2502 sends a grant-less UL transmission to the NR-node 2504, in particular the RAN mMTC slice 2510. In some cases, the UE 2502 may conduct contention access for the grant-less UL transmission (without redundant versions) at the initial UL transmitting power, which may defined at the Grant-less setup stage (at 15) or signaled by the NR-node 2504 via System Information broadcasting or RRC signaling. In some cases, the UE 2502 may indicate if an acknowledgement (ACK) is required for this transmission at the transmitting power level. The UE 2502 may also include radio link measurements, a reachability or mobility status, or other information with the UL data transmission at 21. At 22, the UE 2502 may wait for an ACK response, to its UL transmission, from the mMTC slice 2510. The UE 2502 may wait until an ACK timer expires if, for example, an ACK is required. At 23, in accordance with an example, the UE 2502 conducts a retransmission of the UL message. The UE 2502 may conduct contention access again, for example, if reliable transmission is required for its grant-less UL data. At 24, in accordance with the illustrated example, the NR-node 2504, in particular the mMTC slice 2510, sends an ACK message to the UE 2502 that indicates that the UL transmission from the UE 2502 was successfully received. The message at 24 may also include a power adjustment value for the UE's next grant-less UL transmission, thereby providing quasi-closed-loop Power Control. At 25, the UE 2502 may enter an inactive state of grant-less operation mode. The inactive state generally refers to a state in which the UE is not transmitting. The inactive state may be preconfigured or triggered by the higher layer's command after a grant-less UL transmission. The inactive state may also be triggered when the UE 2502 or receives an ACK from the NR-node 2502, for example, when an ACK is required for the transmission. In some cases, the UE 2502 may automatically enter the inactive state after a grant-less UL transmission, if, for example, the UE 2502 is configured to do so.

Referring also to FIGS. 6A to 7B, an example of grant-less UL transmission for URLLC devices is illustrated. An example system 2700 is shown which includes an URLLC UE 2702, an NR-node 2704, and a core network (CN) 2706. The NR-node 2704 comprises a RAN slice management function or apparatus (node) 2708 and a RAN URLLC slice 2710. The CN 2706 includes a CN Slice Management function or apparatus (node) 2712 and an URLLC slice 2714. The URLLC slice 2714 may include a mobility management node or apparatus 2716, one or more gateways 2718 (e.g., SWG, PGW) and a subscription management function or apparatus (node) 2720 (e.g., HSS). It will be appreciated that the example system 2700 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIGS. 6A to 7B, and all such embodiments are contemplated as within the scope of the present disclosure.

The example embodiment for URLLC devices illustrated in FIGS. 6A to 7B may be similar to the example embodiment for mMTC devices described above, and therefore similar operations are described with reference to FIGS. 4A to 5B. With respect to URLLC devices, however, that the context information associated with the UE 2702 may include a value that indicates that the UE 2702 can switch between grant and grant-less operations. Further, an eMBB/URLLC slice may be selected at the NR-node 2704 in order to optimize the overall system resource utilization. In an example, the URLLC slice 2714 is selected to meet short latency requirements across the system (core network 2706) 2700. In some examples, the UE 2702 conducts its grant-less UL transmission with redundancies (e.g., sends multiple transmissions at the same or different grant-less contention spaces with the same or different redundancy schemes on multiple contention blocks). In one example, at 24, the UE 2702 switches from a grant-less operation mode to a grant operation mode after receiving a command from the higher layer. By way of example, the UE 2702 may include a traffic monitor that switches from a grant-less mode to a grant operation mode to upload the images of a traffic accident to the network.

Referring now to FIGS. 8A to 9B, the example system 2500 is shown. In the illustrated example, grant-less UL operations are performed for the mMTC device 2502. In accordance with the illustrated example, the RAN Slicing Management node 2508 and the CN Slicing Management node 2512 may be logical entities that perform common control functions in the RAN and the CN 2506, respectively. For example, the RAN Slicing Management node 2508 and the CN Slicing Management node 2512 may exchange service subscription and policy information, which may be used to validate a request for access to a slice. Such information may also be used to establish security settings, power charging parameters, or the like. The RAN Slicing Management node 2508 and the CN Slicing Management node 2512 may also exchange context information associated with the UE 2502. Such context information may include, for example, mobility information, location information, transmission schedule information, data traffic information, etc. The context information may allow the appropriate, for instance optimal, slice to be selected in the RAN and the CN 2506.

The Mobility Management node 2516 and the Subscription Management node 2520 may represent common functions for the CN slices (slice common) associated with a service provider. In some cases, the Mobility Management node 2516 and the Subscription Management node may be part of the CN Slicing Management 2506, or may represent specific functions inside the CN slice 2514 provided by a specific service provider (slice specific), as shown.

Figure 8A:
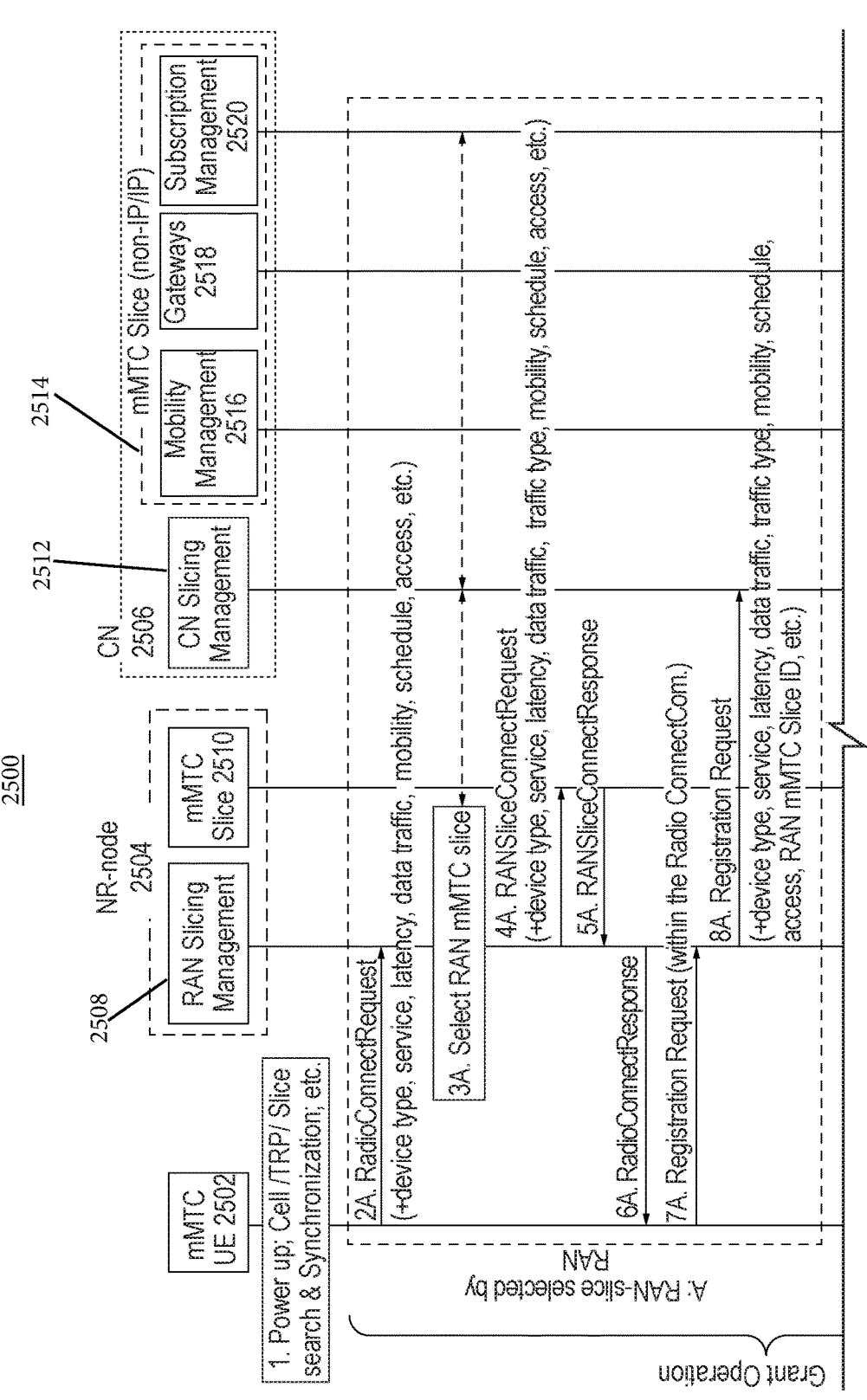
FIG. 8A-9B depict an example procedure for grant-less UL transmission for mMTC devices in accordance with an example embodiment.
Figure 8B:
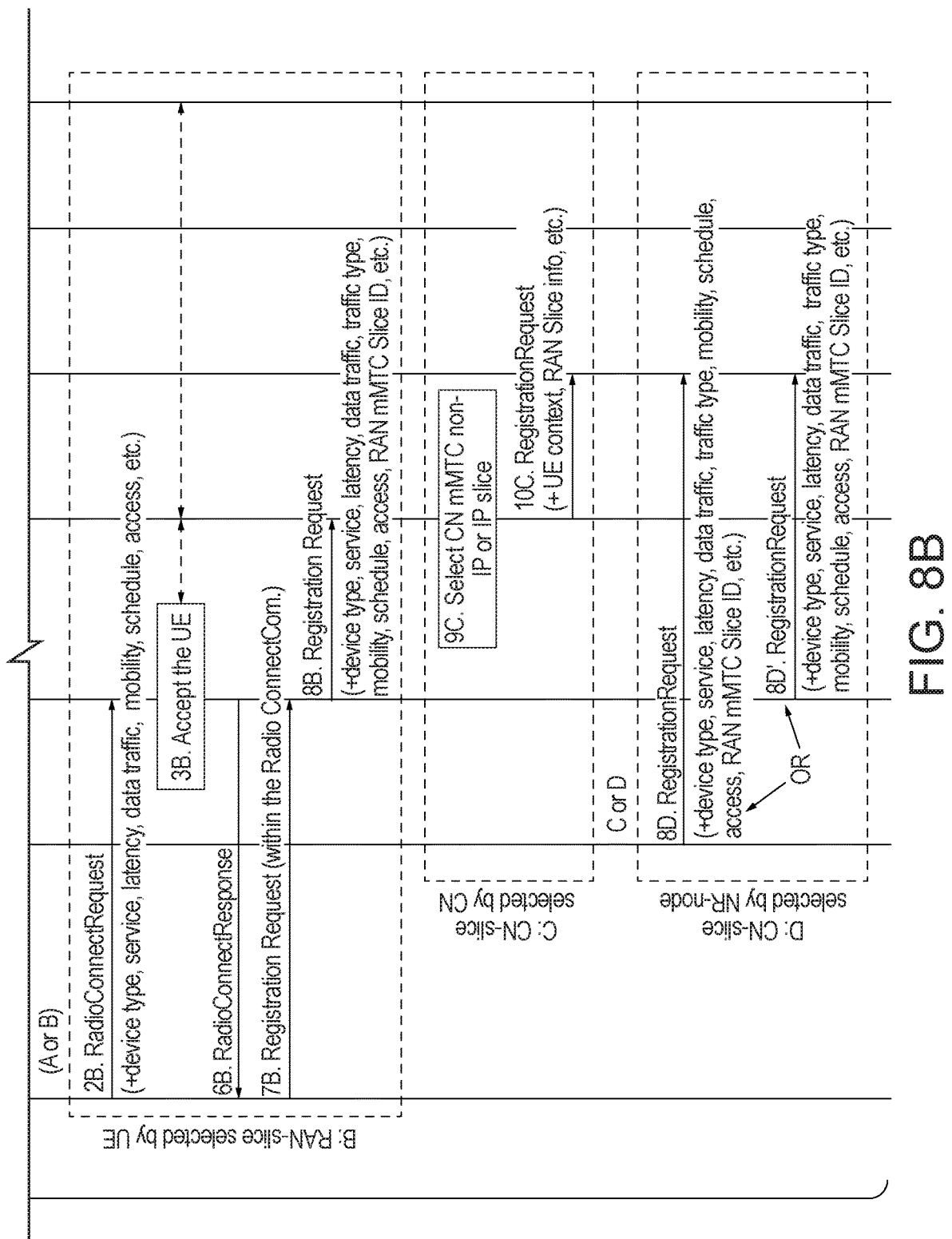

Referring in particular to FIGS. 8A and 8B, at 1, in accordance with the illustrated example, the UE 2502 powers up. After power up, the UE 2502 may conduct cell/TRP/slice search and synchronization. The UE 2502 may further acquire system information from MIB and SIBs. At this time, in some cases, the UE 2502 may be in similar states as EMM-deregistered, ECM-Idle, and RRC-Idle, as defined in the current LTE system. At 2, the UE 2502 may send a Radio Connection Request to the RAN Slicing Management node 2508 (at 2A) or the mMTC Slice 2510 (at 2B). The request may include various context information associated with the UE 2502, such as, for example and without limitation: a device type (e.g., mMTC or URLLC), a service (e.g., service for forest fire monitoring or traffic monitoring); a latency requirement (e.g., 100 ms or ultra-low latency 0.5 ms); context related to data traffic (e.g., data packet size and/or data rate and/or duty cycle); CN traffic type (e.g., non-IP or IP based); mobility context (e.g., static, pedestrian, or vehicular, or low speed in a confined area, etc.); location context (e.g., UE tracking area at RAN); schedule context (e.g., schedule of data transmissions); access context (e.g., grant or grant-less accessing, whether switchable between grant and grant-less, accessing priority, etc.). In some cases, operations 4 and 5 are not performed, for example, when the UE 2502 selects the RAN slice 2510.

At 3A, the RAN Slicing Management node 2508 may select the RAN slice 2510. The selection may be based, at least in part, on the context information associated with the UE 2502, traffic loading and resource allocations at various RAN slices, a relevant service profile or subscription, a charging policy, or the like. Information may be stored at the NR-node 2504, or received from the CN 2506 via the CN slicing Management node 2512 and/or the Subscription Management entity 2520 on the CN 2506. At 3A, the RAN Slicing Management 2508 selects the mMTC slice 2510 as the radio accessing slice for the UE 2510. At 3B, the RAN slice 3510 may determine to accept the UE's connection request for the RAN-selected or UE-selected RAN slice 3510. At 4A, the RAN Slicing Management 2508 may send a RAN slice connection request to the mMTC Slice 2510. The connection request may include the context information associated with the UE 2502, so that a radio connection can be established between the UE 2502 and the slice 2510. At 5A, in accordance with the illustrated example, the mMTC Slice 2510 sends a RAN Slice Connection Response to the RAN Slicing Management 2508. The response may indicate whether the slice connection request has been accepted. If the request is rejected, the reasons for rejection may be included in the response message. If the request is accepted if accepted, radio configuration parameters (e.g., SRB1-like and/or DBR-like dedicated radio resource configuration for the UE 2502) for the selected RAN slice 2510 may be included in the response.

Still referring to FIGS. 8A and 8B, at 6, in accordance with the illustrated examples, the RAN Slicing Management 2508 (at 6A) or the mMTC Slice 2510 (at 6B) sends a Radio Connection Response to the UE 2502. The response may indicate that radio connection is confirmed by the RAN Slice Management 2508 or the RAN mMTC Slice 2510. If the request for the selected RAN slice 2510 is rejected, the reasons for rejection may also be included in the response message. If the request is accepted, the radio configuration parameters (e.g., SRB1-like and/or DRB-like dedicated resource configuration for the UE 2502) for the selected RAN slice 2510 may be included in the response. In some cases, the RAN Slicing Management 2508 or the selected RAN slice 2510 may send (e.g., within the response message) an SBR1 and/or DRB resource (e.g., SRB and/or DRB configuration) that is dedicated to the UE 2502. Thus, the UE 2502 may be confirmed as having a successful radio connection with the mMTC Slice 2510, which may be a NAS connection with the selected RAN slice 2510. At 7, in accordance with the illustrated examples, the UE 2502 may send a registration request to the RAN Slicing Management 2508 (at 7A) or the RAN mMTC Slice 2510 (at 7B). The registration request may sent at the NAS layer, and may be encapsulated in the Radio Connect Complete message, which may also include the radio configuration as instructed by the selected RAN slice 251. The RAN Slicing Management 2508 may send the registration request to the CN Slicing Management 2512 (at 8A) or the Mobility Management 2516 (at 8D). Alternatively, the RAN mMTC Slice 2510 may send the registration request to the Mobility Management 2516 (at 8D'). The registration request may be sent to the Mobility Management 2516 when the slice 2512 is selected by the NR-node 2510. In some examples, the registration request may be sent to the CN Slicing Management 2512 when the RAN slice 2510 is selected by the UE 2502 (at 8B). The registration request may include context information associated with the UE, and slice information (e.g., an ID) associated with the mMTC slice 2510.

In some examples, the NR-node 2504 or the CN 2506 may select the CN slice 2514 based on various context information associated with the UE 2502. For example, CN slice selection may be based, at least in part, on an ID of the UE assigned by the RAN-Slicing Management 2508 or the RAN slice 2510 in the NR-node 2508, the type of the UE 2502 (e.g., mMTC or URLLC), a service performed by the UE 2502 (e.g., forest fire monitoring or traffic monitoring), a latency requirement (e.g., long latency 100 ms or ultra-low latency 0.5 ms for the session or flow end-to-end delay); data traffic (e.g., data bit rate and/or traffic load for the session or flow); a route type (e.g., non-IP or IP based), mobility (e.g., static, pedestrian, or vehicular, or low speed in a confined area); a location (e.g., UE's tracking and/or routing area in the network, such as TAI and ECGI in LTE system); schedule (e.g, schedule of UL data transmissions); charge (e.g., on-line or off-line charging), etc.

In some cases, for example, when the NR-node 2504 selects the CN slide 2514, operations 9 and 10 are not performed. In other cases, at 9C, the CN Slice Management 2512 selects an mMTC IP traffic slice (slice 2514) based on at least a portion of the context information associated with the UE, the RAN mMTC Slice 2510, CN traffic loading, or available mMTC slices, etc. At 10C, the CN Slicing Management 2506 may send a registration request to the Mobility Management node 2616. The registration request may include context information associated with the UE 2502 and information related to the RAN mMTC slice 2510. At 10C, in some cases, the connection between the NAS layers of the UE 2502 and the Mobility Management 2516 or the CN slice 2514 is established. Then, the UE may transit to various states, like EMM-Registered, ECM-Connected and RRC-Connected state in LTE system.

Figure 9A:
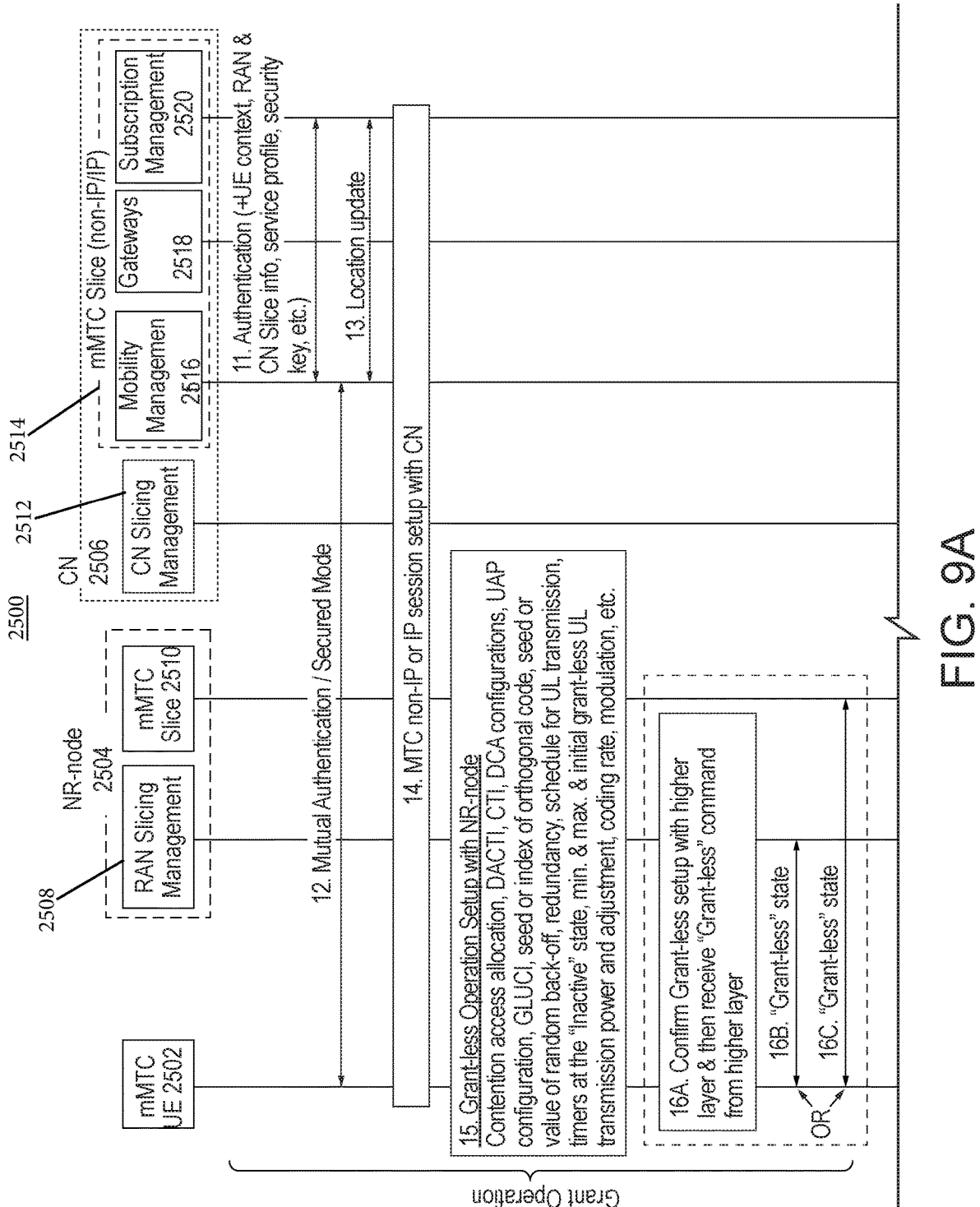

Referring now to FIG. 9A, at 11, in accordance with the illustrated example, the Mobility Management 2516 exchanges messages with the Subscription Management 2520 for authenticating the UE 2502 with the requested services. The exchanged messages may include, for example and without limitation, UE IDs (such as IMSI and Serving Network ID) and context, RAN slice and CN slice info (such as RAN slice ID and CN slice ID), service network ID, UE service profile or subscription and charging policy, an assigned UE default IP address, etc. The Security keys may be generated for establishing a secured connection in the CN 2506 and RAN. At 12, the Mobility Management node 2516 and the UE 2502, after the authentication with the Subscription Management 2520, may exchanges messages to mutual authenticate each other, and then to establish a Secured Mode for NAS signaling between them. At 23, in accordance with the illustrated example, the Mobility Management 2516 and the Subscription Management 2520 exchange messages to update a location associated with the UE 2502. At 14, in accordance with the illustrated example, an IP or non-IP session is established within the CN mMTC slice 2514 on the radio bearer between the UE 2502 and the Mobility Management 2516 in the CN 2506, over the interface between the RAN mMTC slice 2510 and the CN mMTC Slice 2514 and the network connection bearer in the core network 2506.

At 15, grant-less operations are setup. The NR-node 2504, in particular the—RAN mMTC Slice 2510, may exchange messages with the UE 2502 to configure the Grant-less operation parameters described herein, for example. Example parameters include, without limitation: contention access allocation parameters; accessing priority and/or contention priority; grant-less configuration parameters (e.g., DACTI, CTI, DCA, UAP, GLUCI, etc.); seed or index of the orthogonal code for code-domain multiple accessing; seed or value of the random back-off for priority collision avoidance contention access; redundancy parameters for reliable transmissions; timers at the Inactive state (e.g., for listening to a broadcasting channel for pages or for system information changes, for conducting measurements for the radio link management, for updating statuses related to reachability and mobility, etc.); grant-less power control values (e.g., minimum and maximum UL transmission power levels and incremental adjustments, which may be calculated by the NR-node 2504 based, at least in part, the path loss and required received signal quality during the message exchanges described above between the UE 2502 and the NR-node 2504); parameters related to a schedule for grant-less UL transmissions; a coding rate; modulation scheme, etc. At 16A, in accordance with the illustrated example, the UE 2502 confirms the grant-less configuration (allocation) with a higher layer of the UE 2502 as compared to the physical layer. Alternatively, or additionally, the UE 2502 may confirm the Grant-less setup with the NR-node 2504, in particular the RAN Slicing Management node 2508 (at 16B) or the mMTC slice 2510 (at 16C). Accordingly, the UE 2502 may receive an entering "Grant-less" operation mode command from the higher layer or from the NR-node 2504.

Figure 9B:
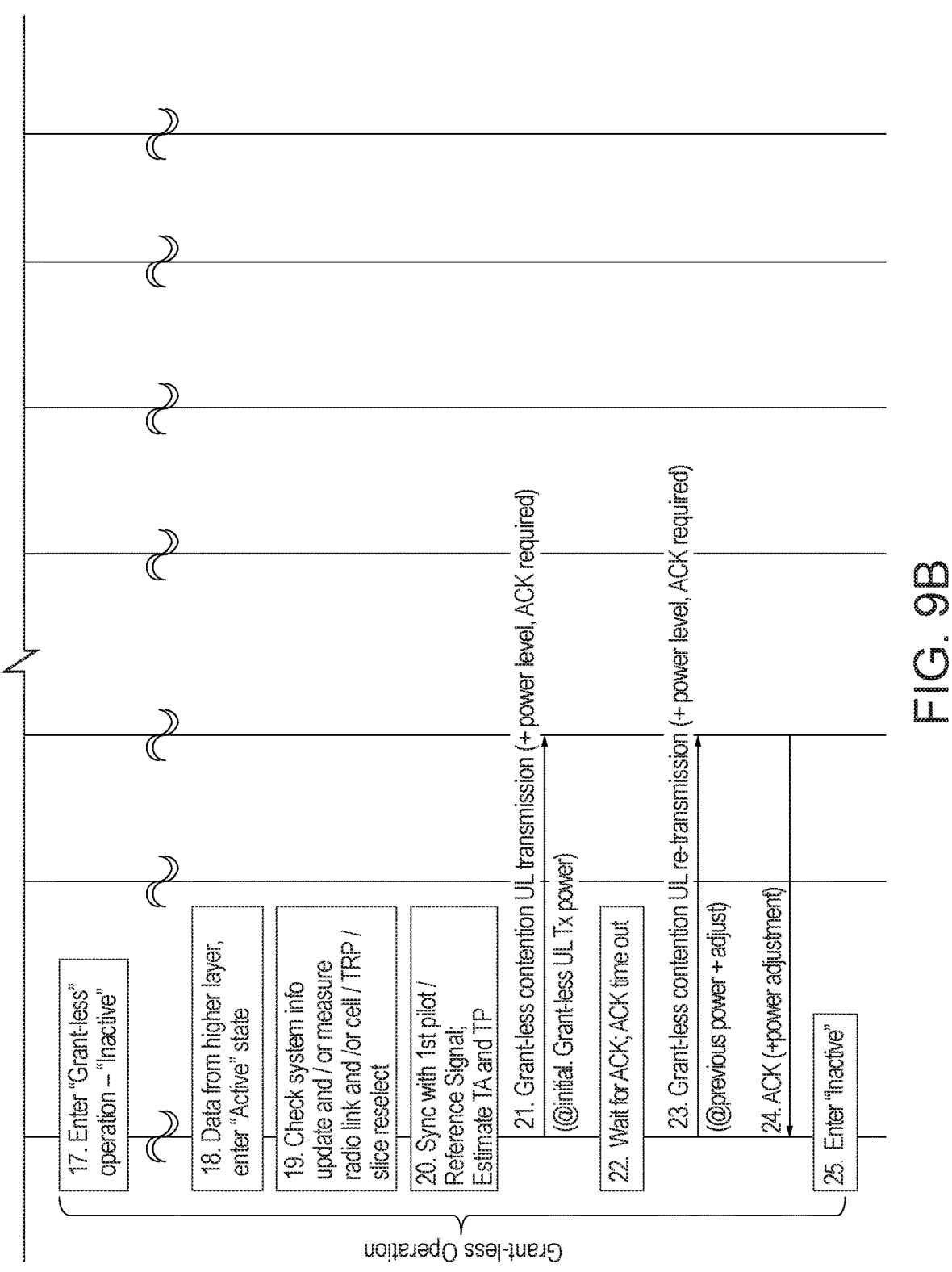
Figure 10A:
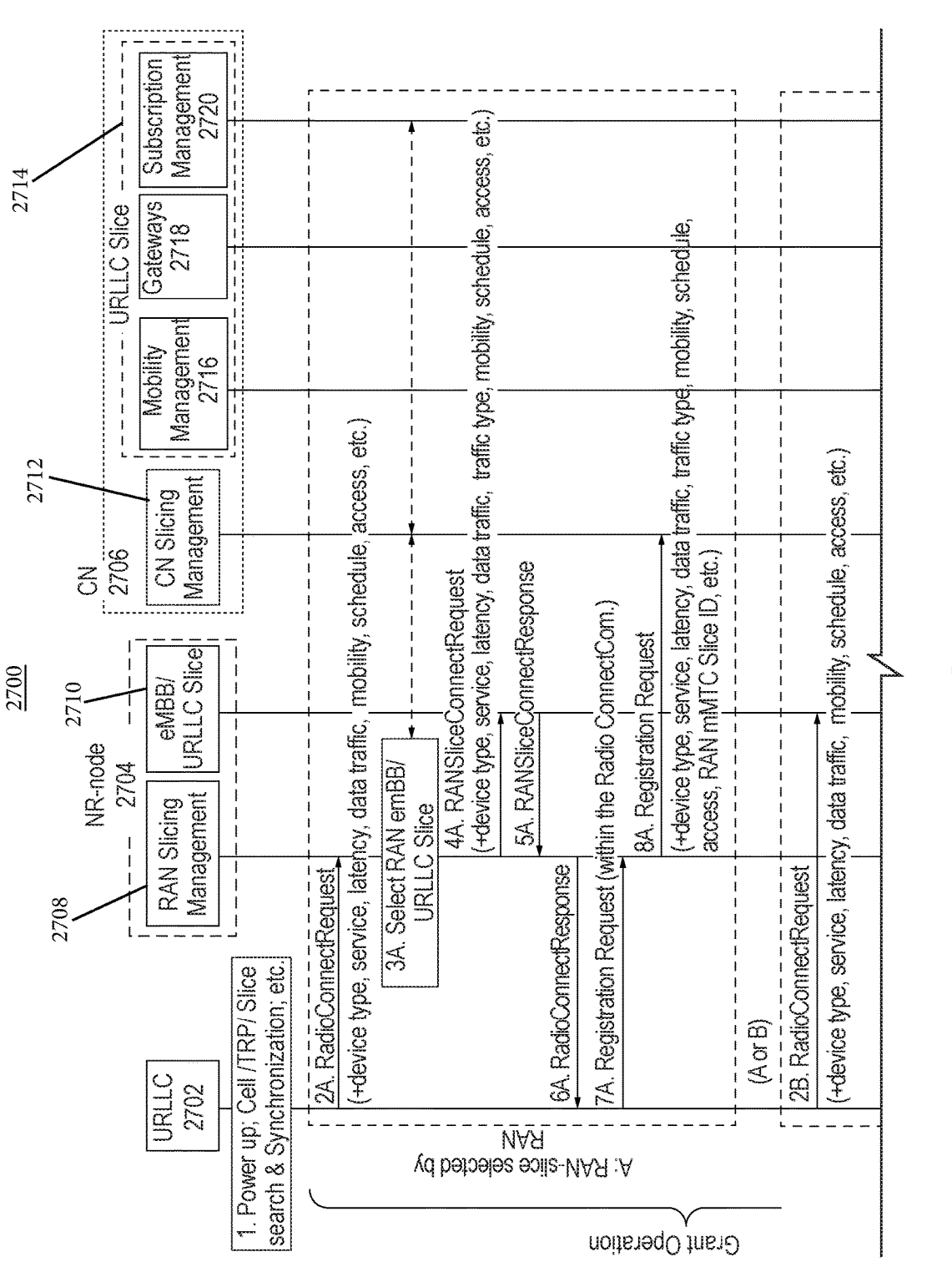
FIG. 10A-11B depict an example procedure for grant-less UL transmission for URLLC devices in accordance with an example embodiment.
Figure 10B:
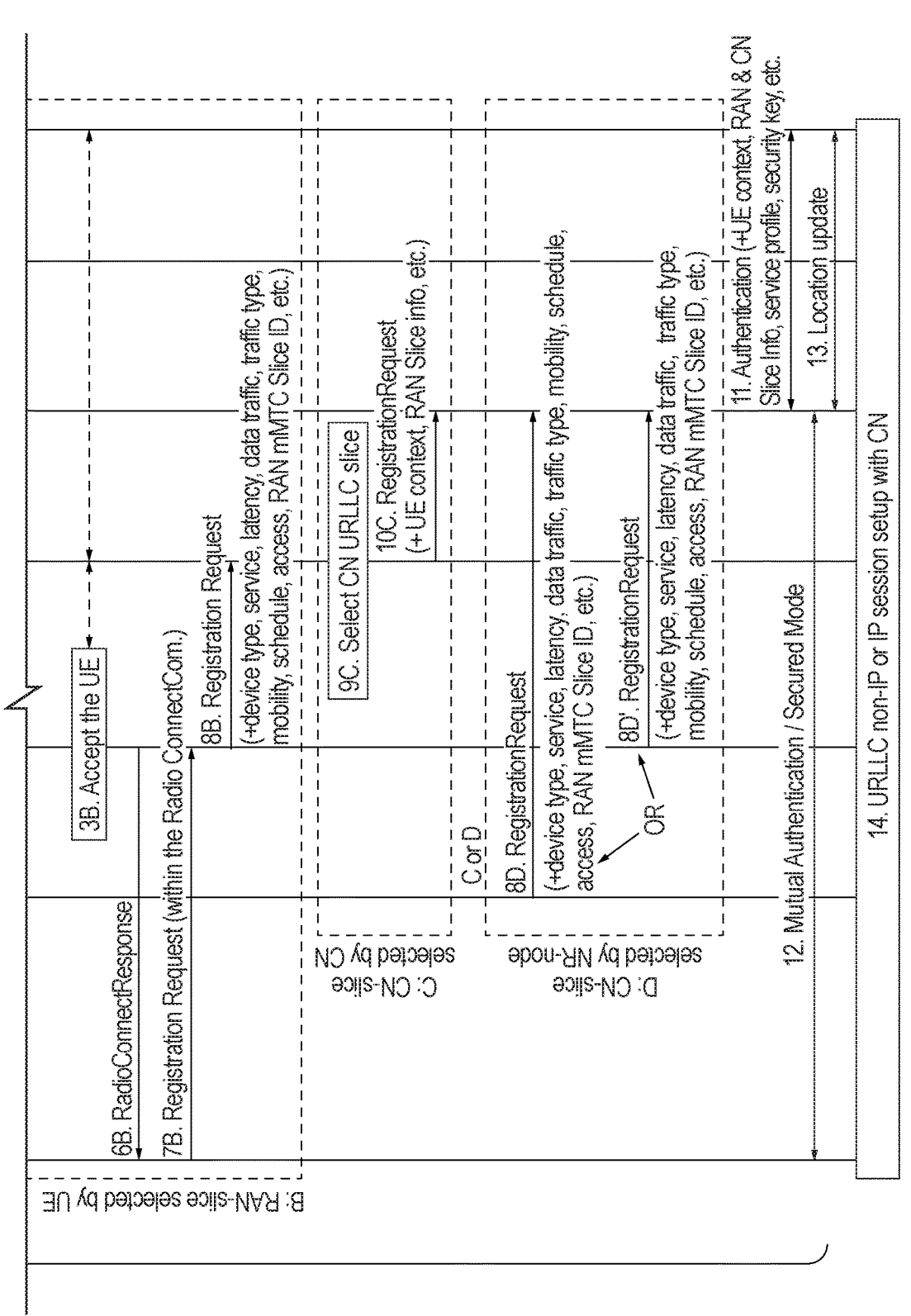
Figure 11A:
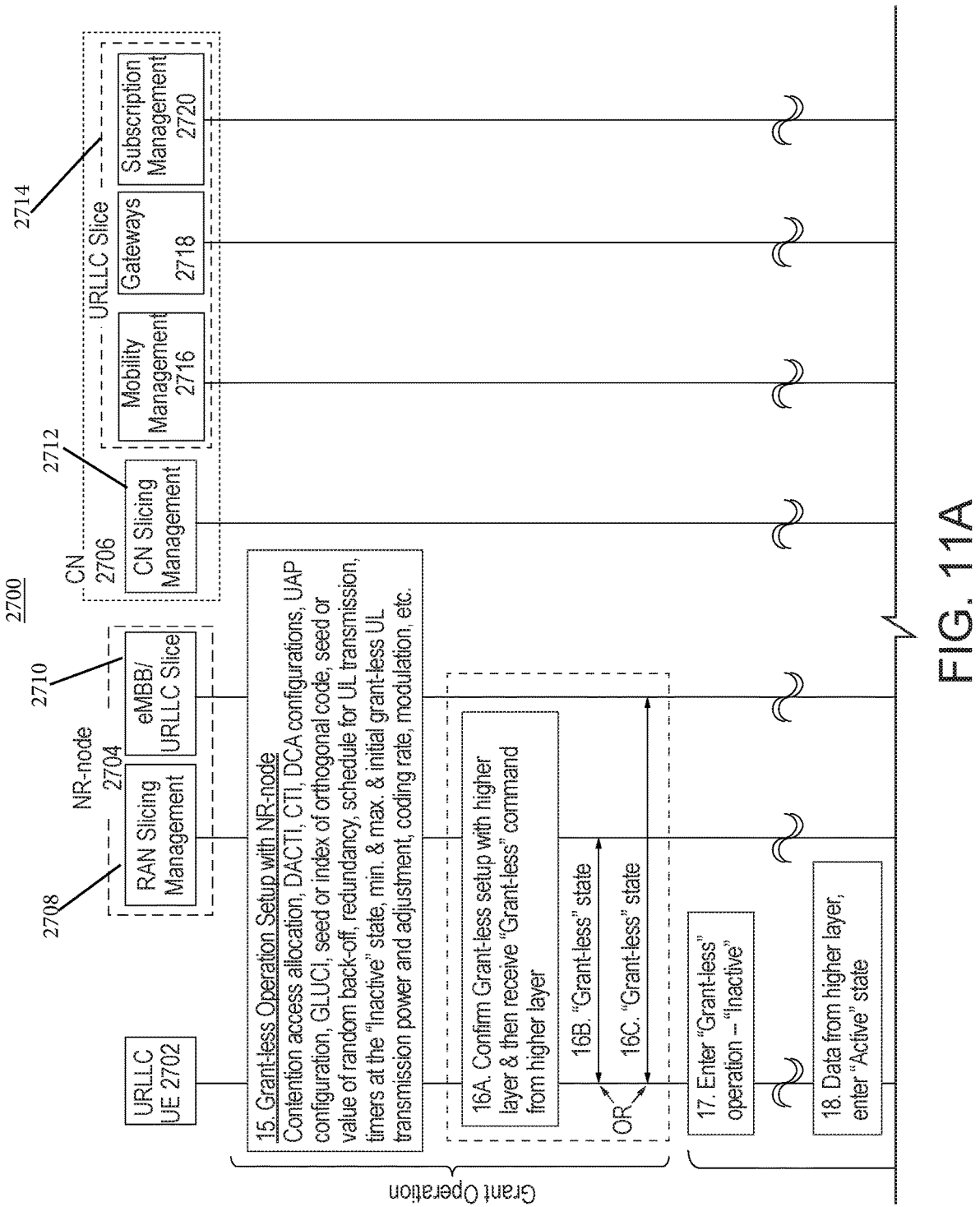
Figure 11B:
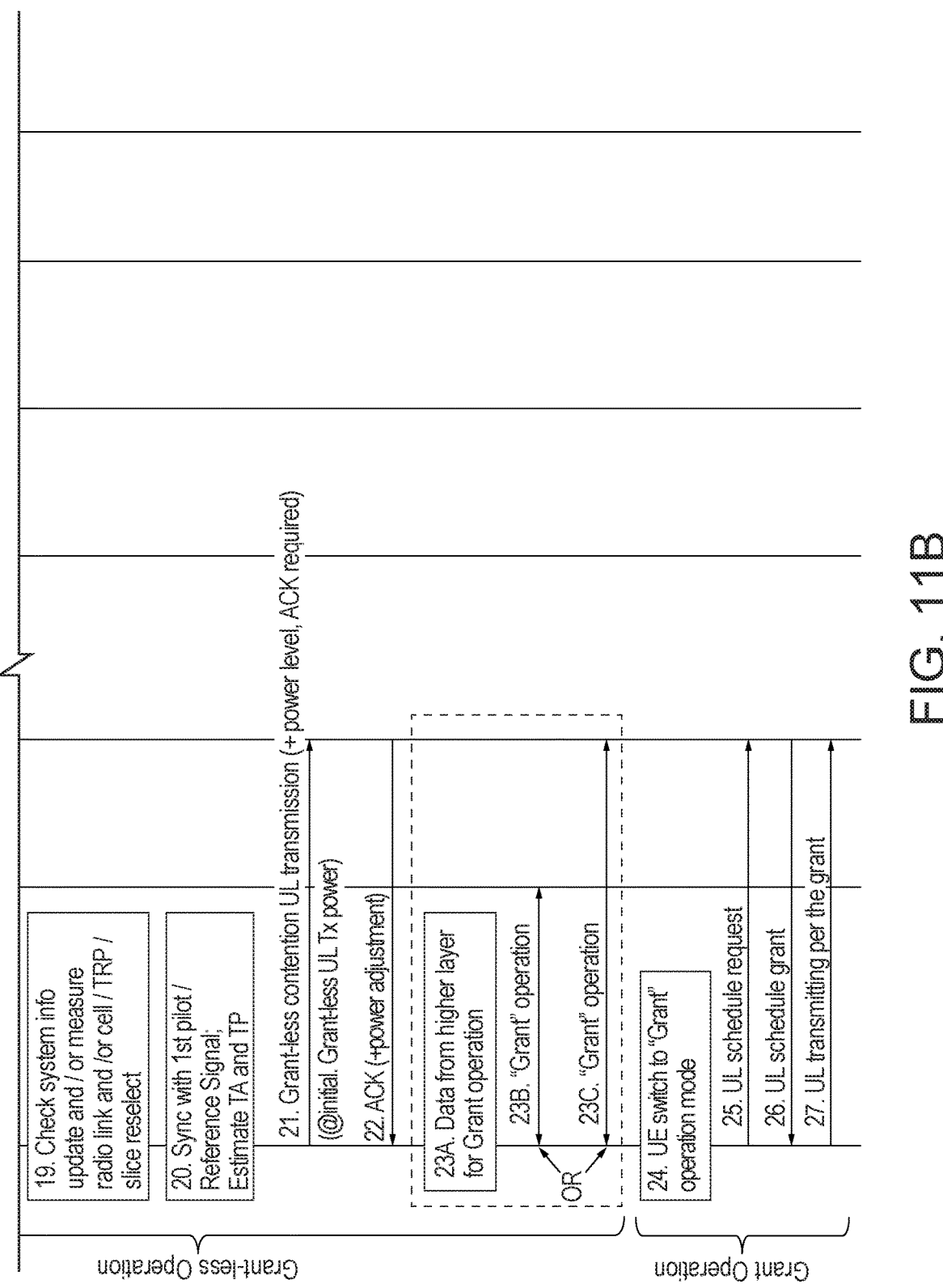
Figure 12:
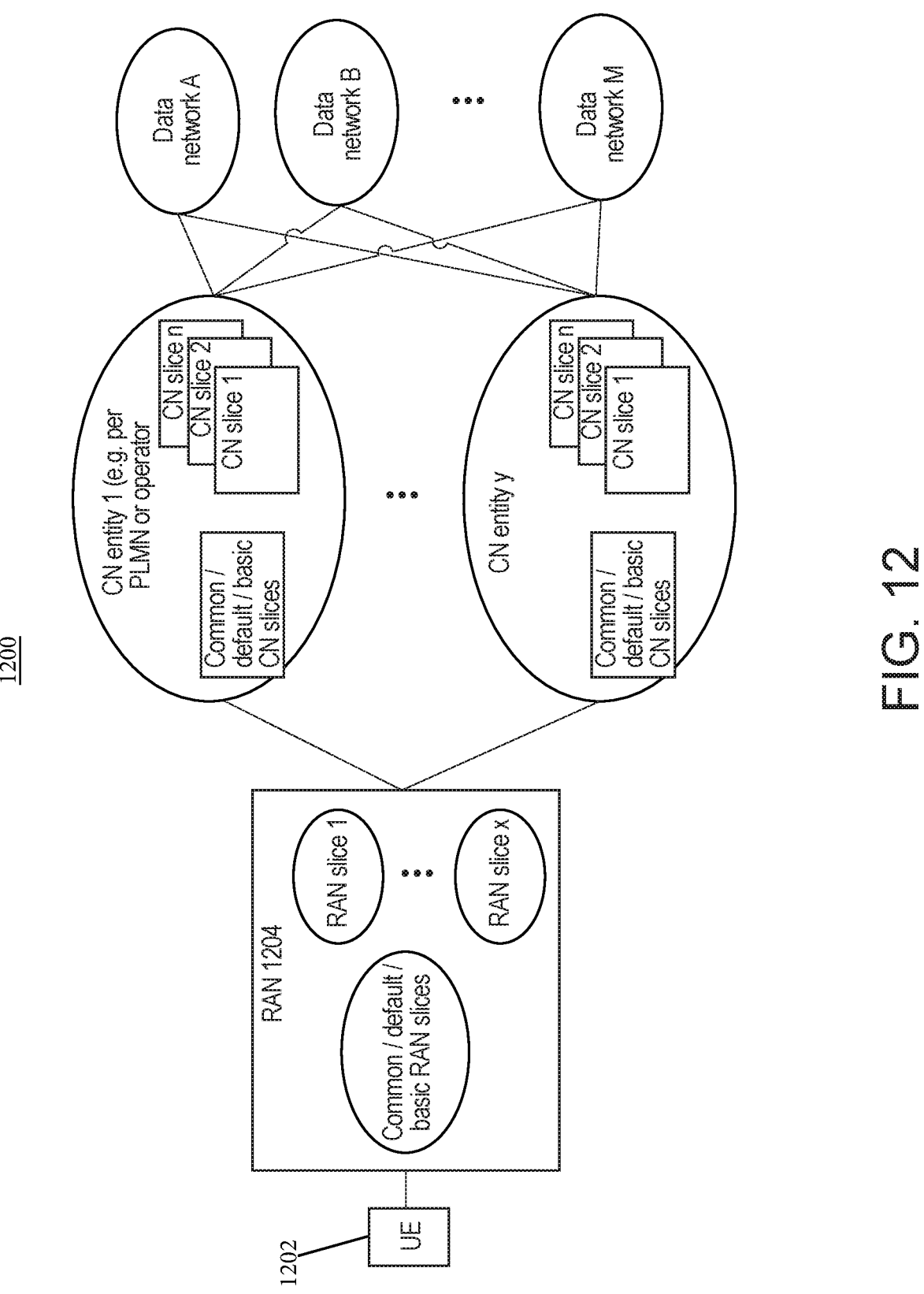
FIG. 12 illustrates an example high-level network slicing architecture.

Referring now to FIG. 9B, at 17, the UE 2502 enters into an inactive state of the Grant-less operation mode. The inactive state may be preconfigured. In some cases, the inactive state may be triggered by the higher layer or the NR-node's command to operate in Grant-less mode after registration. In some cases, the UE 2502 may automatically enter the inactive state in Grant-less operation mode if configured to do so. At 18, in accordance with the illustrated example, the UE 2502 receives data from the higher layer that it needs to transmit in an UL transmission. Example data includes, without limitation, "keep alive" small data, measurement data, data associated with a reachability and mobility status of the UE 2502, or the like. At 19, the UE 2502 may need to check system information on a broadcast channel. By way of further examples, at 19, the UE 2502 may need to conduct a radio link measurement, or select a new cell based on system information or results of the radio link measurement. At 20, in accordance with the illustrated example, the UE 2502 synchronizes with reference signals or an available synchronization pilot, for instance the first available synchronization pilot, at the symbol timing boundary for allocating a contention access area. The UE 2502 may also estimate the Time Advance (TA) for grant-less UL synchronization, at 20. Further, the UE 2502 may estimate the Transmit Power (TP) level, using the received DL reference signal, for the UL transmission.

At 21, in accordance with the illustrated example, the UE 2502 sends a grant-less UL transmission to the NR-node 2504, in particular the RAN mMTC slice 2510. In some cases, the UE 2502 may conduct contention access for the grant-less UL transmission (without redundant versions) at the initial UL transmitting power, which may defined at the Grant-less setup stage (at 15) or signaled by the NR-node 2504 via System Information broadcasting or RRC signaling. In some cases, the UE 2502 may indicate if an acknowledgement (ACK) is required for this transmission at the transmitting power level. The UE 2502 may also include radio link measurements, a reachability or mobility status, or other information with the UL data transmission at 21. At 22, the UE 2502 may wait for an ACK response, to its UL transmission, from the mMTC slice 2510. The UE 2502 may wait until an ACK timer expires if, for example, an ACK is required. At 23, in accordance with an example, the UE 2502 conducts a retransmission of the UL message with an adjusted (e.g., increased) TP level if reliable transmission is required. The UE 2502 may conduct contention access again, for example, if reliable transmission is required for its grant-less UL data. At 24, in accordance with the illustrated example, the NR-node 2504, in particular the mMTC slice 2510, sends an ACK message to the UE 2502 that indicates that the UL transmission from the UE 2502 was successfully received. The message at 24 may also include a power adjustment value for the UE's next grant-less UL transmission, thereby providing quasi-closed-loop Power Control. At 25, the UE 2502 may enter an inactive state of grant-less operation mode. The inactive state generally refers to a state in which the UE is not transmitting. The inactive state may be preconfigured or triggered by the higher layer's command after a grant-less UL transmission. The inactive state may also be triggered when the UE 2502 or receives an ACK from the NR-node 2502, for example, when an ACK is required for the transmission. In some cases, the UE 2502 may automatically enter the inactive state after a grant-less UL transmission, if, for example, the UE 2502 is configured to do so.

Referring also to FIGS. 10A to 11B, an example embodiment for URLLC devices is illustrated in which may be similar to the example embodiment for mMTC devices described above, and therefore similar operations are described with reference to FIGS. 8A to 9B. With respect to URLLC devices, however, the context information associated with the UE 2702 may include a value that indicates that the UE 2702 can switch between grant and grant-less operations. Further, at 3A or 2B, an eMBB/URLLC slice 2710 may be selected at the NR-node 2704 in order to optimize the overall system resource utilization. In an example, at 9C or 8D, the URLLC slice 2714 is selected to meet short latency requirements across the system (network) 2700. In some examples, the UE 2702 conducts its grant-less UL transmission with redundancies, for example, by using multiple contention blocks for sending the same data. In one example, at 24, the UE 2702 switches from a grant-less operation mode to a grant operation mode after receiving a command from the higher layer. By way of example, the UE 2702 may include a traffic monitor that switches from a grant-less mode to a grant operation mode to upload the images of a traffic accident to the network.

It is recognized herein that, in an NR network, different CN entities may belong to different operators, and thus available network slices within one CN entity might not be visible to another CN entity. In some cases in which the RAN has no slice information from a UE to determine CN entity can be chosen, there may be one or more default/common CN entity(s) for a RAN to choose for a given UE, for example, based on various criteria (e.g. UE's basic/default device/service type, load balancing algorithm, etc). In some cases, once a default/common CN entity has been assigned, this CN entity may further allocate, for the UE, a special CN entity identifier (CN-ID), which the RAN can use for subsequent routing of UE slice requests.

Network slicing may be viewed as a network management tool that may allow a Mobile Network Operator (MNO) to efficiently allocate network resources in order to meet the service requirements of a customer or an application. Each MNO may create a customized set of network slices to meet their business and service needs. In some instances, a network slice may be pre-configured; in other instances, a network slice may be dynamically commissioned or re-configured to meet traffic demands. Thus, a network slice may be specific to a particular MNO network at a particular location and at a particular point in time. For example, a pre-configured slice may refer to a slice that configured once or a slice that is dynamically re-configured to meet traffic demand.

A network slice selection may, in some cases, consist of a RAN portion and a CN (PLMN) portion. In some examples, the RAN slice may be visible to a UE during cell search/selection stage (e.g. SIBs), and the CN slice might not visible to the UEs. Instead, in some cases, a UE may be provided with a multi-dimensional descriptor that can be used to select an appropriate network slice for the differentiated service offered by an MNO. The provided descriptor (which may include an application identifier, a type of service, etc.) may have global significance (e.g., valid for all PLMNs) or may have local significance (e.g., valid for the PLMN currently connected). Determining the appropriate network slice may be a CN function that may consider multiple factors, such as, for example and without limitation, the multi-dimensional descriptor, the UE service profile, network topology, the current location of the UE, the time of day, current system loading, MNO policies, etc. In some cases, mapping a descriptor onto a network slice is a CN function. In other cases, a descriptor may include a slice identifier that can be used by the RAN to identify a pre-configured network slice.

An example network slicing system 1200 is shown in FIGS. 12-19. The system 1200 may include a UE 1202, a RAN 1204 (e.g., 5G or NR RAN), one or more CN entities 1-*y*, one or more Data networks A-M. The RAN 1204 may include an NR node (e.g., gNB) 1204*a*, a TRP 1, and one or more RAN slices 1-*x*. The RAN 1202 may provide common, default, or basic slices to the UE 1202. The CN entities may also provide basic slices. In this context, unless otherwise specified, common, default, and basic may be used interchangeably, without limitation. The functionality of the basic slices may vary as desired. The CN may also include one or more CN slices 1-*n*. It will be appreciated that the example system 1200 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIGS. 12-19, and all such embodiments are contemplated as within the scope of the present disclosure.

With respect to common slices, in some cases, common functions are shared by multiple network slices. These common network functions may include, for example, fundamental Control Plane (CP) network functions to support common operations among Network Slice Instances (NSIs) within a RAN and a Core Network. For example, authentication and authorization is a common function for authenticating and authorizing the UE so that the UE can attach to the operator's network. This function may also provide security and integrity protection of NAS signaling. In some cases, this function is only applicable in CN common slices. A Mobility Management function may be responsible for UE registration in the operator's network (e.g., storing of UE context) and UE mobility support (e.g., providing mobility function when UE is moving across base stations within the operator's network)). A routing function may route UE NAS/AS messages to correct network slice instances (NSIs)). An example Network Slice Instance Selection Function may select a proper slice for a UE, for example, if no specific slice is already requested by a UE. In some cases, common functions are not common to all slices. For example, a slice specific authentication and authorization function may be required when each slice requires different levels of security. Alternatively, some functions may be common to a set of slices.

In some examples, a UE has access to one or more initial default slices when the UE performs an initial attach/connection with the network and does not specify a specific network slice with which to connect. These default slices may include control plane (CP) function, user plane (UP) functions, or a combination thereof, as desired. In some cases, a redirection function enables a PLMN to steer a UE to different NSI(s), for example, depending on the type of application and service the UE requires. Alternatively, or additionally, the UE may be steered based, at least in part, on changes to a UE's subscription, an operator's policy, etc. In some cases, redirection functions may reside in each specific NSI, so that a currently selected NSI can directly redirect a UE to another suitable NSI, if the target NSI is known. Alternatively, redirection functions may reside only in the common slices, so that NSI selection and redirection are managed at the same centralized location.

As used herein, unless otherwise specified, an NSI-ID refers to a network slice instance identifier, which may be used to reference a particular network slice within a particular MNO network, for example, at a particular location and at a particular point in time. As used herein, unless otherwise identified, a CN-ID refers to a CN entity identifier, which may be used to reference a particular CN entity. By using this ID, the RAN may support a selection of the specified CN entity for routing of NAS uplink messages. For example, the RAN may forward a UE's CN slice request message.

As used herein, unless otherwise specified, when the UE selects a network slice instance, the selection may be referred to as UE based. Similarly, when the RAN selects a network slice instance and the CN selects a network slice instance, the slice selection may be referred to as RAN based and CN based, respectively.

In some cases, a UE is in idle mode when there is not active connection with the RAN and CN. Various examples are not discussed for UE based network slide selections, wherein the UE is in an idle mode. In an example, the UE may acquire traffic characteristics from its upper layer and slice information from the network. Based on this information, the UE may determine which slice to access.

In a first example (Example 1 in FIG. 13), a UE may acquire slice information (e.g., supported service types, QoS parameters, etc.) before accessing the network. For example, a RAN may broadcast Slice information via SIB messages, and may allocate slice specific access resources for the UE (e.g., slice specific random access resources). If multiple RANs/RATs/cells are available during the UE's cell search, the UE may choose a suitable RAN/RAT/cell with which to connect. For example, the RAN/RAT/cell that the UE selects may have the least load or may provide the most candidate network slices. Network slices may be statically preconfigured in this example.

In another example (Example 2 in FIG. 13), a given UE is unable to acquire slice information before accessing the network, so the UE may establish a regular connection with the RAN (e.g., RRC connection). After establishing the connection, the UE may be which be configured with slice information by the RAN (e.g., RRC configurations). In this example, network slices may be dynamically commissioned or reconfigured to meet traffic demands, and thus a given network slice may be specific to a particular MNO network, for example, at a particular location and at a particular point in time.

In yet another example, a given UE is in the idle mode due being in a low power mode (e.g., sleep), but the UE has saved slice information from previous network connections. Alternatively, the UE may be preconfigured with slice information, for example, by users or/and operators. The saved or preconfigured slice information may be valid, and thus the idle UE may acquire slice information without performing a cell search. Network slices may be statically preconfigured in this example.

Figure 13:
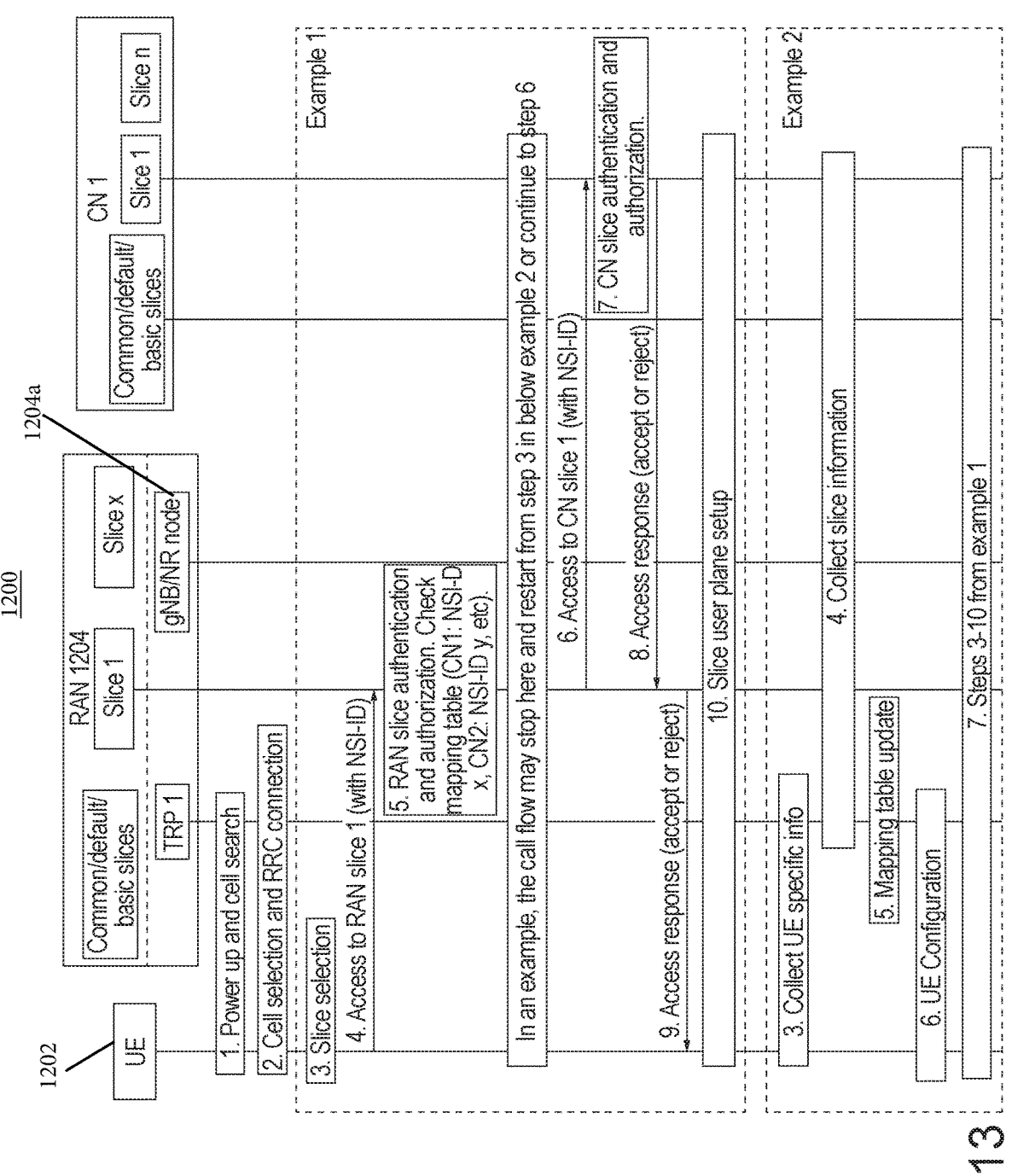
FIG. 13 is a call flow for initial network slice discovery and selection by a UE in an idle mode in accordance with an example embodiment.

Referring now to FIG. 13, it will be understood that the TRP 1 and NR node 1204*a* within the RAN 1204 may be physical entities or apparatuses, and slices may represent logical/virtual resources. In some cases, slices 1-*x* may cover physical resources from the NR node 1204*a* and TRP 1. In accordance with the illustrate example, slice 1 has has its own authentication and authorization functions.

At 1, in accordance with the illustrated example, the UE 1202 is powered up and has no connection with any network. It stays in idle mode to perform cell search. During the cell search, the UE is able to find and acquire synchronization to selected/reselected cells, and then receive and decode broadcast SIB messages, which may contain the slice information provided by the RAN 1204. In an example, the format of the slice information may be similar to the Multi-Dimensional Descriptor (MDD) defined in 3GPP TR 23.799. The multi-dimensional descriptor may contain one or more of following vectors, presented by way of example and without limitation: Application ID, Slice Type (RAN or CN slice), Validity Periodicity (e.g. hours, days, etc), Service Descriptor (e.g. eMBB service, CriC, mMTC), NSI-ID, etc. The NSI-ID can be standardized and shared across different CN entities/PLMNs, or it can be specific per CN entity/PLMN. At 2, the UE selects a RAN to establish a connection.

At 3, in accordance with illustrated Example 1, the UE 1202 is able to acquire slice information from the RAN at operation 1 or 2 (e.g. via broadcast SIBs or on-demand SIBs). The UE may acquire its own specific information, such as, for example and without limitation, capabilities, traffic characteristics, service types, etc. Based on slice information and UE specific information, the UE makes a decision on which slice (e.g., RAN slice or CN slice or both) to access.

In some cases, the selection criteria may consist of multiple weighted factors. For example, resource sharing/isolation model (e.g. static, dynamic, etc), intra-slice competition level, CN-entity loading (if there are multiple CN entities available), achievable bandwidth, mean latency, etc. Note that it is supposed that all candidate slices being evaluated could meet the UE and network's requirements, but different slices still have different capabilities and properties. For example, the latency in all candidate slices can meet the requirement of 10 ms, but some slices may even have mean value of latency lower than 5 ms.

At operation 4 of Example 1 of FIG. 13, with the NSI-IDs determined at 3, the UE 1202 may sends an access request (e.g., attach request) with the NSI-ID to the selected RAN slice (slice 1 in FIG. 13). The UE 1202 may carry the RAN NSI-ID inside the request message to the RAN 1204. RAN 12024 uses the NSI-ID to identify the requested RAN slicing inside the same RAN entity. In another example, if RAN 1202 provides a slicing specific access resource (e.g., slicing specific random access resource), then the UE 1202 might not carry the RAN NSI-ID inside the access request message.

Figure 1:
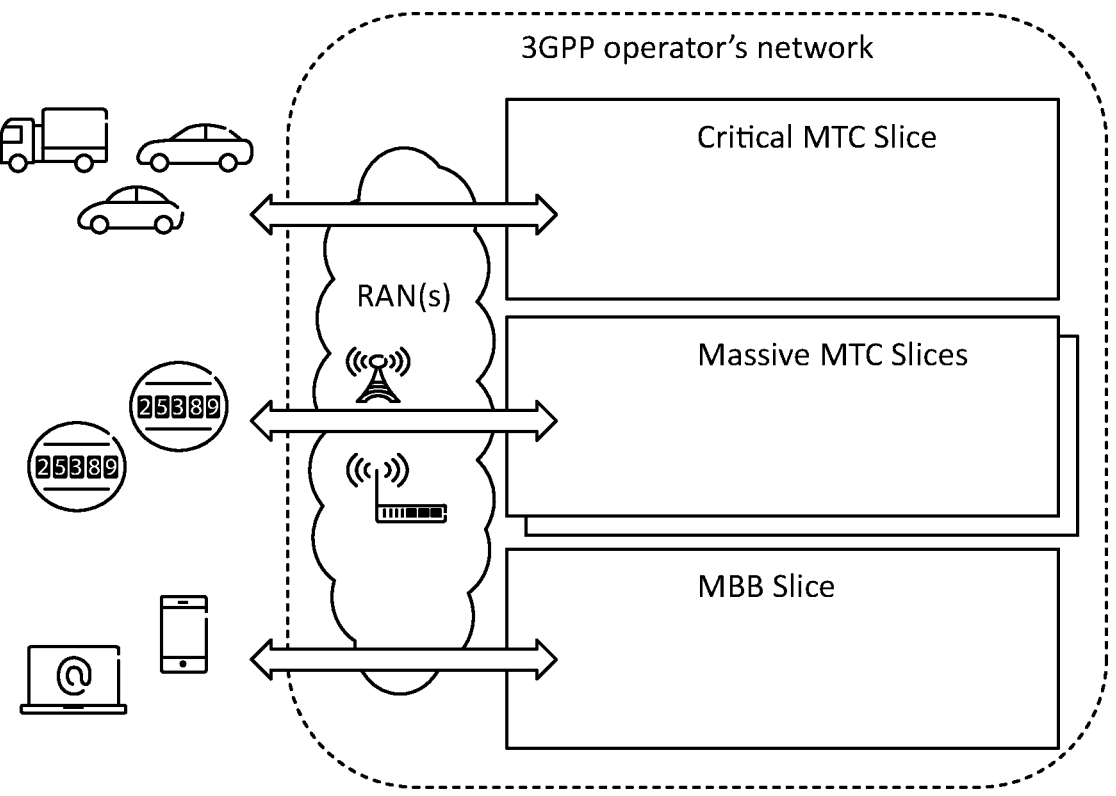
FIG. 1 depicts an example of network slicing.
Figure 2:
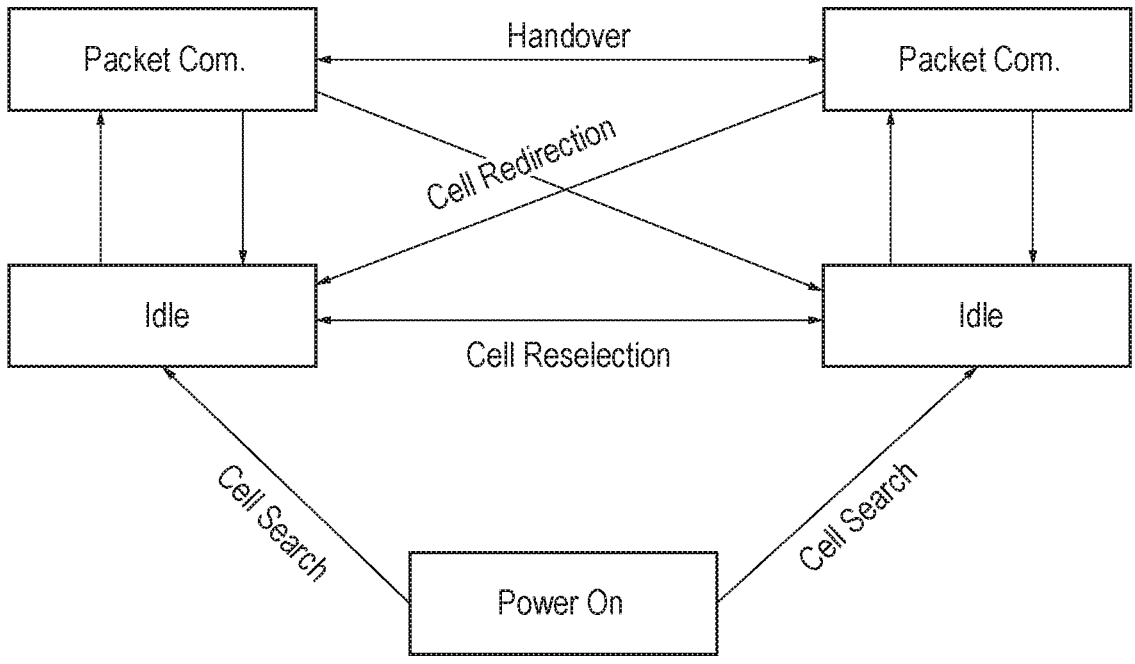
FIG. 2 shows states of operations associated with an example user equipment (UE)

At 5 of Example 1, still referring to FIG. 1 of FIG. 13, a RAN slice identity check is performed to check whether the UE 1202 is authenticated and permitted to access the RAN slice. In some cases, this can be done by the common/default/basic slice or by the selected slice. Once this authentication is passed, the RAN slice may check a mapping table to find out to which CN entity the request message of a specific CN slice (if specified by a CN NSI-ID given by the UE) will be routed. In an example, there is no CN NSI-ID included in the request at 4. In another example, there is a CN NSI-ID included in the request at 4, but RAN slice 1 does not know/find the corresponding slice in the mapping table (e.g., entries of record to indicate which CN entity has a CN slice indexed by a NSI-ID). For example, a CN slice may be dynamically allocated and, in some cases, only exist for a certain time duration, such that the given CN NSI-ID may be expired. Alternatively, the carried CN NSI-ID in the request might not be a standardized NSI-ID, and thus the CN NSI referred by the NSI-ID may have been allocated by a previously visited CN entity/PLMN. Such a CN NSI might be valid in limited number of CN entity/PLMN, and thus not valid for all the CN entities/PLMNs. In yet another example, there is a CN NSI-ID included in the request at 4, and RAN slice 1 knows the corresponding slice. In this case, the access request may be routed to a specific CN network slice in a specific CN entity (CN 1), and the example procedure may continue to operation 6. With respect to the other examples in which the RAN 1204 does not know where to route the slice request (e.g., which CN entity to go), the process may proceed to operation 3 of Example 2 in FIG. 13.

Still referring to FIG. 13, at 6 of Example 1, the RAN slice 1 sends an access request (e.g., attach request originated from the UE 1202) to CN slice 1 in CN entity 1 (CN 1) after checking the mapping table in operation 5, where a valid pair of CN-ID and CN NSI-ID is found. At 7 of Example 1 of FIG. 13, CN slice 1 performs a UE identity check, for example, by verifying the UE's subscription, the operator's policy, or the like, to determine whether the UE is permitted to access the CN slice 1. At 8, in accordance with the illustrated example 1 of FIG. 13, CN slice 1 sends an access response message to RAN slice 1. At 9, RAN slice 1 forwards the access response message to the UE 1202. At 10, the response message may indicate that the request message initiated at operation 4 is accepted or rejected. If the request is accepted, the UE 1202 may set up user plane connections with the allocated/selected RAN slice (RAN slice 1) and the CN slice (CN slice). If the request is not accepted, in an example, operations 4 to 9 may be repeated after a retransmission timer expires. Or, in another example, operations 3 to 9 may be repeated so that an access request to another selected slice is initiated after a delayed timer expires. Alternatively still, the UE 1202 may quit and render an error message the user.

With respect to Example 2 of FIG. 13, TRP1 (or a network entity that has a direct radio link with the UE 1202) may collect specific information from the UE 1202. The UE's specific info may include, for example and without limitation: Slice selection assistance information, such as UE capabilities (e.g., antennas, frequency, etc), service type associated with the UE 1202 (e.g., eMBB, mMTC), traffic characteristics associated with the UE 1202 (e.g. real-time video, heartbeat monitoring, etc), QoS parameters required by the UE 1202 (e.g., throughput, packet loss ratio, jitter delay, etc), slice license agreements, etc. The slice selection assistance information may further include a New Radio or 5G Globally Unique Temporary Identity (NGUTI), which may point to the NG CN NF in use, and which may be common for the NSIs that the UE is allowed to use. The slice assistance information may further include preferred PLMNs, or an identity associated with the UE (UE identity), for example, when the NGUTI is not available. At 4, in accordance with the illustrated Example 2 of FIG. 13, TRP 1 Interacts with the gNB/NR node 1204a and one or more CN entities and, based on the collected UE specific information, acquires a list of available Network slice instances (RAN/and or CN) that satisfy the UE's requirements and the CN/PLMN and operator's requirements. In an example, if the list contains only one network slice (one RAN slice or one CN slice), this UE based selection may change to a network based selection (RAN or CN based). At 5 of Example 2, once receiving the available slice information from the CN, the TRP 1 may update the mapping table so that new records of the pair of CN-ID and matching CN NSI-ID are appended to the table. In some cases, the updated mapping table may be used for future routing.

Still referring to Example 2 of FIG. 13, at 6, the UE 1202 is configured with the list of available Network slice instances, as described above. For example, the UE 1202 may be configured in a format similar to the Multi-Dimensional Descriptor (MDD) defined in 3GPP TR 23.799. The multi-dimensional descriptor may contain various vectors, such as, for example and without limitation: Application ID, Slice Type (RAN or CN slice), Validity Periodicity (e.g. hours, days, etc), Service Descriptor (e.g. eMBB service, CriC, mMTC), NSI-ID, etc. The NSI-ID can be standardized and shared across different CN entities/PLMNs, or it can be specific per CN entity/PLMN. At 7, operations 3 to 10 described above with reference to Example 1 of FIG. 13 may be performed.

Turning now to UE connected mode network slice discovery and selection, when the UE is in a connected mode, it has an active connection with the network. If the UE has not already been associated with or connected with the network, it may perform an initial network slice discovery and selection, as now described in detail in accordance with various embodiments.

Figure 14:
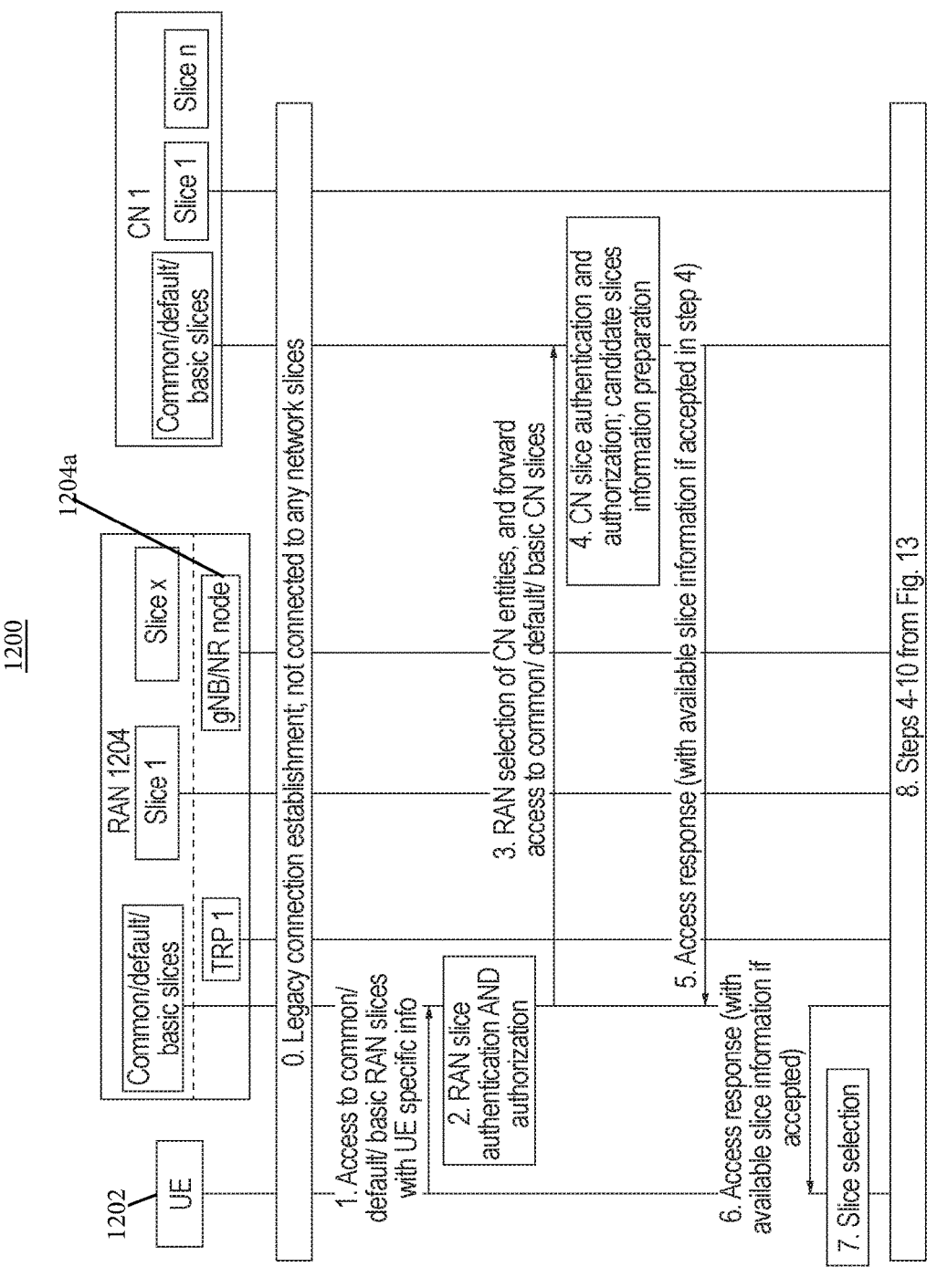
FIG. 14 is a call flow for initial network slice discovery and selection by a UE in a connected mode in accordance with an example embodiment.

Referring to FIG. 14, in accordance with the illustrated example, the UE 1202 does not have a valid set of available slice information preconfigured or saved, so the UE (at 1) sends an access request to a RAN common/default/basic slice to acquire slice information. This slice may be known to the UE 1202 in advance. In an example, the UE 1202 may send the request for the slice information by itself, without the TRP 1 sending the request on behalf of the UE 1202. For example, the UE 1202 may send an explicit slice information request, or the request may be piggy-backed on an initial attach response, etc. UE specific information, such as the information described above with reference to Example 2 of FIG. 13, may be included in the request. In some cases, for example if the UE 1202 has a valid set of available slice information preconfigured or saved, the process may proceed to operation 7. Further, in an example, if the UE 1202 is re-attaching to the network 1204 and wants to reuse a NSI previously selected, the process may proceed to operation 8 by using a cached NSI-ID.

Still referring to FIG. 14, at 2, in accordance with the illustrated example, a RAN slice identity check is performed to check whether the UE 1202 is authenticated and permitted to access this RAN common/default/basic slice. At 3, the RAN common/default/basic slice performs RAN selection of CN entities. In some cases, the RAN 1204 may select a default CN entity or select specific CN entities by following a pre-defined rule/function or a load balancing algorithm. The RAN 1204 may then forward the request to the common/default/basic slice of the one or more selected CN entities. At 4, by fetching the UE's subscription profile and other slice selection assistance information (e.g., charging, operator's policy, etc), for example, the CN common/default/basic slice may verify whether the UE 1202 is authorized to access the network slices in this CN entity (CN 1). Based on the slice selection assistance information carried in the request (e.g., UE's service type and QoS requirements, etc) and availabilities and properties associated with the slices, which may be provided by the RAN 1204 and the CN entity 1, a set of one or more candidate network slices may be determined for the UE 1202. In some cases, new slices may be created/allocated, or one or more existing slices may be re-configured to meet the various requirements. If the request is accepted by the CN 1, the CN 1 may send a response that includes available slice information to the RAN 1204. If the response is not accepted, a NACK or other reject message may be sent back as a response. At 6, the response from operation 5 is forwarded to the UE 1202. At 7, the UE 1202 may evaluate the candidate slice information carried in the received access response at operation 6, as described above, and select one or more slices based on the information. The UE 1202 may select one or more RAN slices and one or more CN slices. The UE 1202 may use various selection criteria, which may be weighted, to select the one or more slices. Example selection criteria may include, for example and without limitation, a resource sharing/isolation model (e.g., static, dynamic, etc.), an intra-slice competition level, CN-entity loading, achievable bandwidth, mean latency, etc. In an example, a plurality of candidate slices, for instance all candidate slices being evaluated, may meet the UE's requirements and the network's requirements. In those cases, different slices may have different capabilities and properties, and therefore a selection may made based on those differences. For example, the latency in all candidate slices might meet the requirement of 10 ms, but some slices may even have a mean value of latency lower than 5 ms, and others might not. At 8, in accordance with the illustrated example, operations 4 to 10 from Example 1 of FIG. 13 may be performed.

In various UE based examples described above, one or more candidate available network slice instances are provided to the UE by the network, and the UE determines which slice to access. In various example RAN and CN based selections, a Network Slice Instance Selection Function (NSISF), which does not reside in the UE, may make slice determinations. In some cases, the NSISF may be provided by the RAN or CN. In an example RAN based slice selection, the UE is now aware of slice information of the network. The RAN may acquire traffic characteristics from a UE's report, or the UE may explicitly send the information to the RAN. For example, the RAN may command a UE to report its traffic characteristics when accessing the network. The RAN may acquire a CN slice instance from a CN node or from operation and management CN entities. If the initial accessing slice is not intended for the UE, the RAN redirect/handover the UE to another target slice instance. In some cases, the RAN may make the decision on behalf of UE to select the appropriate slice instance.

In some cases, as described in the illustrated examples, the NSISF may be included in the common/default/basic slices of the RAN or CN. Alternatively, the NSISF may be a standalone node (not co-located with any network slices) in the RAN or CN.

Figure 15:
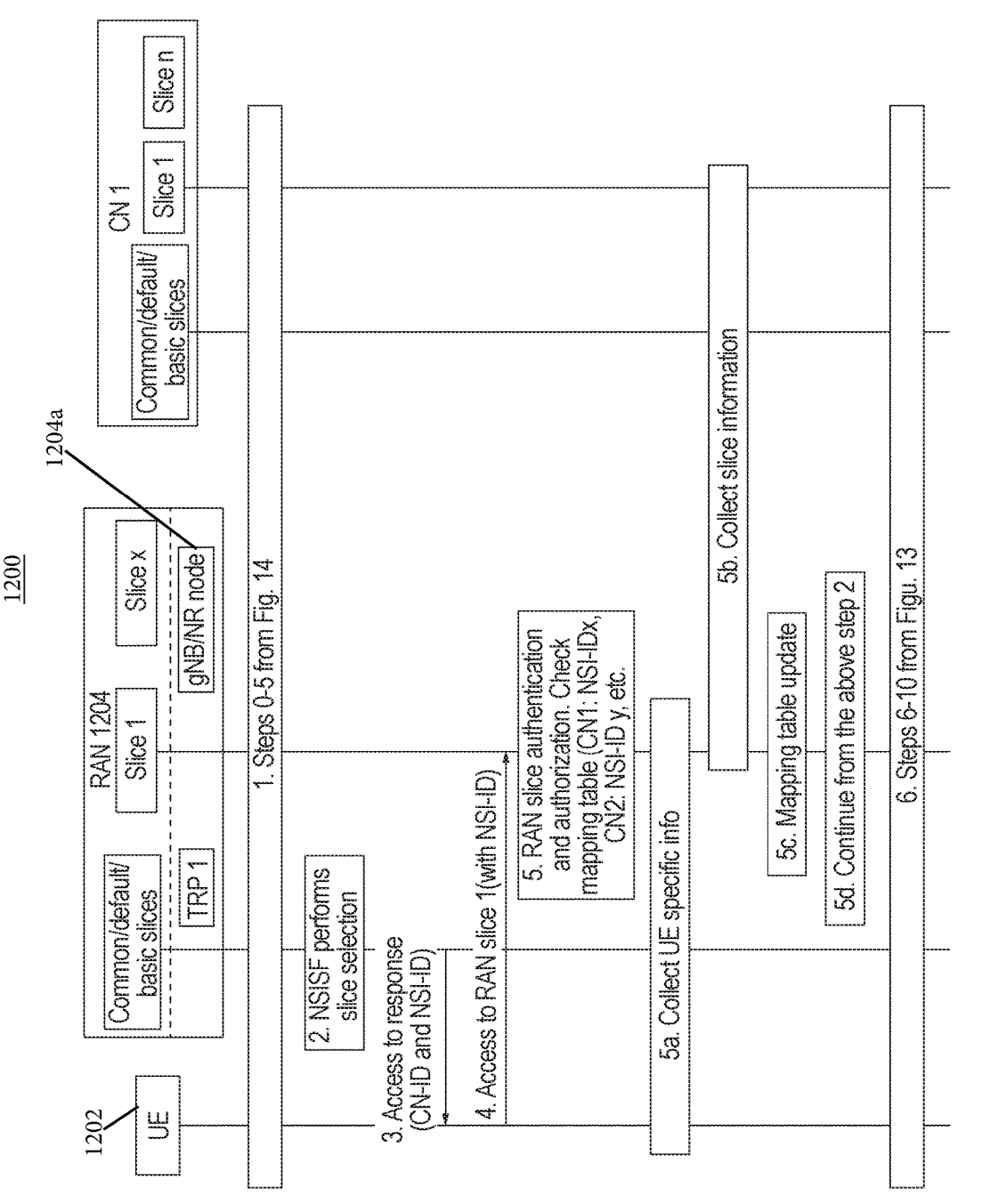
FIG. 15 is a call flow for radio access network (RAN) based connected mode initial network slice discovery and selection.

Referring now to FIG. 15, in accordance with the illustrated example, operations 0 to 5 of FIG. 14 may be performed, in which the UE 1202 sends a slice request to RAN common/default/basic slices, slice authentication and authorization is performed, the RAN selects CN entities and the access request is forward, and the candidate slice information is prepared. At 2, in accordance with the illustrated example, the NSISF in the common/default/basic slice selects an appropriate slice for the UE from the set of candidate slice information carried in the access response, according to UE provided and CN provided slice selection assistance information. The CN provided information may be carried in the assess response or cached or pre-configured in the RAN. At 3, the access response may sent to the UE 1202. In accordance with the illustrated example, the access response may include one network slice instance, which corresponds to the selected NSI in operation 2. In some cases, the RAN and CN slices are considered to be a single complete network slide instance). Still referring to FIG. 15, at 3, the UE 1202 sends an access request (e.g., attach request) with the NSI-ID the selected RAN slice. The UE 1202 may carry the RAN NSI-ID inside the request message to the RAN 1204. The RAN 1204 may use the NSI-ID to identify the requested RAN slicing inside the same RAN entity. In another case, if the RAN 1204 provides a slicing specific access resource (e.g., slicing specific random access resource), then the UE 1202 might not carry the RAN NSI-ID inside the access request message. At 5, a RAN slice identity check is performed to check whether the UE is authenticated and permitted to access the RAN slice. Once this authentication is passed, for example, the RAN slice may check a mapping table to determine which CN entity the request message of a specific CN slice (e.g., if specified by a CN NSI-ID given by the UE) will be routed. In an example (subcase a) there is no CN NSI-ID included in the request at 4. In another example (subcase b), there is a CN NSI-ID included in the request at 4, but RAN slice 1 is not able to identity the corresponding slice in the mapping table (e.g., entries of record to indicate which CN entity has a CN slice indexed by a NSI-ID). For example, a CN slice may be dynamically allocated and only exist for a certain time duration, such that the given CN NSI-ID may be expired. Alternatively, by way of another example, the carried CN NSI-ID in the request might not be a standardized NSI-ID, such that the referred CN NSI by the NSI-ID was allocated by a previously visited CN entity/PLMN and is valid in a limited number of CN entity/PLMN. In still another example (subcase c), there is a CN NSI-ID included in the request at 4, and RAN slice 1 knows the corresponding slice.

For the example subcases a and b, the RAN might not know where to route the slice request (e.g., which CN entity to go), and thus the process may proceed to 5a to 5d. For example subcase c, the access request may be routed to a specific CN network slice in a specific CN entity, and the process may continue to operation 6.

At 5a, operation 3 of Example 2 of FIG. 13 may be performed, where the TRP 1 collects UE's specific info from the UE 1202. At 5a, the communication may be between the RAN slice 1 and the UE 1202 instead of the TRP 1 and UE 1202. At 5b, operation 4 of Example 2 of FIG. 13 may be performed, in which the TRP 1 Interacts with the gNB/NR node 1204a and CN entities based on the collected UE specific information, and acquires a list of available Network slice instances. At 5b, the communication may be between the RAN slice 1 and the UE 1202 instead of the TRP 1, gNB/NR 1204a, and UE 1202. At 5c, operation 5 of Example 2 of FIG. 14 may be performed, where the TRP 1 updates the mapping table so that new records of the pair of CN-ID and matching CN NSI-ID are appended. At 5c, the RAN slice 1 may update the mapping table instead of the TRP 1. At 6, operations 6 to 10 from the Example 1 of FIG. 13 may be performed.

Figure 16:
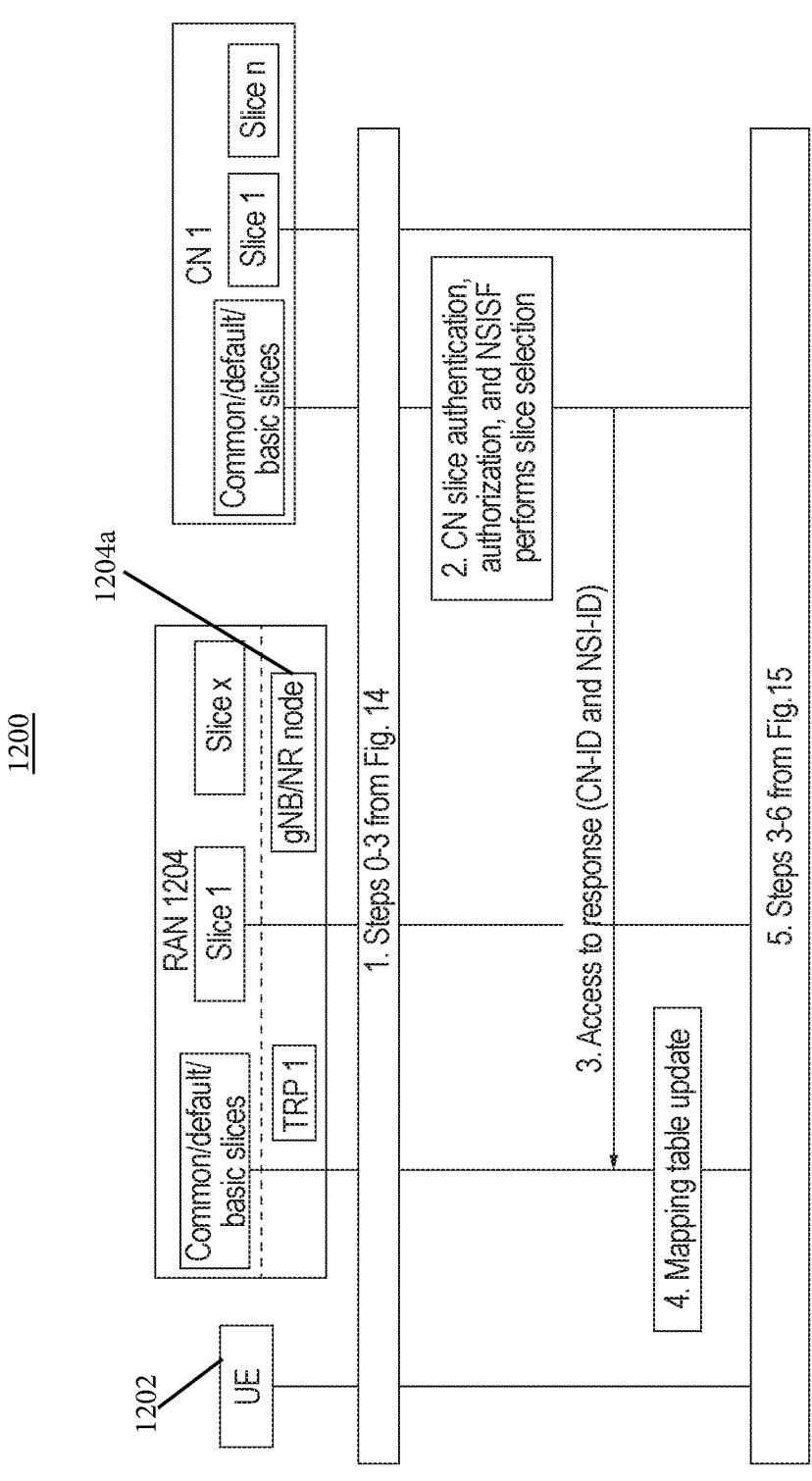
FIG. 16 is a call for core network (CN) based connected mode initial network slice discovery and selection in accordance with an example embodiment

Turning now to FIG. 16, an example CN based selection is depicted. At 1, operations 0 to 3 from FIG. 14 may be performed. At 2, in accordance with the illustrated example, CN slice authentication and authorization is performed, and the NSISF performs slice selection. In an example, a single network slice instance may be selected for the UE 1202 by the NSISF. The selection criteria used by the NSISF may be similar or the same as the selection criteria described above. At 3, the selected NSI is sent back to the RAN 1204. At 4, operation 5c of FIG. 15 may be performed. At 5, operations 3 to 6 of FIG. 15 may be performed.

Turning now to additional slice requests, in some examples, a UE may subsequently request other services that result in discovery and selection of additional slices. In an example case (Example 1), a UE directly sends a new service request to the NSISF, where a new slice is discovered and selected. The NSISF can reside in the UE, RAN or CN, such that UE based, RAN based, or CN based network slice discovery and selections may be performed. In another example (Example 2), a UE sends a new service request to the current serving slice, where the request is accepted (the requirements of the new service can be satisfied, etc.). In yet another example case (Example 3), the UE sends a new service request to the current serving slice, where the request is not accepted (e.g. the requirements of the new service cannot be satisfied, or do not comply with the UE's subscription or the operator's policy, etc.). As a response, the serving slice may reply with a rejection message, or redirect the request to the NSISF where an alternative slice may allocated and selected.

Figure 17:
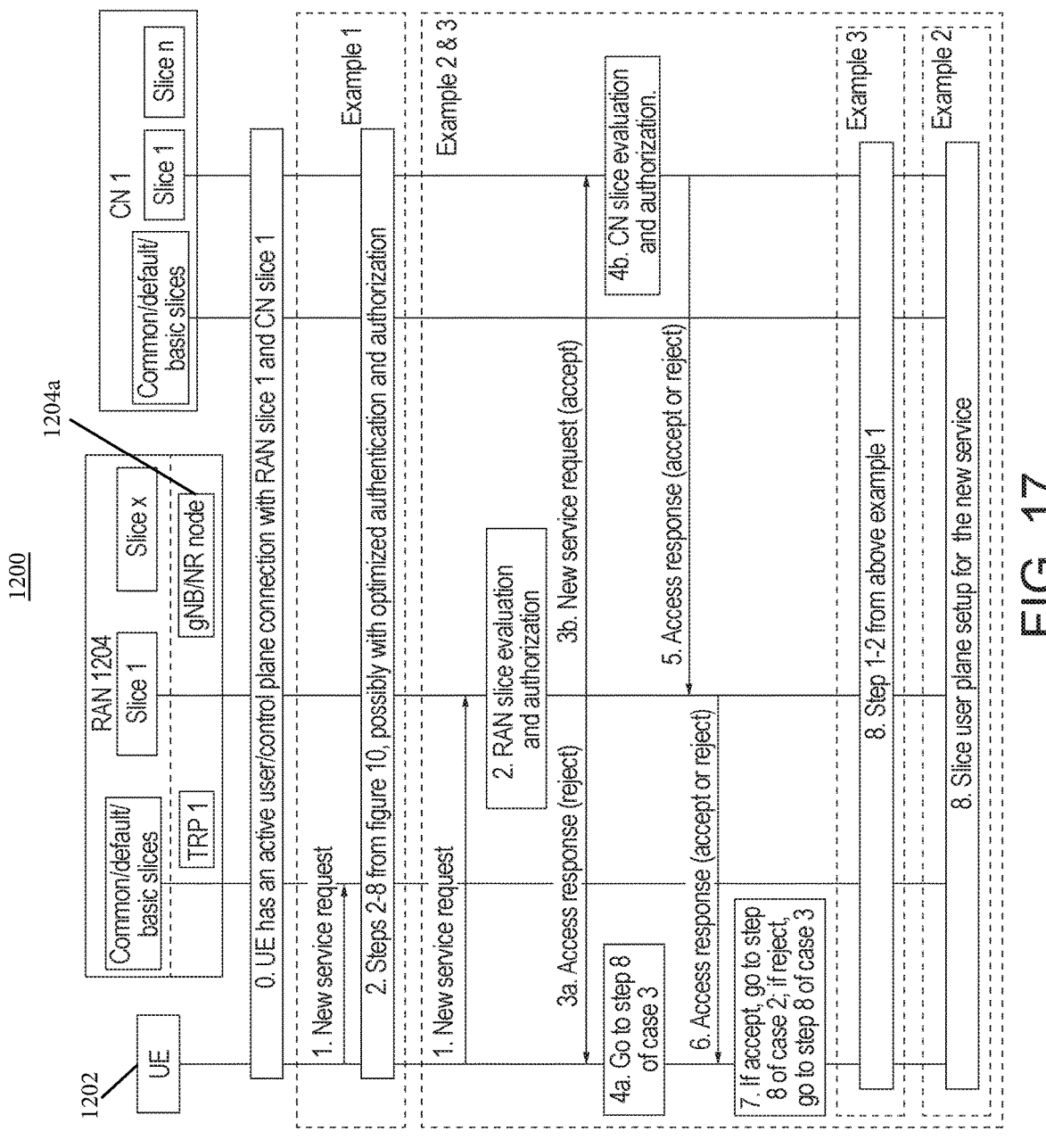
FIG. 17 is a call flow for UE based connected mode additional network slice discovery and selection in accordance with an example embodiment.

Referring now to the FIG. 17, in Example 1, at 1, the UE 1202 sends the new service request directly to the common/ default/basic slice, where the NSISF resides. At 2 of Example 1, operations 2 to 8 of FIG. 14 may be performed. Because the UE already has an active network slice being selected and assigned, the authentication and authorization procedures may be optimized or skipped. For example, UE context/identity and the subscription profile may be still saved/cached in the RAN or/and CN common/default/basic slices, such that the authentication process may be simpler and faster without fetching that information from, for example, a database/repository. Alternatively, the UE 1202 may reuse security credentials and/or identities that can be carried in the new service request, such that authentication and authorization may be skipped.

In Examples 2 and 3, as shown in FIG. 17, at 1, the UE 1202 sends the new service request directly to the currently using RAN slice 1. At 2, the RAN slice 1 performs an evaluation to determine whether the RAN slice 1 is able to serve the new service. In performing the evaluation, the RAN slice 1 may weight various parameters, such as, for example and without limitation, UE capabilities (e.g., antennas, frequency, etc.), service type associated with the UE (e.g., eMBB, mMTC), traffic characteristics associated with the UE (e.g., real-time video, heartbeat monitoring, etc.), QoS parameters (e.g. throughput, packet loss ratio, jitter delay, etc.), etc. The RAN slice 1, in some cases, also checks to determine whether this new service of the UE 1202 is permitted to use RAN slice 1. The RAN slice may check, for example and without limitation: UE subscriptions, slice license agreements, operator's policies, charging requirements, etc. At 3, if the request does not pass the evaluation or/and authorization check at 2, the process may proceed to 3a, where a reject response is sent back to the UE 1202 and then the process proceeds to 4a. If both checks pass, the process may proceed to 3b, where the UE initiated new service request may be forwarded to the corresponding CN slice (CN slice 1 in FIG. 17), and then the process may proceed to 4b. At 4a, operation 8 of Example 3 is performed, and in particular operations 1 and 2 of Example 1 of FIG. 17 are performed. At 4b, CN slice evaluation and authorization is performed, which is described at operation 2. At 5, a response message is sent back to RAN slice 1 by the CN slice 1. At 6, the response message is forwarded back to the UE by the RAN slice 1. At 7, if the message received by the UE 1202 at 6 includes an acceptance indication, the process proceeds to operation 8 of Example 2. If the UE 1202 receives a rejected response, the process may proceed to operation 8 of Example 3. At 8 of Example 2, a current network slice is able to serve the new service, so the use plane setup for the new service is set up (e.g., Service Session Establishment, QoS management, transport layer connection establishment, etc.).

Figure 18:
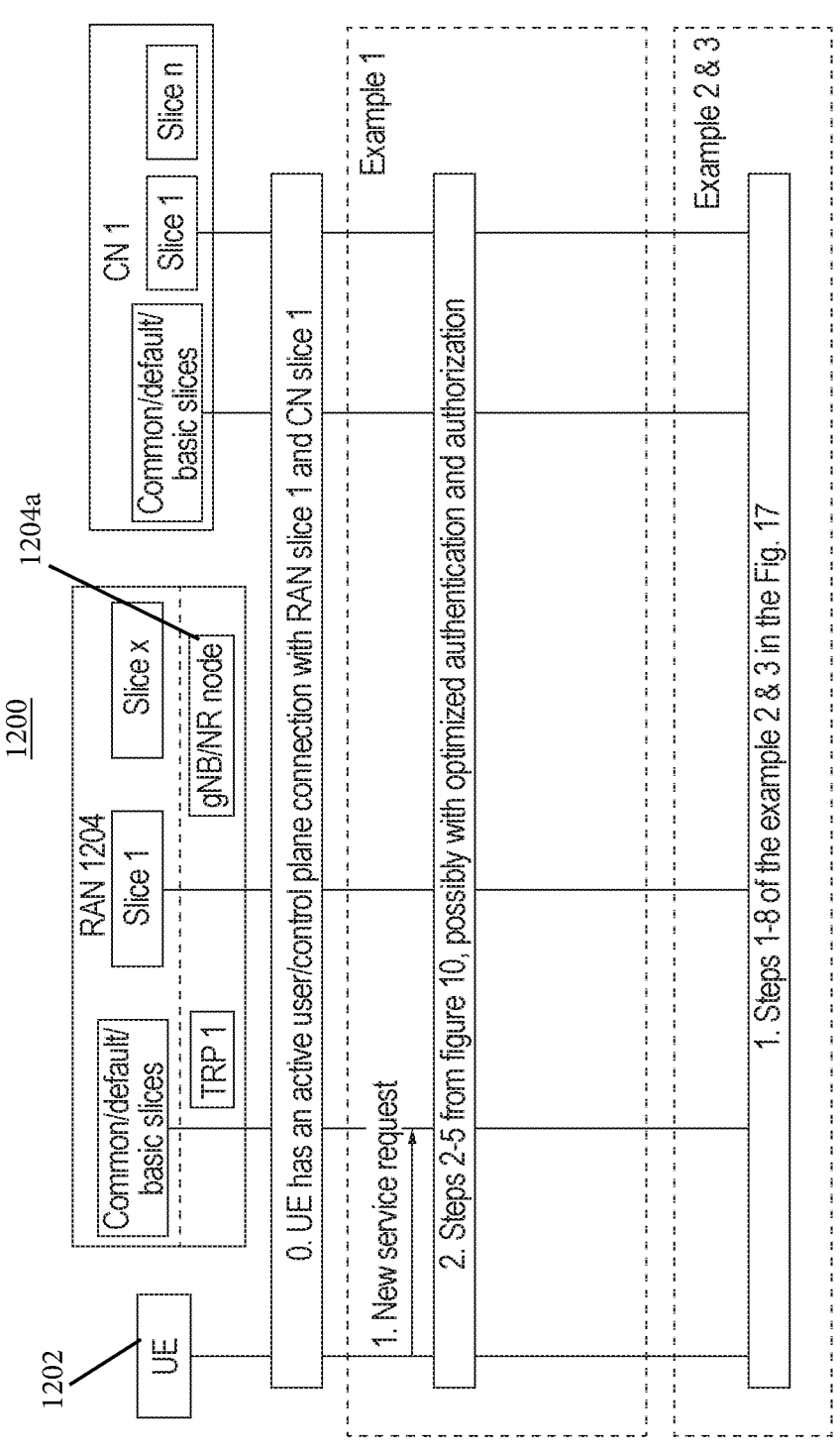
FIG. 18 is a call flow for RAN based connected mode additional network slice discovery and selection in accordance with an example embodiment.

Referring now to an example RAN based additional slice discovery and selection depicted in FIG. 18, with respect to Example 1, at 1, the UE 1202 sends the new service request directly to the common/default/basic slice where the NSISF resides. At 2, operations 2 to 5 from FIG. 14 may be performed. At 3 of Example 1, operations 2 to 6 of FIG. 15 may be performed, in which the RAN determines selected slices and how the UE performs subsequent access to those selected slices. The operations may also include optimized authentication and authorization. Still referring to FIG. 18, with respect to Examples 2 and 3, at 1, operations 1 to 8 of Examples 2 and 3 in FIG. 17 are performed.

Figure 19:
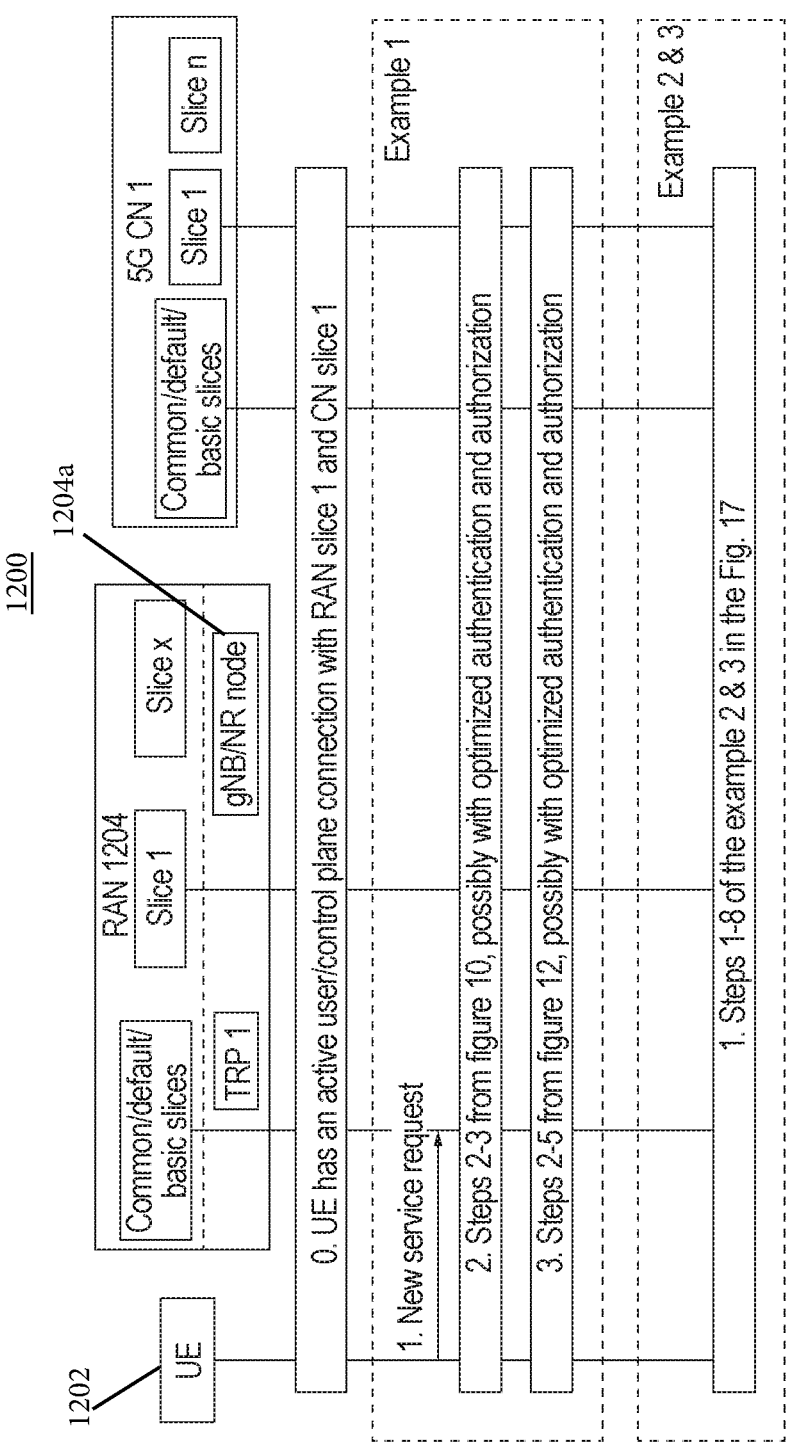
FIG. 19 is a call flow for CN based connected mode additional network slice discovery and selection in accordance with an example embodiment.

Referring now to an example CN based additional slice discovery and selection depicted in FIG. 19, with respect to Example 1, at 1, the UE 1202 sends the new service request directly to the common/default/basic slice, where the NSISF resides. At 2, operations 2 and 3 of FIG. 14 are performed. Authentication and authorization may be optimized in a manner similar to operation 2 of Example 1 in FIG. 17. At 3, operations 2 to 5 of FIG. 16 are performed. With respect to Examples 2 and 3, at 1, operations 1 to 8 of Examples 2 and 3 of FIG. 17 may be performed.

Figure 20A:
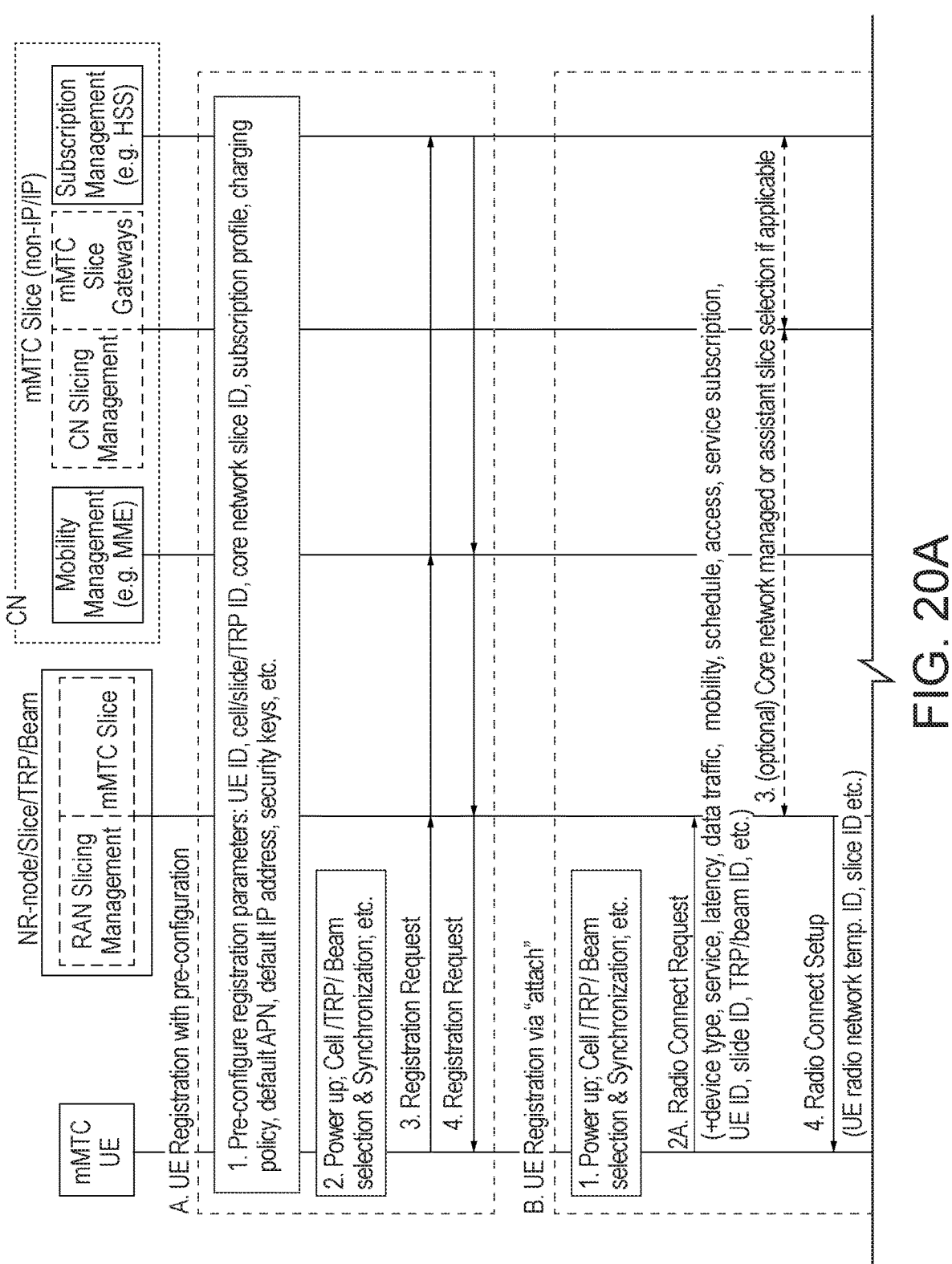
FIGS. 20A and 20B depict an example call flow for registration and grant-less setup in accordance with an example embodiment.
Figure 20B:
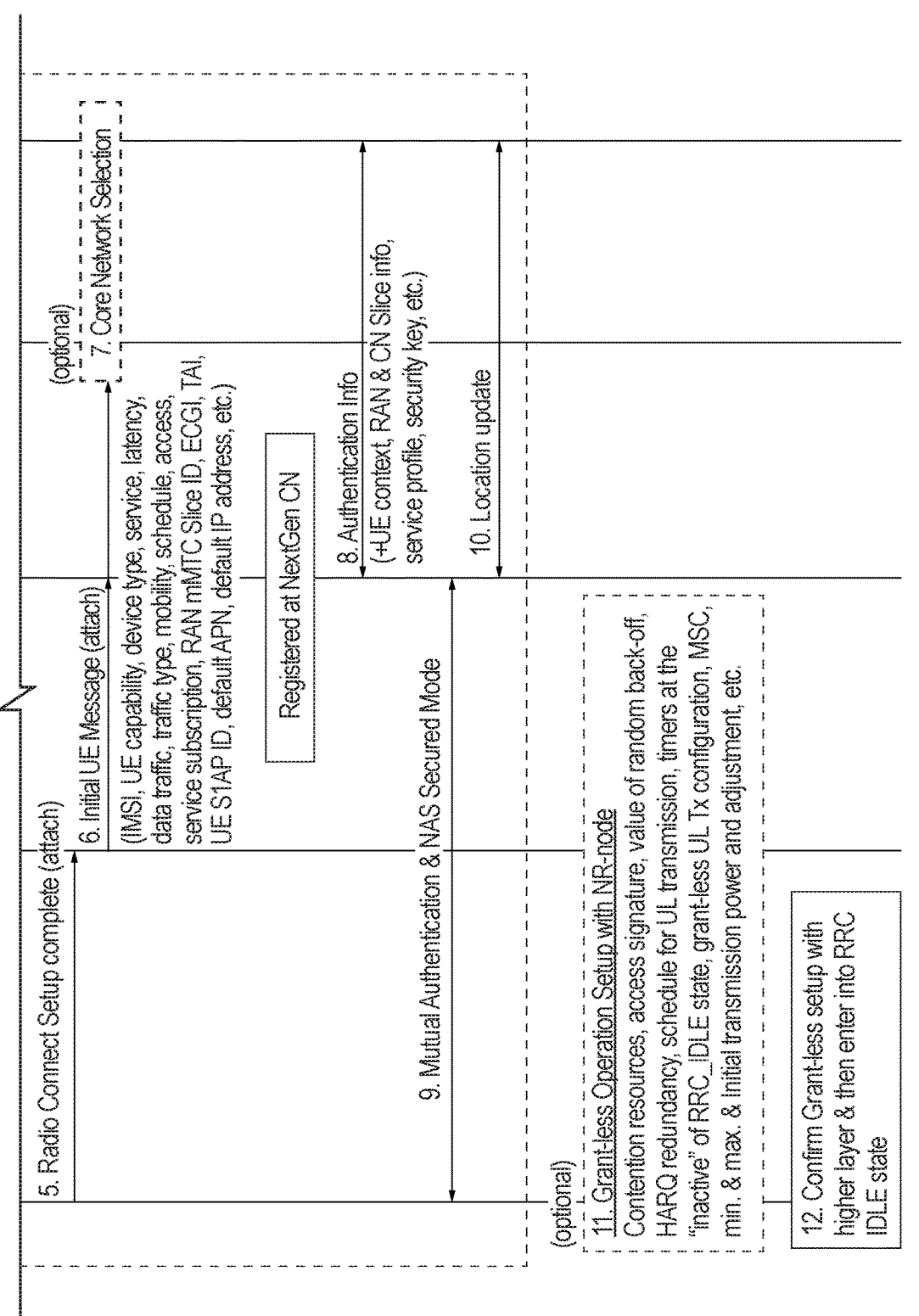
Figure 21A:
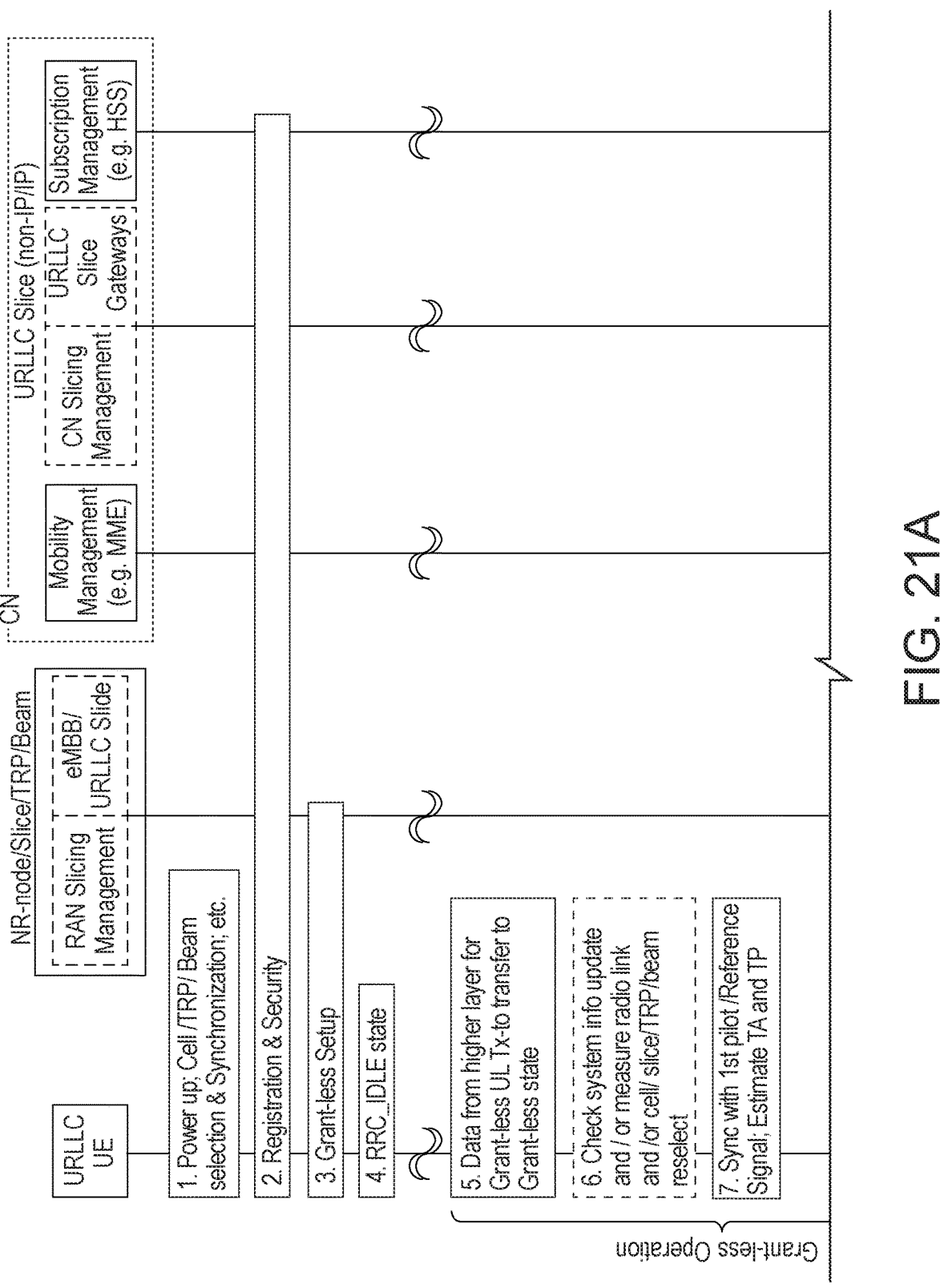
FIGS. 21A and 21B depict an example call flow for grant-less and grant UL transmissions for URLLC devices, in accordance with an example embodiment.
Figure 21B:
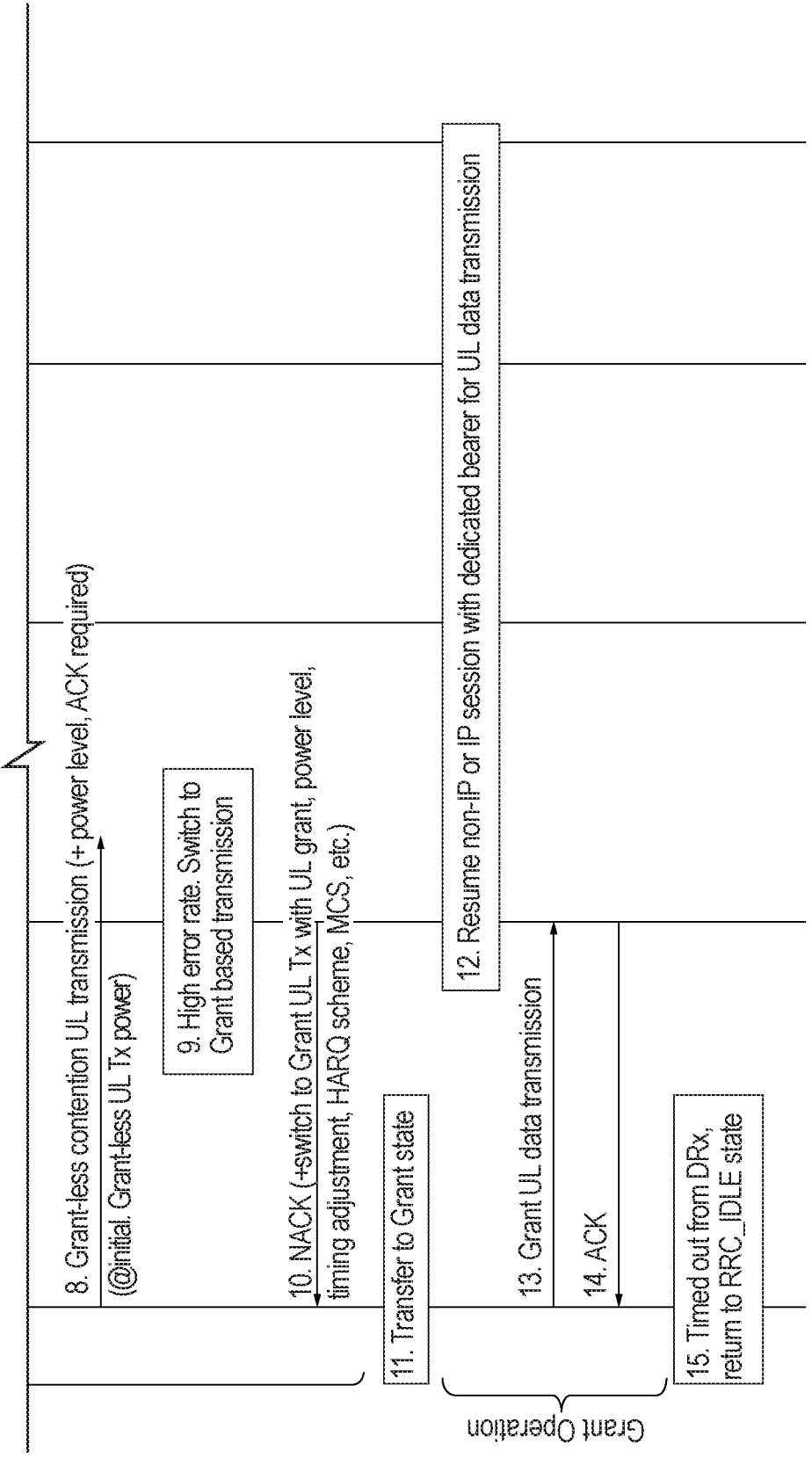
Figure 22A:
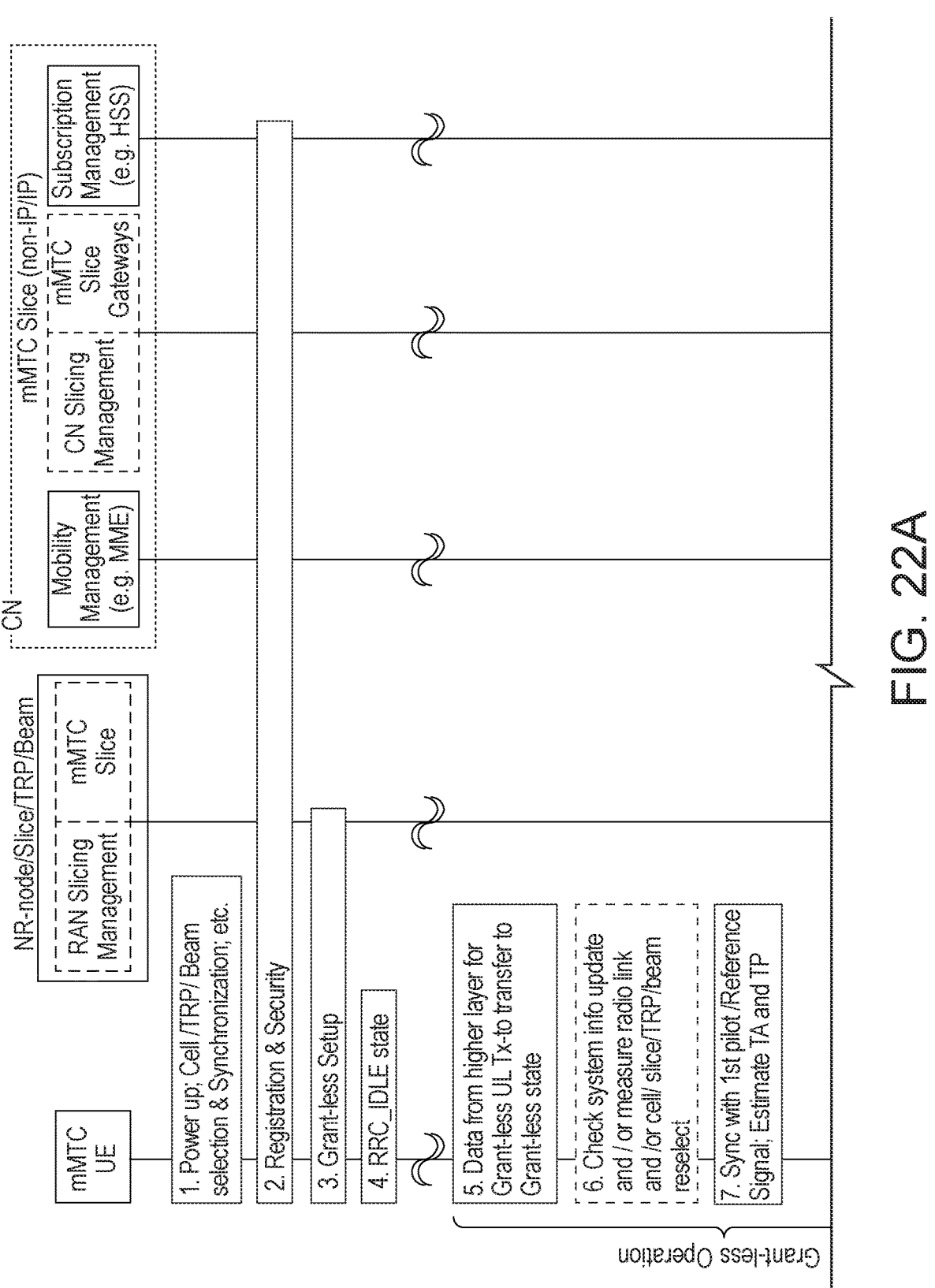
FIGS. 22A and 22B depict an example call flow for grant-less and grant UL transmissions for mMTC devices, in accordance with an example embodiment.
Figure 22B:
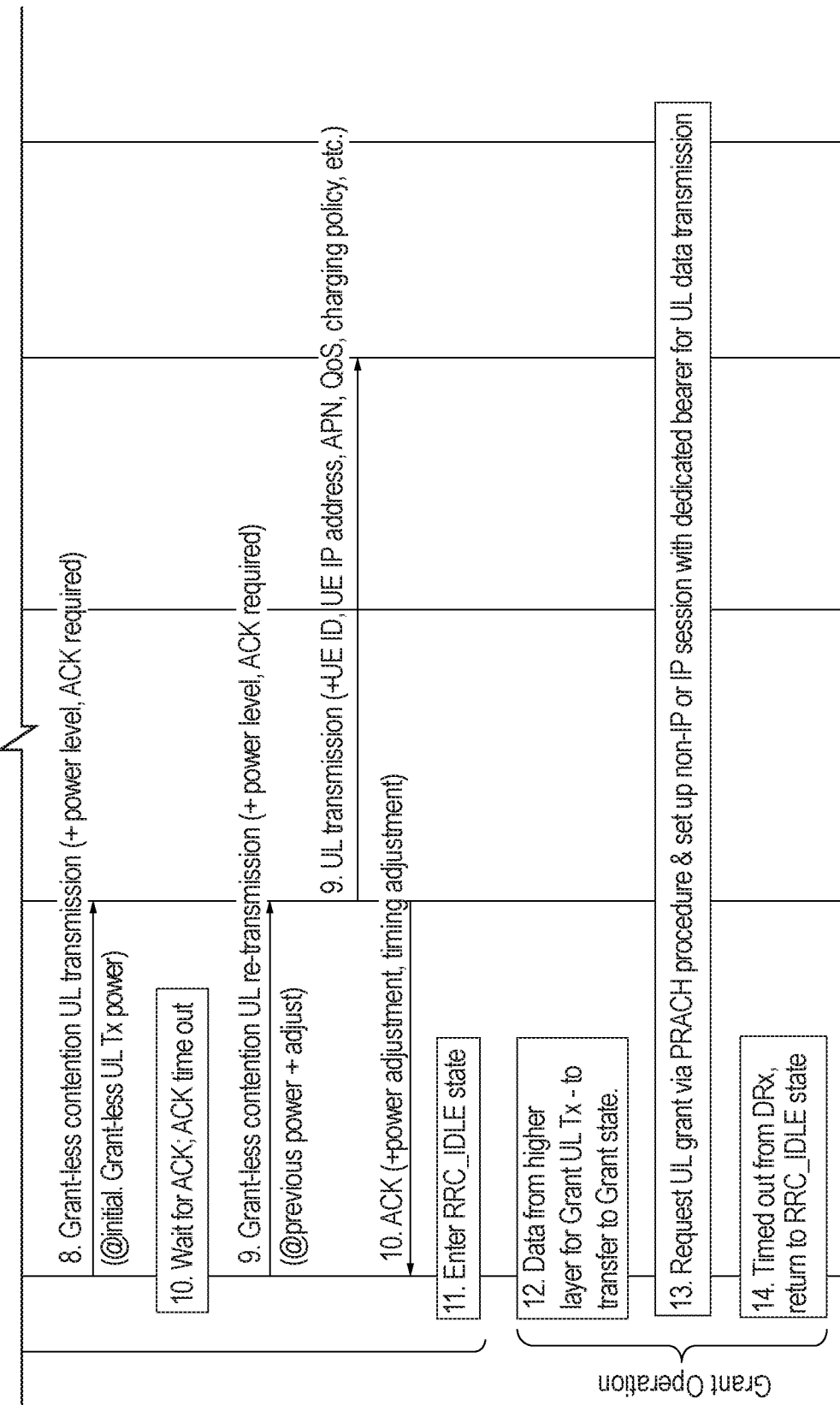

Turning now to example Grant-less and Grant UL Transmissions, as shown in FIGS. 20A and 20B, a UE may be preconfigured with a registration to a subscription management node in the core network. Alternatively, the UE may be registered via "attach" procedures. The UE may set up grant-less related parameters, which may be referred to generally as its grant-less configuration, after the registration (if applicable). In some cases, a that is UE pre-configured for registration may also be pre-configured with grant-less parameters. FIGS. 21A and 21B depict an example of grant-less and grant operations for URLLC devices, wherein the UE (URLLC device) transitions between the grant-less and grant states in accordance with direction by the NR-node. FIGS. 22A and 22B depict an example of grant-less and grant operation for mMTC devices, wherein the UE (mMTC device) transitions between the grant-less and grant states as commanded by a higher layer (as compared to the physical layer).

Figure 23:
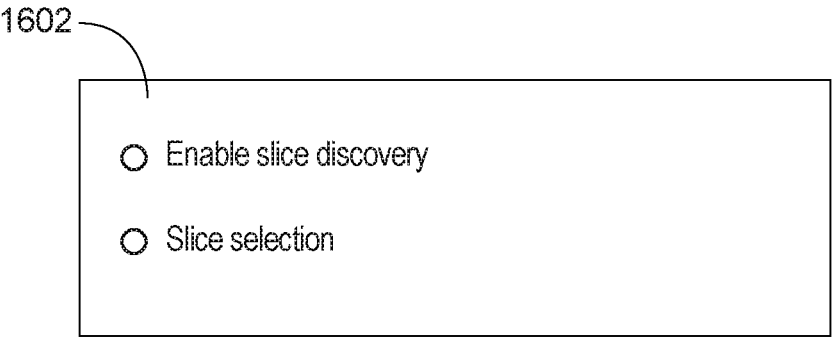
FIG. 23 is a diagram of an example Graphical User Interface (GUI) for UE configuration in accordance with an example embodiment.

Interfaces, such as Graphical User Interfaces (GUIs), can be used to assist user to control and/or configure functionalities related to network slice discovery and selection. Referring to FIG. 23, an example Graphical User Interface (GUI) for configuring a UE to discover and select a slice. In particular, using the GUI 2302, a user may configure a UE to discover slices and select slices. Alternatively, using the GUI 2302, a user may configure a UE such that the UE is not enabled to discover slices and select slices. It will be understood that the GUI can be adapted to display or configure additional, or alternative, parameters as desired. Further, the GUI can display parameters in various visual depictions as desired. It will further be understood that interface 2302 can be produced using various displays, such as those shown in FIGS. 24B and 24F described below.

Thus, as described above, an apparatus may, before establishing a connection with a network, so as to operate in an idle mode, discover information associated with a plurality of slices (slice information) of the network. Based, at least in part, on one or more slice selection criteria and the information associated with the plurality of slices, the apparatus may select one of the plurality of slices of the network, and access the selected slice. In an example, the apparatus discovers the slice information by receiving and decoding a system information block message broadcasted from a radio access node of the network. The system information block message may include the information associated with the plurality of slices of the network, and the information may include an identifier of the selected slice. In an example, the selected slice is accessed by sending an access request to a slicing management entity for selecting the slice. The access request may include context information associated with the apparatus, such that the slice is selected based on the context information associated with the user equipment and the information associated with the plurality of slices. In another example, the apparatus may send an access request that includes an identifier of the selected slice, to the selected slice. The information associated with the plurality of slices may include a validity period associated with each slice, an application identity to which the each slice applies, a service to which each slice applies, a type associated with each slice, or the like. Selection criteria may include a latency associated with each slice, a bandwidth achievable by each slice, a resource model associated with each slice, or the like. In another example, the apparatus discovers slice information by retrieving a portion of the slice information that is stored at the apparatus. The portion of the information may be stored from previous network connections.

As also described above, an apparatus may receive a slice access request. The slice access request may include a network slice identity corresponding to a slice for which a user equipment is requesting access. Using the network slice identity, the apparatus may determine whether the user equipment is permitted to access the slice. If the user equipment is permitted to access the slice, the apparatus may send a response toward the user equipment, such that the user equipment can set up user plane connections with the slice. In an example, the apparatus determines whether the user equipment is permitted to access the slice by using the network slice identity to determine a core network entity associated with the slice. In another example, the apparatus determines whether the user equipment is permitted to access the slice by collecting and evaluating information from the user equipment via a direct radio link with the user equipment, wherein the information concerns the user equipment. For example, the information may include capabilities of the user equipment, a service type associated with the user equipment, traffic characteristics associated with the user equipment, quality of service requirements of the user equipment, or the like. Based on the information concerning the user equipment, the apparatus may obtain a list of one or more network slice instances for which the user equipment is permitted to use, wherein the slice is one of the one more network slice instances. Further, the apparatus may update a mapping table to include the one or more slice instances for use in future routing.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to affect the methods described herein. As used herein, the terms "apparatus," "network apparatus," "node," "entity", "function," "device," and "network node" may be used interchangeably, without limitation unless otherwise specified.

Figure 24A:
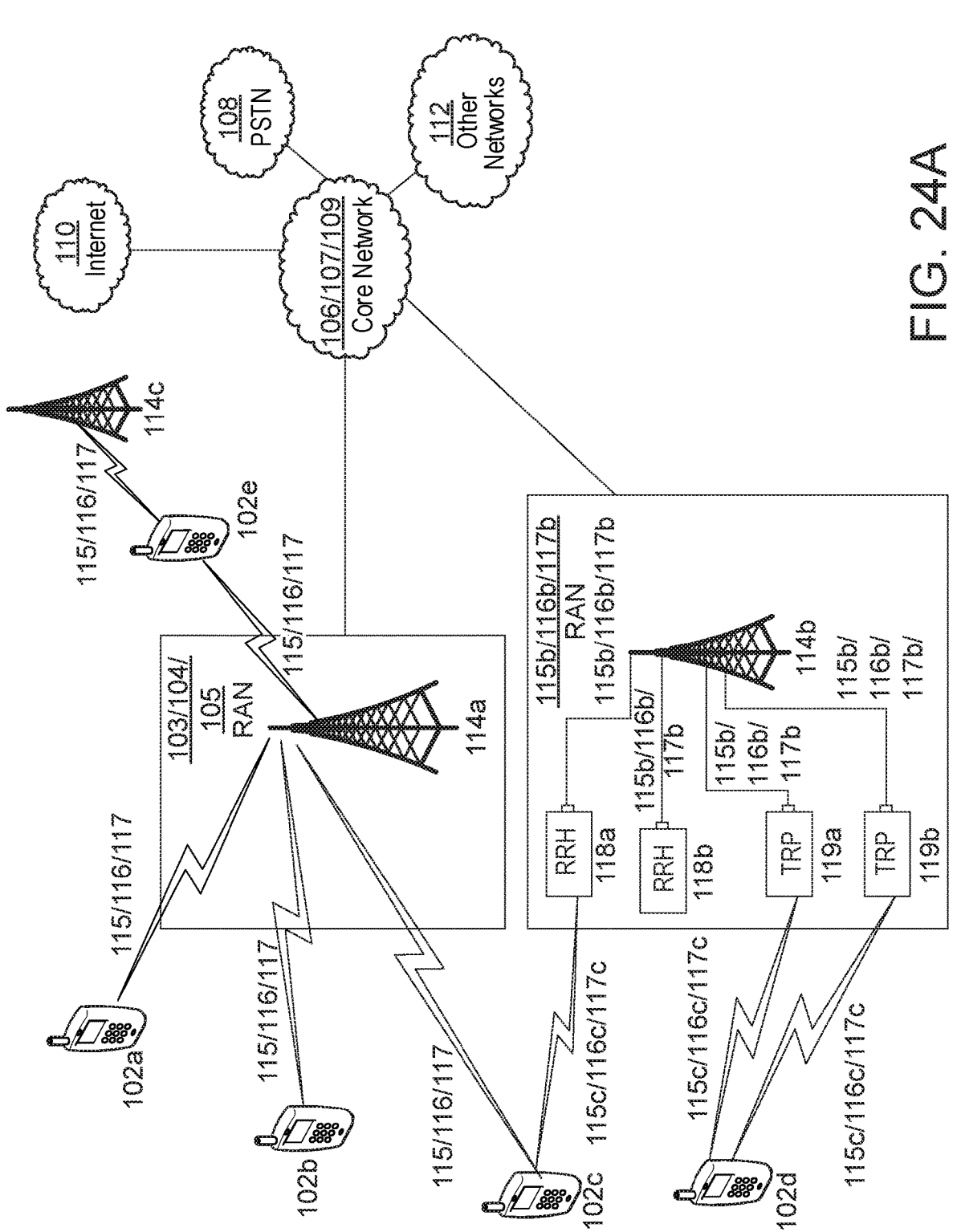
FIG. 24A illustrates one embodiment of an example communications system in which the methods and apparatuses described and claimed herein may be embodied.
Figure 24B:
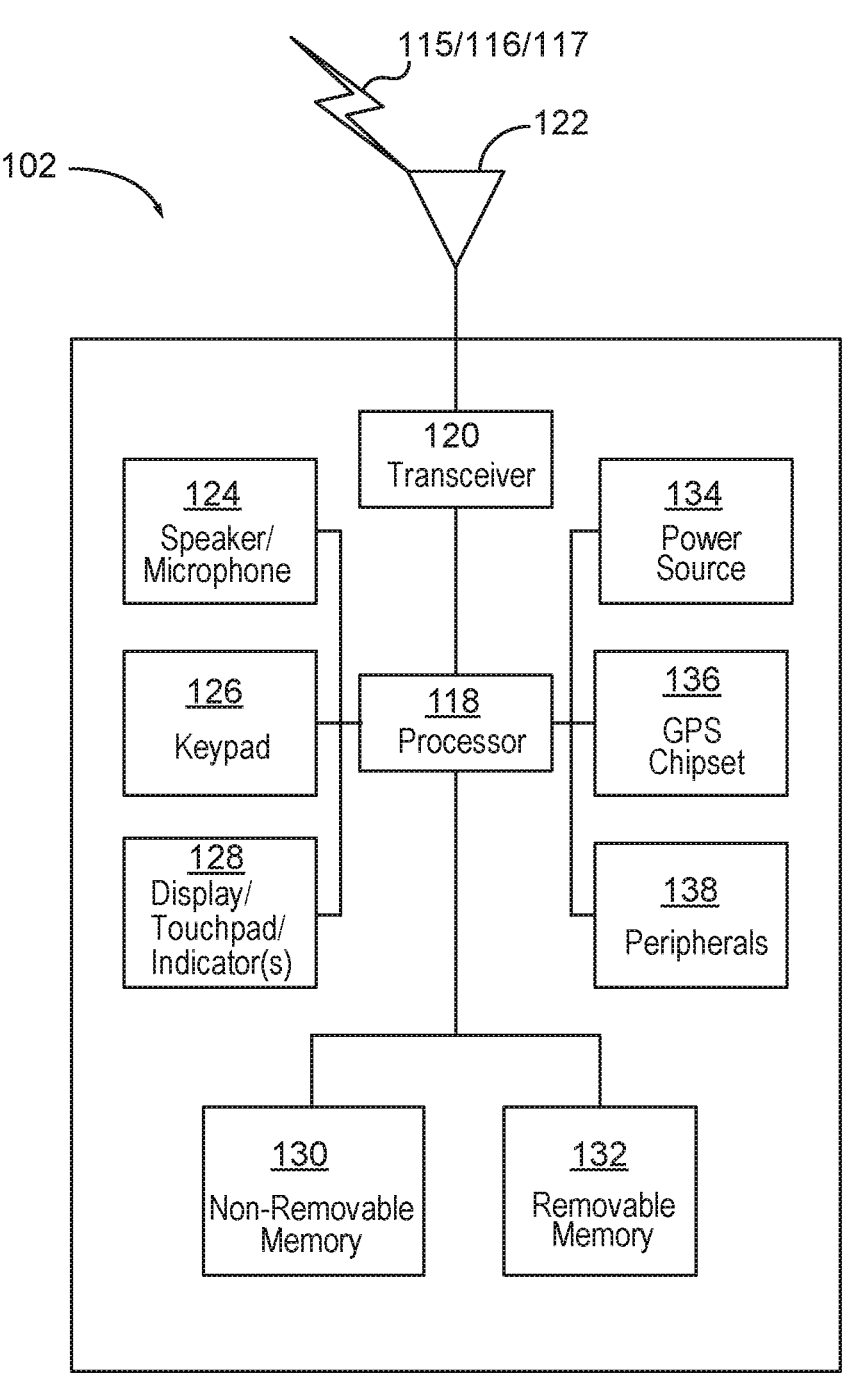
FIG. 24B is a block diagram of an example apparatus or device configured for wireless communications in accordance with the embodiments illustrated herein.

It is understood that the nodes performing the steps illustrated, for example, in FIGS. 4A to 22B, may be logical entities that may be implemented in the form of software (i.e., computer-executable instructions) stored in a memory of, and executing on a processor of, an apparatus configured for wireless and/or network communications or a computer system such as those illustrated in FIGS. 24B and F. That is, the method(s) illustrated in FIGS. 4A to 22B may be implemented in the form of software (i.e., computer-executable instructions) stored in a memory of an apparatus, such as the apparatus or computer system illustrated in FIGS. 24B and F, which computer executable instructions, when executed by a processor of the apparatus, perform the steps illustrated in FIGS. 4A to 22B. It is also understood that any transmitting and receiving steps illustrated in FIGS. 4A to 22B may be performed by communication circuitry of the apparatus under control of the processor of the apparatus and the computer-executable instructions (e.g., software) that it executes.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

It will be understood that for different RAN architectures, the grant-less UL control and management described above may be conducted at an NR-node, Transmission and Reception Point (TRP), Remote Radio Head (RRH), or the like, as well as the central controller in RAN or the control function in a RAN slice. Embodiments described herein proposed may also applicable to TRP, RRH, central controller, and control function in different RAN architectures.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 24A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/

107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 24A-24E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a in the RAN 103/104/105 and the WTRUs 102a, 102b, 102c, or RRHs 118a, 118b and TRPS 119a, 119b in the RAN 103b/104b/105b and the WTRUs 102c, 102d, may implement a radio technology such as Evolved UMTS Terrestrial Radio Access (E-UTRA), which may establish the air interface 115/116/117 using Long Term Evolution (LTE) and/or LTE-Advanced (LTE-A). In the future, the air interface 115/116/117 may implement 3GPP NR technology.

In an embodiment, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 24A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e may implement a radio technology such as IEEE 802.11 to establish a wireless local area network (WLAN). In an embodiment, the base station 114c and the WTRUs 102e may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 24A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 24A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 24A may be configured to communicate with the base station 114a, which may employ a cellular-based radio technology, and with the base station 114c, which may employ an IEEE 802 radio technology.

FIG. 24B is a block diagram of an example apparatus or device configured for wireless communications in accordance with the embodiments illustrated herein, such as for example, a WTRU 102. As shown in FIG. 24B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 24B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 24B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive Although not shown in FIG. 24A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 24A may be configured to communicate with the base station 114a, which may employ a cellular-based radio technology, and with the base station 114b, which may employ an IEEE 802 radio technology.

FIG. 24B is a block diagram of an example apparatus or device configured for wireless communications in accordance with the embodiments illustrated herein, such as for example, a WTRU 102. As shown in FIG. 24B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 24B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 24B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 24B as a single element, the WTRU 102 may include any number of transmit/receive elements 122.

More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 24C:
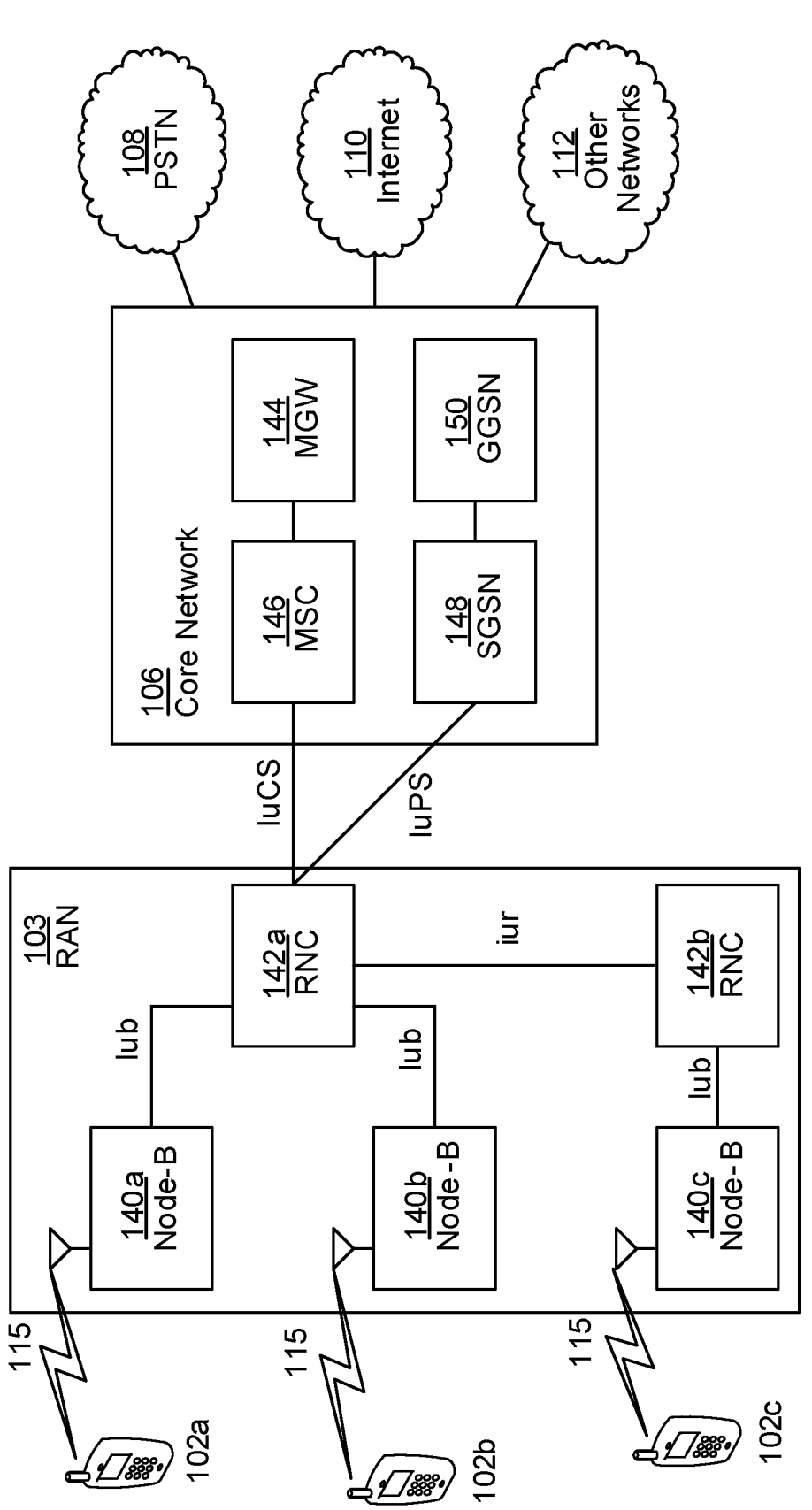
FIG. 24C is a system diagram of an example radio access network (RAN) and core network in accordance with an example embodiment.

FIG. 24C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 24C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 24C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 24C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 24D:
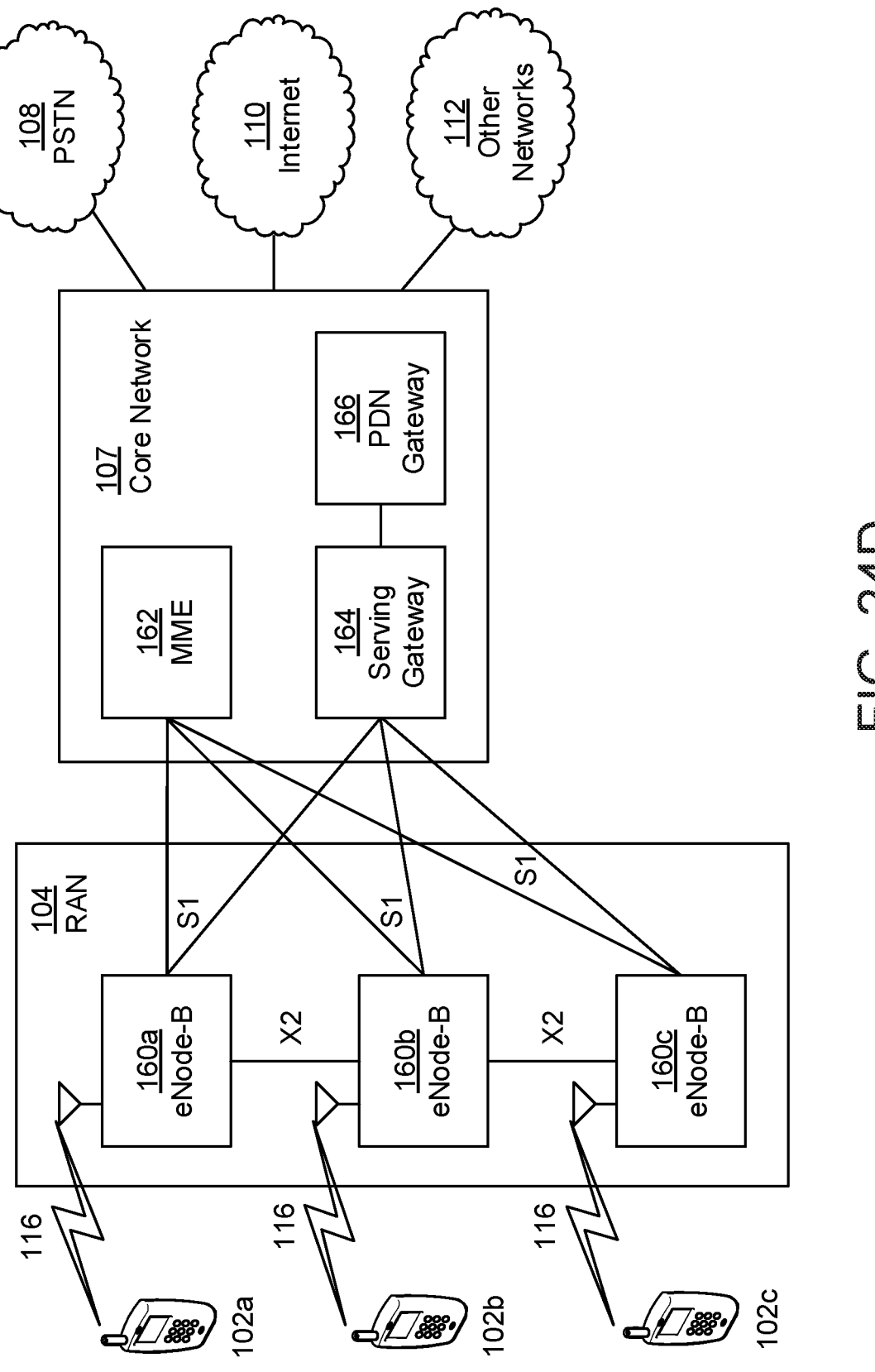
FIG. 24D is another system diagram of a RAN and core network according to another embodiment.

FIG. 24D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 24D, the eNode-Bs 160a, 160b, 160c may communicate with one another over an X2 interface.

The core network 107 shown in FIG. 24D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 24E:
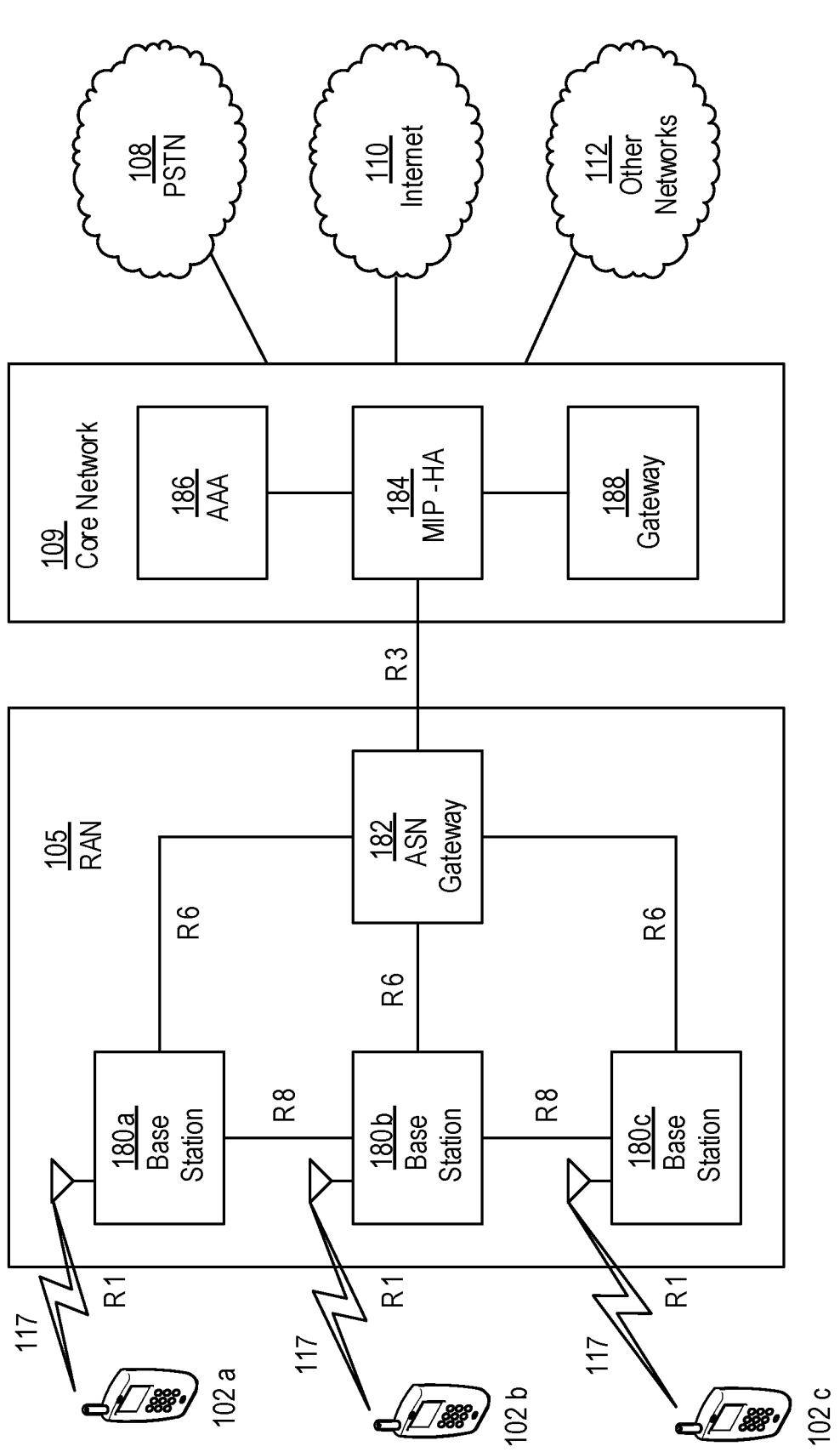
FIG. 24E is another system diagram of a RAN and core network according to another embodiment.

FIG. 24E is a system diagram of the RAN 105 and the core network 109 according to an embodiment. The RAN 105 may be an access service network (ASN) that employs IEEE 802.16 radio technology to communicate with the WTRUs 102*a*, 102*b*, and 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 24E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell in the RAN 105 and may include one or more transceivers for communicating with the WTRUs 102*a*, 102*b*, 102*c* over the air interface 117. In an embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, and 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, and 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 24E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, and 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 24E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 24A, 24C, 24D, and 24E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 24A, 24B, 24C, 24D, and 24E are provided by way of example only, and it is understood that the subject matter disclosed and claimed herein may be embodied or implemented in any similar communication system, whether presently defined or defined in the future.

Figure 24F:
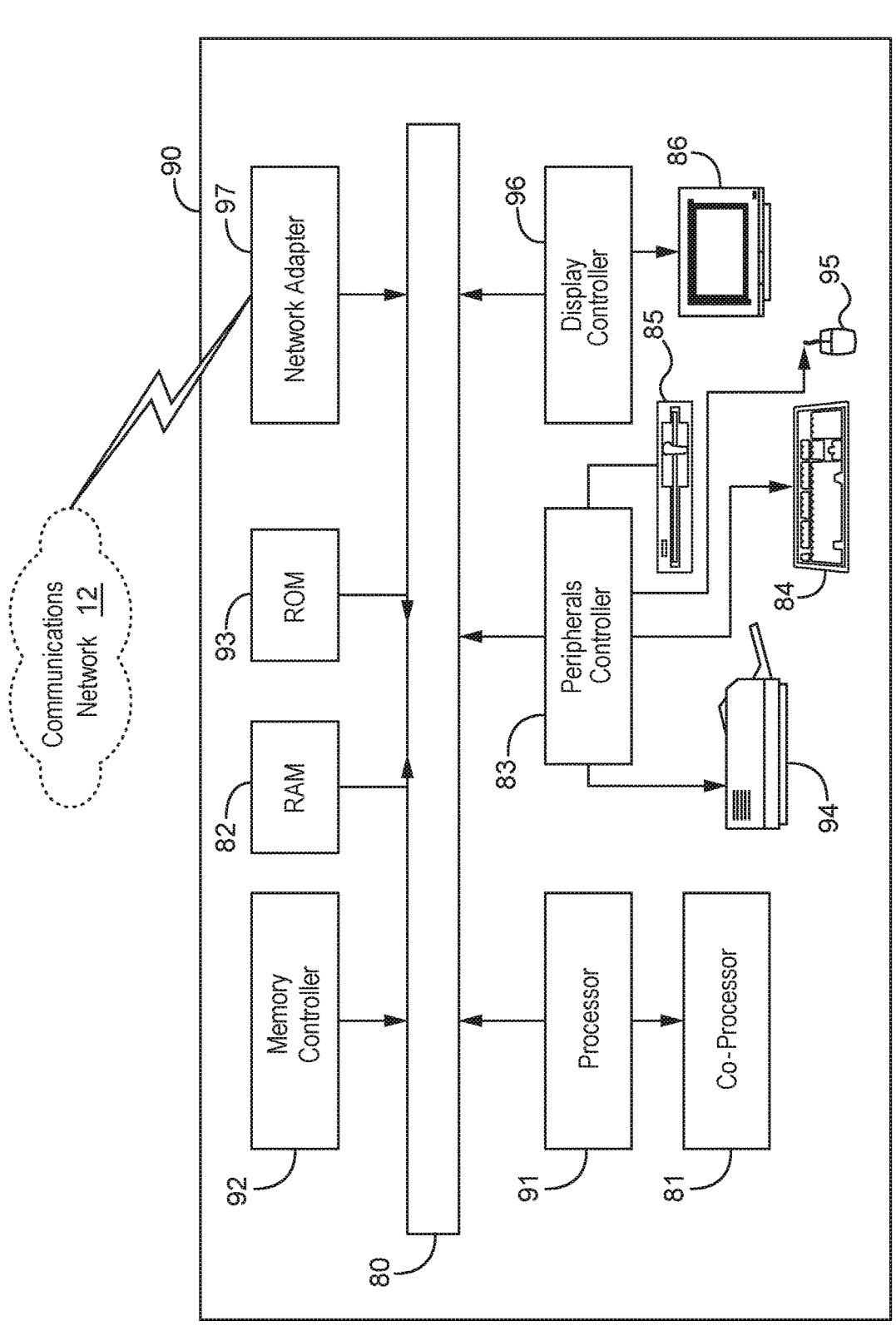
FIG. 24F is a block diagram of an exemplary computing system 90 in which one or more apparatuses of the communications networks illustrated in FIGS. 24A, 24C, 24D and 24E may be embodied.

FIG. 24F is a block diagram of an exemplary computing system 90 in which one or more apparatuses of the communications networks illustrated in FIGS. 24A, 24C, 24D and 24E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91.

Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 24A, 24B, 24C, 24D, and 24E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

The following is a list of acronyms relating to service level technologies that may appear in the above description. Unless otherwise specified, the acronyms used herein refer to the corresponding term listed below.

ACK Acknowledgement
AID Association Identifier (802.11)
AP Access Point (802.11)
APN Access Point Name
AS Access Stratum
BS Base Station
CA Collision Avoidance
CD Collision Detection
CFI Control Format Indicator
CN Core Network
CMAS Commercial Mobile Alert System
C-RNTI Cell Radio-Network Temporary Identifier
CSMA Carrier Sensing Multiple Access
CSMA/CD CSMA with Collision Detection
CSMA/CA CSMA with Collision Avoidance
DCA Dedicated Collision Area
DCI Downlink Control Information
DACTI Dynamic Access Configuration Time Interval
DL Downlink
DRX Discontinuous Reception
ECGI E-UTRAN Cell Global Identifier
ECM EPS Connection Management
eMBB enhanced Mobile Broadband
EMM EPS Mobility Management
eNB Evolved Node B
ETWS Earthquake and Tsunami Warning System
E-UTRA Evolved Universal Terrestrial Radio Access
E-UTRAN Evolved Universal Terrestrial Radio Access Network
FDM Frequency Division Multiplex
FFS For Further Study
GERAN GSM EDGE Radio Access Network
GSM Global System for Mobile communications
GUTI Globally Unique Temporary UE Identity
HE High Efficiency
HSS Home Subscriber Server
IE Information Element
IMSI International Mobile Subscriber Identity
IMT International Mobile Telecommunications
KPI Key Performance Indicators
LTE Long Term Evolution
MAC Medium Access Control
MBMS Multimedia Broadcast Multicast Service
MCL Maximum Coupling Loss
MIB Master Information Block
MME Mobile Management Entity
MTC Machine-Type Communications
mMTC Massive Machine Type Communication NACK Negative Acknowledgement
NAS Non-access Stratum
NR New Radio
OBO OFDM Back-off (802.11)
OFDM Orthogonal Frequency Division Multiplex
PDCCH Physical Downlink Control Channel
PDSCH Physical Downlink Shared Channel
PHY Physical Layer
PCFICH Physical Control Format Indicator Channel
PDCP Packet Data Convergence Protocol
PHICH Physical Hybrid ARQ Indicator Channel
PPDU PLCP Protocol Data Unit (802.11)
PRACH Physical Random Access Channel
PRB Physical Resource Block
PUCCH Physical Uplink Control Channel
PUSCH Physical Uplink Shared Channel
QoS Quality of Service
RA Random Access
RACH Random Access Channel
RAN Radio Access Network (3GPP)
RMSU Reachability and Mobility Status Update
RB Resource Block
RLC Radio Link Control
RNTI Radio Network Temporary Identifier
RRC Radio Resource Control
RU Resource Unit (802.11)
SI System Information
SIB System Information Block
SR Scheduling Request
STA Station (802.11)
TAI Tracking Area Indicator
TAU Tracking Area Update
TBD To Be Defined
TDM Time Division Multiplex
TEID Tunnel Endpoint ID
TRP Transmission and Reception Point
TTI Transmission Time Interval
UCI Uplink Control Information
UE User Equipment
UL Uplink
UR/LL Ultra Reliable-Low Latency
URLLC Ultra-Reliable and Low Latency Communica-
tions This written description uses examples to disclose the
invention, including the best mode, and also to enable any
person skilled in the art to practice the invention, including
making and using any devices or systems and performing
any incorporated methods. The patentable scope of the
invention is defined by the claims, and may include other
examples that occur to those skilled in the art. Such other
examples are intended to be within the scope of the claims
if they have structural elements that do not differ from the
literal language of the claims, or if they include equivalent
structural elements with insubstantial differences from the
literal languages of the claims.

What is claimed is:

1. A wireless transmit/receive unit (WTRU), comprising a
transceiver and one or more processors, configured to:
   send slice selection assistance information and a 5G
   globally unique temporary identity to a network, the
   slice selection assistance information indicating slice
   service type information;
   receive an indication of a first slice that the WTRU is
   allowed to access;
   receive, in one or more system information blocks (SIBs),
   slice information that indicates one or more slices
   supported by one or more cells in the network, wherein the one or more SIBs indicate at least one set of random
   access resources associated with accessing at least the
   first slice;
   select a first cell based on the first cell supporting access
   to the first slice;
   select the set of random access resources indicated as
   being associated with accessing at least the first slice in
   the one or more SIBs; and
   send, via the first cell, an access request using the random
   access resources indicated as being associated with
   accessing at least the first slice in the one or more SIBs.

2. The WTRU of claim 1, wherein the access request
comprises a RRC connection establishment message.

3. The WTRU of claim 1, wherein the access request
comprises a NAS registration procedure message.

4. The WTRU of claim 1, wherein the slice information
indicates one or more network slice identifiers.

5. The WTRU of claim 4, wherein the slice information
indicates a supported service type, a support slice type, or
supported QoS parameters of the one or more network slices
identifiers.

6. The WTRU of claim 1, wherein the 5G globally unique
temporary identity indicates a core network (CN) network
function (NF) in use.

7. The WTRU of claim 1, wherein the 5G globally unique
temporary identity is common for network slices the WTRU
is allowed to access.

8. An apparatus, comprising a transceiver and one or more
processors configured to:
   receive slice selection assistance information and a 5G
   globally unique temporary identity from a wireless
   transmit/receive unit (WTRU), the slice selection assis-
   tance information indicating slice service type infor-
   mation;
   send an indication of a first slice that the WTRU is
   allowed to access;
   send, to the WTRU in one or more system information
   blocks (SIBs), slice information that indicates one or
   more slices supported by a network, wherein the one or
   more SIBs indicate at least one set of random access
   resources associated with accessing at least the first
   slice; and
   receive, from the WTRU, an access request associated
   with the set of random access resources indicated as
   being associated with accessing at least the first slice in
   the one or more SIBs selected by the WTRU.

9. The apparatus of claim 8, wherein the access request
comprises a RRC connection establishment message.

10. The apparatus of claim 8, wherein the access request
comprises a NAS registration procedure message.

11. The apparatus of claim 8, wherein the slice informa-
tion indicates one or more network slice identifiers.

12. The apparatus of claim 11, wherein the slice infor-
mation indicates a supported service type, a support slice
type, or supported QoS parameters of the one or more
network slices identifiers.

13. The apparatus of claim 8, wherein the 5G globally
unique temporary identity indicates a core network (CN)
network function (NF) in use.

14. The apparatus of claim 8, wherein the 5G globally
unique temporary identity is common for network slices the
WTRU is allowed to access.

15. A method for use in a wireless transmit/receive unit
(WTRU) comprising:

sending slice selection assistance information and a 5G globally unique temporary identity to a network, the slice selection assistance information indicating slice service type information;

receiving an indication of a first slice that the WTRU is allowed to access;

receiving, in one or more system information blocks (SIBs), slice information that indicates one or more slices supported by one or more cells in the network, wherein the one or more SIBs indicate at least one set of random access resources associated with accessing at least the first slice;

selecting a first cell based on the first cell supporting access to the first slice;

selecting the set of random access resources indicated as being associated with accessing at least the first slice in the one or more SIBs; and sending, via the first cell, an access request using the random access resources indicated as being associated with accessing at least the first slice in the one or more SIBs.

16. The method of claim 15, wherein the access request comprises a RRC connection establishment message.

17. The method of claim 15, wherein the access request comprises a NAS registration procedure message.

18. The method of claim 15, wherein the slice information indicates one or more network slice identifiers.

19. The method of claim 18, wherein the slice information indicates a supported service type, a support slice type, or supported QoS parameters of the one or more network slices identifiers.

20. The method of claim 15, wherein the 5G globally unique temporary identity indicates a core network (CN) network function (NF) in use and is common for network slices the WTRU is allowed to access.

* * * * *